United States Patent
Gotoh et al.

(10) Patent No.: US 9,139,773 B2
(45) Date of Patent: Sep. 22, 2015

(54) COMPOUND HAVING 3,3,3-TRIFLUORO-1-PROPENYLOXY, LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Yasuyuki Gotoh, Tokyo (JP); Kenji Hirata, Chiba (JP)

(73) Assignees: JNC CORPORATION, Tokyo (JP); JNC PETROCHEMICAL CORPORATION, Tokyo (JP)

(*) Notice: Subject to any disclaimer, the term of this patent is extended or adjusted under 35 U.S.C. 154(b) by 0 days.

(21) Appl. No.: 14/159,810

(22) Filed: Jan. 21, 2014

(65) Prior Publication Data

US 2014/0203209 A1 Jul. 24, 2014

(30) Foreign Application Priority Data

Jan. 21, 2013 (JP) .................................... 2013-8202

(51) Int. Cl.
| | |
|---|---|
| *C09K 19/06* | (2006.01) |
| *C09K 19/34* | (2006.01) |
| *C09K 19/20* | (2006.01) |
| *C09K 19/30* | (2006.01) |
| *C09K 19/32* | (2006.01) |
| *C09K 19/04* | (2006.01) |

(52) U.S. Cl.
CPC ............. *C09K 19/3458* (2013.01); *C09K 19/20* (2013.01); *C09K 19/3003* (2013.01); *C09K 19/3066* (2013.01); *C09K 19/3068* (2013.01); *C09K 19/32* (2013.01); *C09K 19/3402* (2013.01); *C09K 19/3444* (2013.01); *C09K 2019/0448* (2013.01); *C09K 2019/0466* (2013.01); *C09K 2019/3009* (2013.01); *C09K 2019/3422* (2013.01); *C09K 2019/3425* (2013.01)

(58) Field of Classification Search
CPC ............. C09K 19/3458; C09K 19/20; C09K 19/3003; C09K 19/3066; C09K 19/3402; C09K 19/3444; C09K 19/32; C09K 2019/0448; C09K 2019/0466; C09K 2019/3009; C09K 2019/3422; C09K 2019/3425

USPC .............. 252/299.01, 299.6, 299.61, 299.63; 428/1.1; 549/363, 374; 544/335; 546/339; 568/643, 645
See application file for complete search history.

(56) References Cited

U.S. PATENT DOCUMENTS

| 5,403,512 A | 4/1995 | Bartmann et al. | |
|---|---|---|---|
| 2014/0138582 A1* | 5/2014 | Gotoh et al. | 252/299.63 |
| 2014/0203209 A1* | 7/2014 | Gotoh et al. | 252/299.61 |

FOREIGN PATENT DOCUMENTS

| DE | 4006921 A | 9/1990 |
|---|---|---|
| DE | 19959721 A | 6/2000 |
| EP | 0786445 A1 | 7/1997 |
| GB | 2229438 A | 9/1990 |
| JP | 06-500343 A | 1/2006 |
| WO | 9611897 A1 | 4/1996 |

* cited by examiner

*Primary Examiner* — Geraldina Visconti
(74) *Attorney, Agent, or Firm* — Hogan Lovells US LLP

(57) ABSTRACT

An object is to provide a liquid crystal compound satisfying at least one of physical properties such as a high stability to heat, light and so forth, a high clearing point, a low minimum temperature of a liquid crystal phase, a small viscosity, a suitable optical anisotropy, a large dielectric anisotropy, a suitable elastic constant and an excellent compatibility with other liquid crystal compounds, a liquid crystal composition containing the compound, and a liquid crystal display device including the composition.
A solution is the compound represented by formula (1):

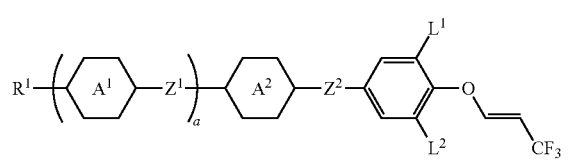

wherein, in formula (1),
for example, $R^1$ is alkyl having 1 to 10 carbons; ring $A^1$ and ring $A^2$ are independently 1,4-cyclohexylene or 1,4-phenylene; $Z^1$ and $Z^2$ are independently a single bond or —$CF_2O$—; $L^1$ and $L^2$ are halogen; and a is 1 or 2.

14 Claims, No Drawings

COMPOUND HAVING 3,3,3-TRIFLUORO-1-PROPENYLOXY, LIQUID CRYSTAL COMPOSITION AND LIQUID CRYSTAL DISPLAY DEVICE

TECHNICAL FIELD

This application claims priority to Japanese Patent Application No. JP 2013-8202, filed on Jan. 21, 2013; the contents of which are all herein incorporated by this reference in their entireties. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

The invention relates to a liquid crystal compound, a liquid crystal composition and a liquid crystal display device. More specifically, the invention relates to a compound having 3,3,3-trifluoro-1-propenyloxy, a liquid crystal composition containing the compound and having a nematic phase, and a liquid crystal display device including the composition.

A liquid crystal display device is widely used for a display of a personal computer, a television and so forth. The device utilizes optical anisotropy, dielectric anisotropy and so forth of a liquid crystal compound. As an operating mode of the liquid crystal display device, a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a vertical alignment (VA) mode, a fringe field switching (EFS) mode, a polymer sustained alignment (PSA) mode and so forth are known.

In such a liquid crystal display device, a liquid crystal composition having suitable physical properties is used. In order to further improve characteristics of the liquid crystal display device, a liquid crystal compound contained in the composition preferably has physical properties described in items (1) to (8) below.
(1) A high stability to heat, light and so forth,
(2) a high clearing point,
(3) a low minimum temperature of a liquid crystal phase,
(4) a small viscosity ($\eta$),
(5) a suitable optical anisotropy ($\Delta n$),
(6) a large dielectric anisotropy ($\Delta \in$),
(7) a suitable elastic constant (K), and
(8) an excellent compatibility with other liquid crystal compounds.

An effect of physical properties of the liquid crystal compound on the characteristics of the device is as described below. A compound having a high stability to heat, light and so forth as described in (1) increases a voltage holding ratio of the device. Thus, a service life of the device becomes longer. A compound having a high clearing point as described in (2) extends a temperature range in which the device can be used. A compound having a low minimum temperature of the liquid crystal phase such as a nematic phase and a smectic phase, in particular, a compound having a low minimum temperature of the nematic phase as described in (3) also extends the temperature range in which the device can be used. A compound having a small viscosity as described in (4) decreases a response time in the device.

A compound having a suitable optical anisotropy as described in (5) improves contrast in the device. In accordance with a design of the device, a compound having a large optical anisotropy or a small optical anisotropy, more specifically, a compound having a suitable optical anisotropy is required. When the response time is decreased by decreasing a cell gap of the device, a compound having a large optical anisotropy is suitable. A compound having a large dielectric anisotropy as described in (6) decreases a threshold voltage of the device. Thus, an electric power consumption of the device is decreased. On the other hand, a compound having a small dielectric anisotropy decreases response time in the device by decreasing viscosity of the composition.

With regard to (7), a compound having a large elastic constant decreases a response time in the device. A compound having a small elastic constant decreases the threshold voltage of the device. Therefore, a suitable elastic constant is required according to characteristics that are desirably improved. A compound having an excellent compatibility with other liquid crystal compounds as described in (8) is preferred because physical properties of the composition are adjusted by mixing liquid crystal compounds having different physical properties.

A variety of liquid crystal compounds having a large dielectric anisotropy have been prepared so far because excellent physical properties not found in a conventional compound can be expected from a new compound, and because, when the new compound is added to the liquid crystal composition, a suitable balance regarding at least two physical properties is expected. In view of such a situation, development has been desired for a compound having excellent physical properties and a suitable balance regarding the physical properties with regard to properties (1) to (8) as described above, in particular, a compound having a large dielectric anisotropy ($\Delta \in$).

CITATION LIST

Patent Literature

Patent literature No. 1: DE 19959721 A.
Patent literature No. 2: JP H6-500343 A.
Patent literature No. 3: WO 96/011897 A.
Patent literature No. 4: DE 4006921 A.

SUMMARY OF INVENTION

Technical Problem

A first object of the invention is to provide a liquid crystal compound satisfying at least one of physical properties such as a high stability to light, a high clearing point, a low minimum temperature of a liquid crystal phase, a small viscosity, a suitable optical anisotropy, a large dielectric anisotropy, a suitable elastic constant and an excellent compatibility with other liquid crystal compounds, in particular, to provide a compound having a large dielectric anisotropy. A second object is to provide a liquid crystal composition that contains the compound and satisfies at least one of physical properties such as a high maximum temperature of a nematic phase, a low minimum temperature of the nematic phase, a small viscosity, a suitable optical anisotropy, a large dielectric anisotropy and a suitable elastic constant. The object is to provide a liquid crystal composition having a suitable balance regarding at least two of the physical properties. A third object is to provide a liquid crystal display device that includes the composition and has a wide temperature range in which a device can be used, a short response time, a large voltage holding ratio, a low threshold voltage, a large contrast ratio and a long service life.

Solution to Problem

The invention concerns a compound represented by formula (1), a liquid crystal composition containing the compound, and a liquid crystal display device including the composition:

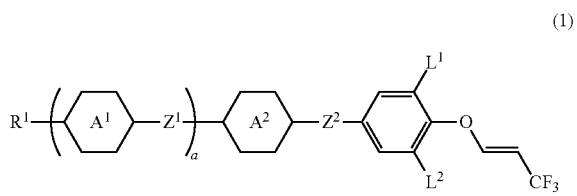

(1)

wherein, in formula (1),
$R^1$ is alkyl having 1 to 10 carbons, and in the alkyl, at least one of —$CH_2$— may be replaced by —O—, and at least one of —$CH_2CH_2$— may be replaced by —CH=CH—, and in the groups, at least one of hydrogen may be replaced by halogen;
ring $A^1$ and ring $A^2$ are independently 1,4-cyclohexylene, 1,4-cyclohexenylene, 1,4-phenylene, 1,4-phenylene in which at least one of hydrogen is replaced by halogen, tetrahydropyran-2,5-diyl, pyrimidine-2,5-diyl, pyridine-2,5diyl, 1,3-dioxane-2,5-diyl or 2,6,7-trioxabicyclo[2.2.2]octane-1,4-diyl;
$Z^1$ and $Z^2$ are independently a single bond, —$CH_2CH_2$—, —C≡C—, —CH=CH—, —$CF_2O$—, —$CH_2O$—, or —COO—;
$L^1$ and $L^2$ are independently hydrogen or halogen; and
a is 0, 1, 2 or 3. However, when a is 0, $Z^2$ is —$CF_2O$—.

The invention also concerns a liquid crystal composition containing the compound.

The invention further concerns a liquid crystal display device including the composition.

Advantageous Effects of Invention

A first advantage of the invention is to provide a liquid crystal compound satisfying at least one of physical properties such as a high stability to light, a high clearing point, a low minimum temperature of a liquid crystal phase, a small viscosity, a suitable optical anisotropy, a large dielectric anisotropy, a suitable elastic constant and an excellent compatibility with other liquid crystal compounds, in particular, to provide a compound having a large dielectric anisotropy. A second advantage is to provide a liquid crystal composition that contains the compound and satisfies at least one of physical properties such as a high maximum temperature of a nematic phase, a low minimum temperature of the nematic phase, a small viscosity, a suitable optical anisotropy, a large dielectric anisotropy and a suitable elastic constant. A third advantage is to provide a liquid crystal display device that includes the composition and has a wide temperature range in which the device can be used, a short response time, a large voltage holding ratio, a low threshold voltage, a large contrast ratio and a long service life.

DESCRIPTION OF EMBODIMENTS

Usage of terms herein is as described below. A liquid crystal compound is a generic term for a compound having a liquid crystal phase such as a nematic phase and a smectic phase, and a compound that has no liquid crystal phase, but is added for the purpose of adjusting physical properties of a composition, such as a maximum temperature, a minimum temperature, viscosity, and dielectric anisotropy. The compounds have a six-membered ring such as 1,4-cyclohexylene or 1,4-phenylene, and a rod-like molecular structure. A liquid crystal composition is prepared by mixing such liquid crystal compounds. A ratio (content) of the liquid crystal compound is expressed in terms of weight percentage (% by weight) based on the weight of the liquid crystal composition. An additive such as a polymerizable compound, a polymerization initiator, an optically active compound, an antioxidant, an ultraviolet light absorber, a light stabilizer, a heat stabilizer, a defoaming agent or a dye is added to the composition, when necessary. A ratio of the additive (an amount of addition) is expressed in terms of weight percent (% by weight) based on the weight of the liquid crystal composition in a manner similar to the ratio of the liquid crystal compounds. Parts per million by weight (ppm) may be occasionally used. A Liquid crystal display device is a generic term for a liquid crystal display panel and a liquid crystal display module. The liquid crystal compound, the liquid crystal composition and the liquid crystal display device may be occasionally abbreviated as "compound," "composition" and "device," respectively. A clearing point is a transition temperature between the liquid crystal phase and an isotropic phase in the liquid crystal compound. A minimum temperature of the liquid crystal phase is a transition temperature between a solid and the liquid crystal phase (a smectic phase, a nematic phase or the like) in the liquid crystal compound. A maximum temperature of the nematic phase is a transition temperature between the nematic phase and the isotropic phase in the liquid crystal composition, and may be occasionally abbreviated as a maximum temperature. A minimum temperature of the nematic phase may be occasionally abbreviated as a minimum temperature.

A compound represented by formula (1) may be occasionally abbreviated as compound (1). The abbreviation may apply also to a compound represented by formula (2) and so forth. In formula (1) to formula (15), a symbol $A^1$, $B^1$, $C^1$ or the like surrounded by a hexagonal shape corresponds to ring $A^1$, ring $B^1$, ring $C^1$ or the like, respectively. A symbol of a terminal group $R^{11}$ is used for a plurality of compounds. In the compounds, two groups represented by two of arbitrary $R^{11}$ may be identical or different. In one case, for example, $R^{11}$ of compound (2) is ethyl and $R^{11}$ of compound (3) is ethyl. In another case, $R^{11}$ of compound (2) is ethyl and $R^{11}$ of compound (3) is propyl. The same rule is also applied to a symbol of any other terminal group, ring or the like. When i is 2 in formula (5), two of ring $C^1$ exist. In the compounds, two groups represented by two of ring $C^1$ may be identical or different. The same rule is also applied to two of arbitrary ring $C^1$ when i is larger than 2. The same rule is also applied to a symbol of any other ring, bonding group or the like.

An expression "at least one of "A" may be replaced by "B"" means that a position of "A" is arbitrary when the number of "A" is 1, and positions thereof can be selected without restriction also when the number of "A" is 2 or more. An expression "at least one of A may be replaced by B, C or D" means inclusion of a case when arbitrary A is replaced by B, a case when arbitrary A is replaced by C and a case when arbitrary A is replaced by D, and also a case where a plurality of A are replaced by at least two of B, C or D. For example, alkyl in which at least one of —$CH_2$— may be replaced by —O— or —CH=CH— includes alkyl, alkenyl, alkoxy, alkoxyalkyl, alkoxyalkenyl and alkenyloxyalkyl. In addition, such a case when replacement of two successive —CH$_2$— by —O— results in forming —O—O— is not preferred. In alkyl or the like, a case when replacement of —CH$_2$— of a methyl part (—CH$_2$—H) by —O— results in forming —O—H is not preferred, either.

Then, 2-fluoro-1,4-phenylene means two divalent groups described below. In the chemical formula, fluorine may be leftward (L) or may be rightward (R). The same rule is also applied to an asymmetrical divalent ring such as tetrahydropyran-2,5-diyl.

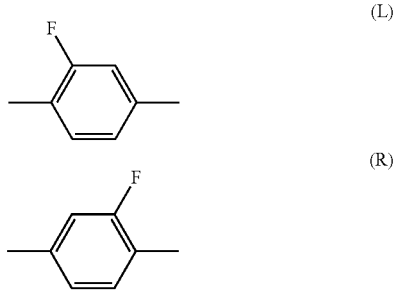

A configuration of 3,3,3-trifluoro-1-propenyloxy includes an E isomer and a Z isomer. In a chemical formula, the configuration of 3,3,3-trifluoro-1-propenyloxy may be the E isomer or the Z isomer. However, the E isomer alone or the Z isomer alone is represented as described below:

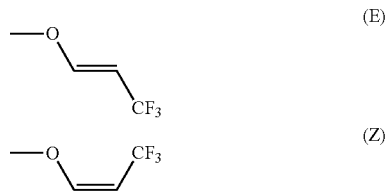

The invention includes the content as described in item 1 to item 14 as described below.

Item 1. A compound represented by formula (1):

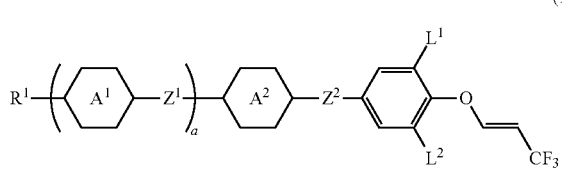

wherein, in formula (1),

R$^1$ is alkyl having 1 to 10 carbons, and in the alkyl, at least one of —CH$_2$— may be replaced by —O—, and at least one of —CH$_2$CH$_2$— may be replaced by —CH=CH—, and in the groups, at least one of hydrogen may be replaced by halogen;

ring A$^1$ and ring A$^2$ are independently 1,4-cyclohexylene, 1,4-cyclohexenylene, 1,4-phenylene, 1,4-phenylene in which at least one of hydrogen is replaced by halogen, tetrahydropyran-2,5-diyl, pyrimidine-2,5-diyl, pyridine-2,5-diyl, 1,3-dioxane-2,5-diyl or 2,6,7-trioxabicyclo[2.2.2]octane-1,4-diyl;

Z$^1$ and Z$^2$ are independently a single bond, —CH$_2$CH$_2$—, —C≡C—, —CH=CH—, —CF$_2$O—, —CH$_2$O— or —COO—;

L$^1$ and L$^2$ are independently hydrogen or halogen; and a is 0, 1, 2 or 3, however, when a is 0, Z$^2$ is —CF$_2$O—.

Item 2. The compound according to item 1, wherein, in formula (1) according to item 1, R$^1$ is alkyl having 1 to 10 carbons or alkenyl having 2 to 10 carbons;

ring A$^1$ and ring A$^2$ are independently 1,4-cyclohexylene, 1,4-phenylene, 2-fluoro-1,4-phenylene, 2,6-difluoro-1,4-phenylene, 2-chloro-1,4-phenylene, 2-chloro-6-fluoro-1,4-phenylene, 2,6-dichloro-1,4-phenylene, tetrahydropyran-2,5-diyl, 1,3-dioxane-2,5-diyl or 2,6,7-trioxabicyclo[2.2.2]octane-1,4-diyl;

Z$^1$ and Z$^2$ are independently a single bond, —CH$_2$CH$_2$—, —CH=CH—, —CF$_2$O— or —COO—;

L$^1$ and L$^2$ are independently hydrogen, chlorine or fluorine; and a is 1, 2 or 3.

Item 3. The compound according to item 1, represented by formula (1-1):

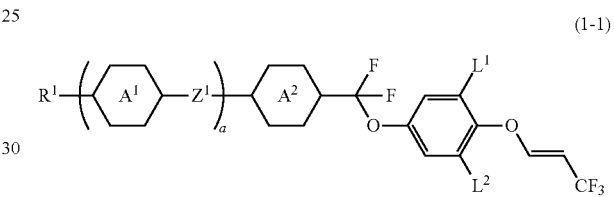

wherein, in formula (1-1),

R$^1$ is alkyl having 1 to 10 carbons or alkenyl having 2 to 10 carbons;

ring A$^1$ and ring A$^2$ are independently 1,4-cyclohexylene, 1,4-phenylene, 2-fluoro-1,4-phenylene, 2,6-difluoro-1,4-phenylene, 2-chloro-1,4-phenylene, 2-chloro-6-fluoro-1,4-phenylene, 2,6-dichloro-1,4-phenylene, tetrahydropyran-2,5-diyl, 1,3-dioxane-2,5-diyl or 2,6,7-trioxabicyclo[2.2.2]octane-1,4-diyl;

Z$^1$ is independently a single bond, —CH$_2$CH$_2$—, —CH=CH—, —CF$_2$O— or —COO—;

L$^1$ and L$^2$ are independently hydrogen, chlorine or fluorine; and a is 0, 1, 2 or 3.

Item 4. The compound according to item 3, wherein, in formula (1-1) according to item 3, R$^1$ is alkyl having 1 to 10 carbons or alkenyl having 2 to 10 carbons; ring A$^1$ and the ring A$^2$ are independently 1,4-cyclohexylene, 1,4-phenylene, 2-fluoro-1,4-phenylene, 2,6-difluoro-1,4-phenylene, 2-chloro-1,4-phenylene, 2-chloro-6-fluoro-1,4-phenylene, tetrahydropyran-2,5-diyl or 1,3-dioxane-2,5-diyl; Z$^1$ is a single bond, —CH$_2$CH$_2$—, —CH=CH— or —CF$_2$O—; L$^1$ and L$^2$ are independently hydrogen, chlorine or fluorine; and a is 1, 2 or 3.

Item 5. The compound according to item 3, wherein, in formula (1-1) according to item 3, R$^1$ is alkyl having 1 to 10 carbons or alkenyl having 2 to 10 carbons; ring A$^1$ and ring A$^2$ are independently 1,4-cyclohexylene, 1,4-phenylene, 2-fluoro-1,4-phenylene, 2,6-difluoro-1,4-phenylene, tetrahydropyran-2,5-diyl or 1,3-dioxane-2,5-diyl; Z$^1$ is a single bond; L$^1$ and L$^2$ are independently hydrogen or fluorine; and a is 1, 2 or 3.

Item 6. The compound according to item 3, wherein, in formula (1-1) according to item 3, R$^1$ is alkyl having 1 to 10 carbons or alkenyl having 2 to 10 carbons; ring A$^1$ and ring A$^2$ are independently 1,4-cyclohexylene, 1,4-phenylene, 2-fluoro-1,4-phenylene, 2,6-difluoro-1,4-phenylene, tetrahydropyran-2,5-diyl or 1,3-dioxane 2,5-diyl; Z$^1$ is a single bond; L$^1$ and L$^2$ are fluorine; and a is 1 or 2.

Item 7. The compound according to item 1, represented by formula (1-2) or (1-3):

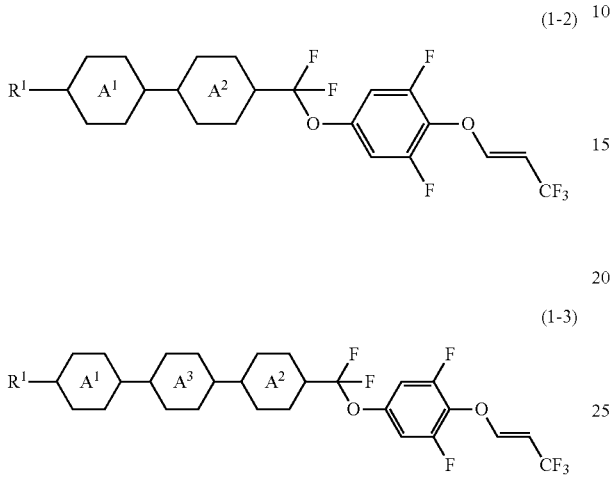

wherein, in formulas (I-2) and (1-3),
R$^1$ is alkyl having 1 to 10 carbons or alkenyl having 2 to 10 carbons;
ring A$^1$ is 1,4-cyclohexylene, 1,4-phenylene, 2-fluoro-1,4-phenylene, 2,6-difluoro-1,4-phenylene, tetrahydropyran-2,5-diyl or 1,3-dioxane 2,5-diyl; and
ring A$^2$ and ring A$^3$ are independently 1,4-cyclohexylene, 1,4-phenylene, 2-fluoro-1,4-phenylene or 2,6-difluoro-1,4-phenylene.

Item 8. A liquid crystal composition, containing at least one of the compounds according to item 1.

Item 9. The liquid crystal composition according to item 8, further containing at least one compound selected from the group of compounds represented by formulas (2) to (4):

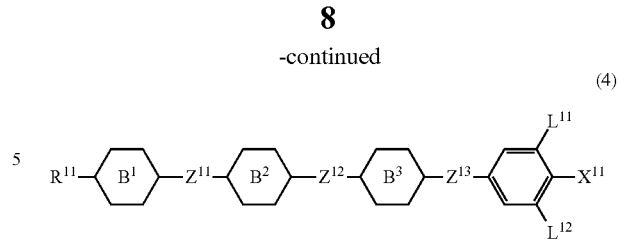

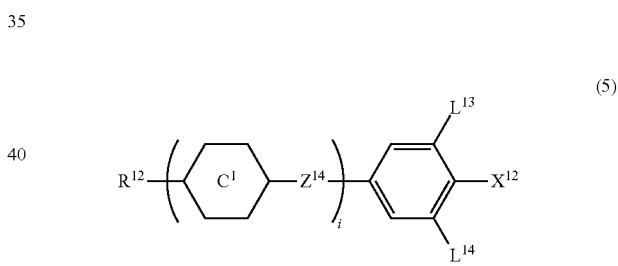

wherein, in formulas (2) to (4),
R$^{11}$ is alkyl having 1 to 10 carbons or alkenyl having 2 to 10 carbons, and in the alkyl and the alkenyl, at least one of hydrogen may be replaced by fluorine and at least one of —CH$_2$— may be replaced by —O—;
X$^{11}$ is fluorine, chlorine, —OCF$_3$, —OCHF$_2$, —CF$_3$, —CHF$_2$, —CH$_2$F, —OCF$_2$CHF$_2$ or —OCF$_2$CHFCF$_3$;
ring B$^1$, ring B$^2$ and ring B$^3$ are independently 1,4-cyclohexylene, 1,4-phenylene in which at least one of hydrogen may be replaced by fluorine, tetrahydropyran-2,5-diyl, 1,3-dioxane-2,5-diyl or pyrimidine-2,5-diyl;
Z$^{11}$, Z$^{12}$ and Z$^{13}$ are independently a single bond, —CH$_2$CH$_2$—, —CH=CH—, —C≡C—, —COO—, —CF$_2$O—, —OCF$_2$—, —CH$_2$O— or —(CH$_2$)$_4$—; and
L$^{11}$ and L$^{12}$ are independently hydrogen or fluorine.

Item 10. The liquid crystal composition according to item 8, further containing at least one compound selected from the group of compounds represented by formula (5):

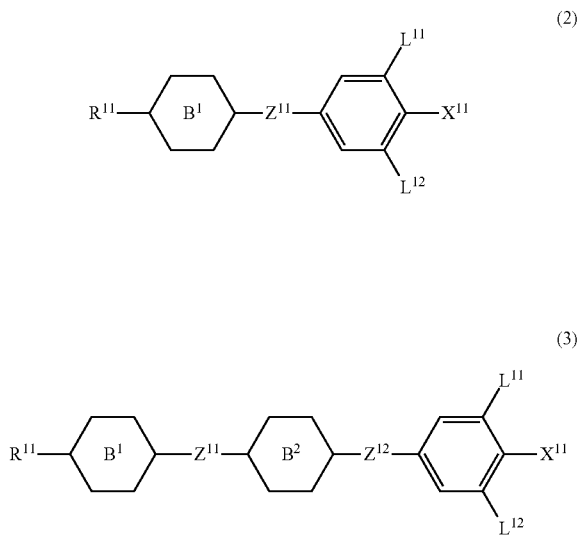

wherein, in formula (5),
R$^{12}$ is alkyl having 1 to 10 carbons or alkenyl having 2 to 10 carbons, and in the alkyl and the alkenyl, at least one of hydrogen may be replaced by fluorine and at least one of —CH$_2$— may be replaced by —O—;
X$^{12}$ is —C≡N or —C≡C—C≡N;
ring C$^1$ is 1,4-cyclohexylene, 1,4-phenylene in which at least one of hydrogen may be replaced by fluorine, tetrahydropyran-2,5-diyl, 1,3-dioxane-2,5-diyl or pyrimidine-2,5-diyl;
Z$^{14}$ is a single bond, —CH$_2$CH$_2$—, —C≡C—, —COO—, —CF$_2$O—, —OCF$_2$— or —CH$_2$O—;
L$^{13}$ and L$^{14}$ are independently hydrogen or fluorine; and
i is 1, 2, 3 or 4.

Item 11. The liquid crystal composition according to item 8, further containing at least one compound selected from the group of compounds represented by formulas (6) to (12):

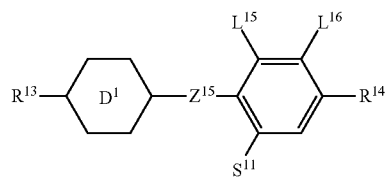 (6)

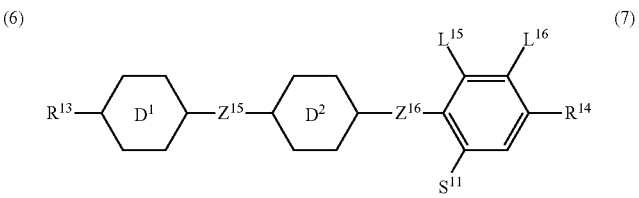 (7)

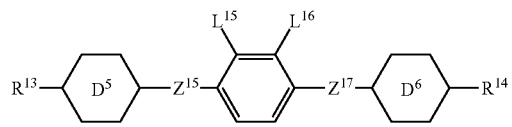 (8)

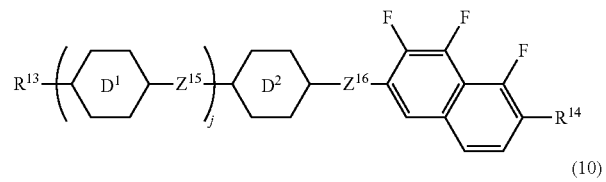 (9)

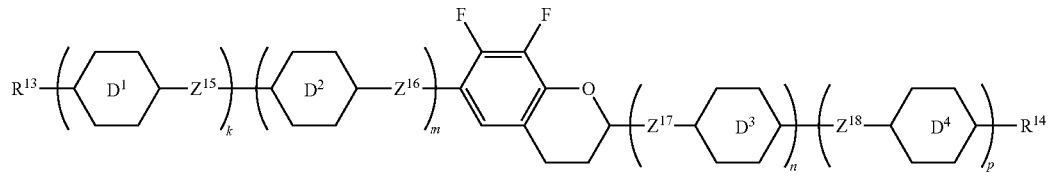 (10)

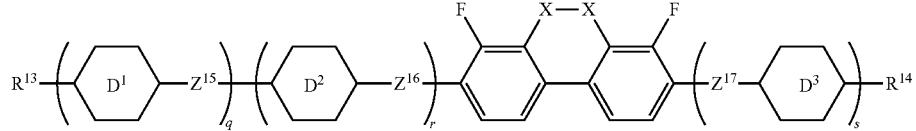 (11)

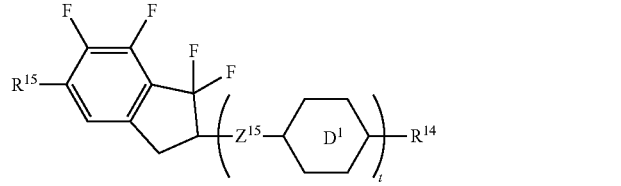 (12)

wherein, in formulas (6) to (12), $R^{13}$ and $R^{14}$ are independently alkyl having 1 to 10 carbons or alkenyl having 2 to 10 carbons, and in the alkyl and the alkenyl, at least one of —$CH_2$— may be replaced by —O— and at least one of hydrogen may be replaced by fluorine;

$R^{15}$ is hydrogen, fluorine, alkyl having 1 to 10 carbons or alkenyl having 2 to 10 carbons, and in the alkyl and the alkenyl, at least one of —$CH_2$— may be replaced by —O— and at least one of hydrogen may be replaced by fluorine;

$S^{11}$ is hydrogen or methyl;

X is —$CF_2$—, —O— or —CHF—;

ring $D^1$, ring $D^2$, ring $D^3$ and ring $D^4$ are independently 1,4-cyclohexylene, 1,4-cyclohexenylene, 1,4-phenylene in which at least one of hydrogen may be replaced by fluorine, tetrahydropyran-2,5-diyl or decahydronaphthalene-2,6-diyl;

ring $D^5$ and ring $D^6$ are independently 1,4-cyclohexylene, 1,4-cyclohexenylene, 1,4-phenylene, tetrahydropyran-2,5-diyl or decahydronaphthalene-2,6-diyl;

$Z^{15}$, $Z^{16}$, $Z^{17}$ and $Z^{18}$ are independently a single bond, —$CH_2CH_2$—, —COO—, —$CH_2O$—, —$OCF_2$— or —$OCF_2CH_2CH_2$—;

$L^{15}$ and $L^{16}$ are independently fluorine or chlorine; and j, k, m, n, p, q, r and s are independently 0 or 1, a sum of k, m, n and p is 1 or 2, a sum of q, r and s is 0, 1, 2 or 3, and t is 1, 2 or 3.

Item 12. The liquid crystal composition according to item 8, further containing at least one compound selected from the group of compounds represented by formulas (13) to (15):

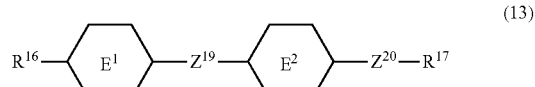 (13)

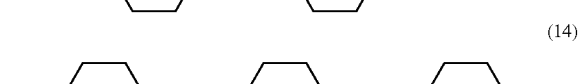 (14)

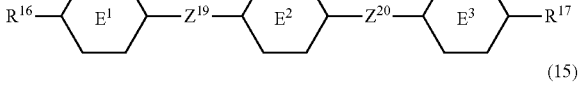 (15)

wherein, in formulas (13) to (15), $R^{16}$ and $R^{17}$ are independently alkyl having 1 to 10 carbons or alkenyl having 2 to 10 carbons, and in the alkyl or the alkenyl, at least one of —$CH_2$— may be replaced by —O— and at least one of hydrogen may be replaced by fluorine;

ring $E^1$, ring $E^2$, ring $E^3$ and ring $E^4$ are independently 1,4-cyclohexylene, 1,4-phenylene, 2-fluoro-1,4-phenylene, 2,5-difluoro-1,4-phenylene or pyrimidine-2,5-diyl; and $Z^{19}$, $Z^{20}$ and $Z^{21}$ are independently a single bond, —CH$_2$CH$_2$—, —CH═CH—, —C≡C— or —COO—.

Item 13. The liquid crystal composition according to item 8, further containing at least one of a polymerizable compound, an optically active compound, an antioxidant, an ultraviolet light absorber, a light stabilizer, a heat stabilizer and a defoaming agent.

Item 14. A liquid crystal display device, including the liquid crystal composition according to item 8.

The compound, liquid crystal composition and liquid crystal display device according to the invention will be explained in the order.

1-1. Compound (1)

Compound (1) of the invention has 3,3,3-trifluoro-1-propenyloxy, and therefore, in particular, has a feature of having a large dielectric anisotropy (Δ∈). Compound (1) of the present invention and preferred examples of compound (1) will be explained. Preferred examples of a terminal group, a ring structure, a bonding group and a substituent in compound (1) are also applied to a subordinate formula of compound (1).

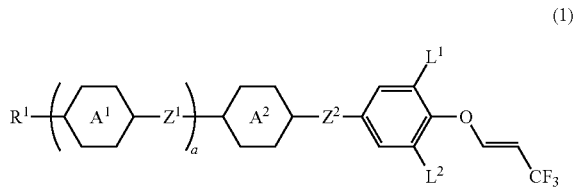

(1)

In formula (1),

R$^1$ is alkyl having 1 to 10 carbons, and in the alkyl, at least one of —CH$_2$— may be replaced by —O—, and at least one of —CH$_2$CH$_2$— may be replaced by —CH═CH—, and in the groups, at least one of hydrogen may be replaced by halogen.

Examples of such a terminal group R$^1$ include alkyl, alkoxy, alkoxyalkyl, alkoxyalkoxy, alkenyl, alkenyloxy, alkenyloxyalkyl and alkoxyalkenyl. In the groups, at least one of hydrogen may be replaced by halogen. Preferred halogen is fluorine and chlorine. Further preferred halogen is fluorine. The groups have a straight chain or a branched chain, and do not include a cyclic group such as cyclohexyl. In the groups, the straight chain is preferred to the branched chain.

A preferred configuration of —CH═CH— in alkenyl depends on a position of a double bond. A trans configuration is preferred in alkenyl having the double bond in an odd-numbered position, such as —CH═CHCH$_3$, —CH═CHC$_2$H$_5$, —CH═CHC$_3$H$_7$, —CH═CHC$_4$H$_9$, —C$_2$H$_4$CH═CHCH$_3$ and —C$_2$H$_4$CH═CHC$_2$H$_5$. A cis configuration is preferred in alkenyl having the double bond at an even-numbered position, such as —CH$_2$CH═CHCH$_3$, —CH$_2$CH═CHC$_2$H$_5$ and —CH$_2$CH═CHC$_3$H$_7$. The alkenyl compound having the preferred configuration has a high clearing point or a wide temperature range of the liquid crystal phase. A detailed description is found in Mol. Cryst. Liq. Cryst., 1985, 131, 109 and Mol. Cryst. Liq. Cryst., 1985, 131, 327.

Specific examples of alkyl include —CH$_3$, —C$_2$H$_5$, —C$_3$H$_7$, —C$_4$H$_9$, —C$_5$H$_{11}$, —C$_6$H$_{13}$ and —C$_7$H$_{15}$.

Specific examples of alkoxy include —OCH$_3$, —OC$_2$H$_5$, —OC$_3$H$_7$, —OC$_4$H$_9$, —OC$_5$H$_{11}$, —OC$_6$H$_{13}$ and —OC$_7$H$_{15}$.

Specific examples of alkoxyalkyl include —CH$_2$OCH$_3$, —CH$_2$OC$_2$H$_5$, —CH$_2$OC$_3$H$_7$, —(CH$_2$)$_2$—OCH$_3$, —(CH$_2$)$_2$—OC$_2$H$_5$, —(CH$_2$)$_2$—OC$_3$H$_7$, —(CH$_2$)$_3$—OCH$_3$, —(CH$_2$)$_4$—OCH$_3$ and —(CH$_2$)$_5$—OCH$_3$.

Specific examples of alkenyl include —CH═CH$_2$, —CH═CHCH$_3$, —CH$_2$CH═CH$_2$, —CH═CHC$_2$H$_5$, —CH$_2$CH═CHCH$_3$, —(CH$_2$)$_2$—CH═CH$_2$, —CH═CHC$_3$H$_7$, —CH$_2$CH═CHC$_2$H$_5$, —(CH$_2$)$_2$—CH═CHCH$_3$ and —(CH$_2$)$_3$—CH═CH$_2$.

Specific examples of alkenyloxy include —OCH$_2$CH═CH$_2$, —OCH$_2$CH═CHCH$_3$ and —OCH$_2$CH═CHC$_2$H$_5$.

Specific examples of alkyl in which at least one of hydrogen is replaced by halogen include —CH$_2$F, —CHF$_2$, —CF$_3$, —(CH$_2$)$_2$—F, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$, —CHFCF$_2$CF$_3$, —(CH$_2$)$_4$—F, —(CF$_2$)$_4$—F, —(CH$_2$)$_5$—F, —(CF$_2$)$_5$—F, —CH$_2$Cl, —CHCl$_2$, —CCl$_3$, —(CH$_2$)$_2$—Cl, —CCl$_2$H$_2$Cl, —CCl$_2$CHCl$_2$, —CH$_2$CCl$_3$, —CCl$_2$CCl$_3$, —(CH$_2$)$_3$—Cl, —(CCl$_2$)$_3$—Cl, —CCl$_2$CHClCCl$_3$, —CHClCCl$_2$CCl$_3$, —(CH$_2$)$_4$—Cl, —(CCl$_2$)$_4$—Cl, —(CH$_2$)$_5$—Cl and —(CCl$_2$)$_5$—Cl.

Specific examples of alkoxy in which at least one of hydrogen is replaced by halogen include —OCH$_2$F, —OCHF$_2$, —OCF$_3$, —O—(CH$_2$)$_2$—F, —OCF$_2$CH$_2$F, —OCF$_2$CHF$_2$, —OCH$_2$CF$_3$, —O—(CH$_2$)$_3$F, —O—(CF$_2$)$_3$—F, —OCF$_2$CHFCF$_3$, —OCHFCF$_2$CF$_3$, —O(CH$_2$)$_4$—F, —O—(CF$_2$)$_4$—F, —O—(CF$_2$)$_5$—F, —O—(CF$_2$)$_5$F, —OCH$_2$Cl, —OCHCl$_2$, —OCCl$_3$, —O—(CH$_2$)$_2$—Cl, —OCCl$_2$CH$_2$Cl, —OCCl$_2$CHCl$_2$, —OCH$_2$CCl$_3$, —O—(CH$_2$)$_3$—Cl, —O—(CCl$_2$)$_3$—Cl, —OCCl$_2$CHClCCl$_3$, —OCHClCCl$_2$CCl$_3$, —O(CH$_2$)$_4$—Cl, —O—(CCl$_2$)$_4$—Cl, —O—(CH$_2$)$_5$—Cl and —O—(CCl$_2$)$_5$—Cl.

Specific examples of alkenyl in which at least one of hydrogen is replaced by halogen include —CH═CHF, —CH═CF$_2$, —CF═CHF, —CH═CHCH$_2$F, —CH═CHCF$_3$, —(CH$_2$)$_2$—CH═CF$_2$, —CH$_2$CH═CHCF$_3$, —CH═CHCF$_2$CF$_3$, —CH═CHCl, —CH═CCl$_2$, —CCl═CHCl, —CH═CHCH$_2$Cl, —CH═CHCCl$_3$, —(CH$_2$)$_2$—CH═CCl$_2$, —CH$_2$CH═CHCCl$_3$ and —CH═CHCCl$_2$CCl$_3$.

Preferred examples of R$^1$ include alkyl having 1 to 10 carbons, alkenyl having 2 to 10 carbons, alkoxy having 1 to 10 carbons, alkyl having 1 to 10 carbons in which one or two of hydrogen are replaced by fluorine or alkenyl having 2 to 10 carbons in which one or two of hydrogen are replaced by fluorine. Further preferred examples of R$^1$ include alkyl having 1 to 7 carbons and alkenyl having 2 to 8 carbons. Most preferred examples of R$^1$ include —CH$_3$, —C$_2$H$_5$, —C$_3$H$_7$, —C$_4$H$_9$, —C$_5$H$_{11}$, —CH═CH$_2$, —CH═CHCH$_3$, —(CH$_2$)$_2$—CH═CH$_2$, —CH$_2$CH═CHC$_2$H$_5$ and —(CH$_2$)$_2$—CH═CHCH$_3$.

In formula (1), ring A$^1$ and ring A$^2$ are independently 1,4-cyclohexylene, 1,4-cyclohexenylene, 1,4-phenylene, 1,4-phenylene in which at least one of hydrogen is replaced by halogen, tetrahydropyran-2,5-diyl, pyrimidine-2,5-diyl, pyridine-2,5-diyl, 1,3-dioxane-2,5-diyl or 2,6,7-trioxabicyclo[2.2.2]octane-1,4-diyl.

Preferred examples of ring A$^1$ and ring A$^2$ include 1,4-cyclohexylene, 1,4-phenylene, 1,4-phenylene in which at least one of hydrogen is replaced by halogen, tetrahydropyran-2,5-diyl, 1,3-dioxane-2,5-diyl and 2,6,7-trioxabicyclo[2.2.2]octane-1,4-diyl. Then, 1,4-cyclohexylene has cis and trans configurations. From a viewpoint of a high maximum temperature, the trans configuration is preferred. Preferred examples of 1,4-phenylene in which at least one of hydrogen is replaced by halogen include compounds represented by ring (A-1) to ring (A-17).

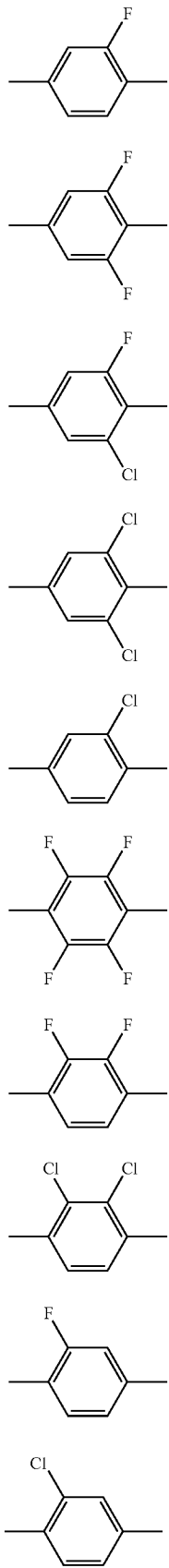
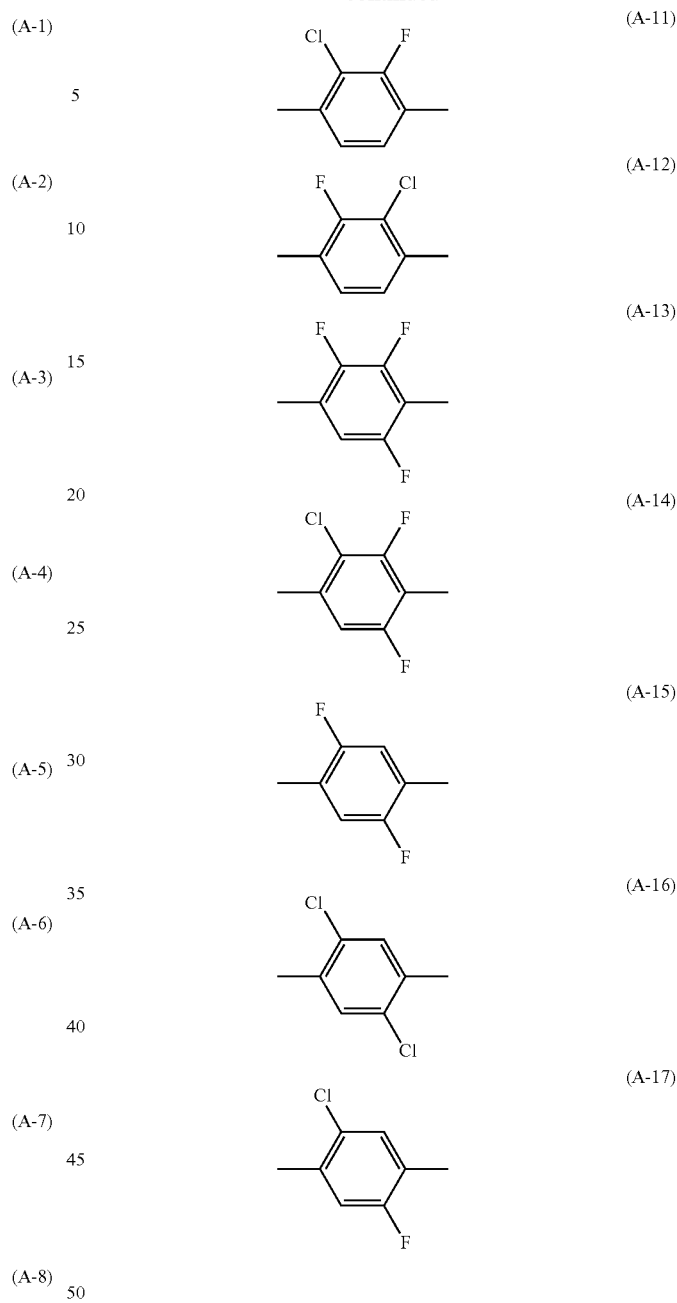

Then, 2-fluoro-1,4-phenylene is left-right asymmetrical. In a chemical formula, a case where fluorine is positioned on a side of a left terminal group (leftward) a case when fluorine is positioned on a side of a right terminal group (rightward) exist. Preferred 2-fluoro-1,4-phenylene is rightward (A-1) in order to increase the dielectric anisotropy. Such description also applies to 2,6-difluoro-1,4-phenylene or the like. More specifically, groups (A-1) to (A-5) are further preferred Further preferred examples of 1,4-phenylene in which at least one of hydrogen is replaced by halogen include 2-fluoro-1,4-phenylene, 2,6-difluoro-1,4-phenylene, 2-chloro-6-fluoro-1,4-phenylene, 2,6-dichloro-1,4-phenylene and 2-chloro-1,4-phenylene. Most preferred examples of 1,4-phenylene in which at least one of hydrogen is replaced by halogen include 2-fluoro-1,4-phenylene and 2,6-difluoro-1,4-phenylene.

Further preferred examples of ring $A^1$ and ring $A^2$ include 1,4-cyclohexylene, 1,4-phenylene, 2-fluoro-1,4-phenylene, 2,6-difluoro-1,4-phenylene, tetrahydropyran-2,5-diyl and 1,3-dioxane 2,5-diyl.

In formula (1), bonding groups $Z^1$ and $Z^2$ are independently a single bond, $-CH_2CH_2-$, $-C\equiv C-$, $-CH=CH-$, $-CF_2O-$, $-CH_2O-$ or $-COO-$. Preferred examples of $Z^1$ and $Z^2$ include a single bond, $-CH_2CH_2-$, $-CH=CH-$, $-COO-$ and $-CF_2O-$. Further preferred examples of $Z^1$ and $Z^2$ include a single bond and $-CF_2O-$. In a preferred combination of $Z^1$ and $Z^2$, $Z^1$ is a single bond and $Z^2$ is $-CF_2O-$.

In formula (1), $L^1$ and $L^2$ are independently hydrogen or halogen. Preferred halogen is fluorine and chlorine. Further preferred halogen is fluorine. In a preferred combination of $L^1$ and $L^2$, one of $L^1$ and $L^2$ is hydrogen, and the other is fluorine. In a further preferred combination of $L^1$ and $L^2$, both of $L^1$ and $L^2$ are fluorine.

In formula (1), a is 0, 1, 2 or 3. However, when a is 0, $Z^2$ is $-CF_2O-$. When a is 0, $Z^2$ is $-CF_2O-$ from a viewpoint of a large dielectric anisotropy. Preferred a is 1, 2 or 3. Further preferred a is 1 or 2. Preferred a is 1 from a viewpoint of a small viscosity. Preferred a is 2 from a viewpoint of a high maximum temperature and a large dielectric anisotropy.

1-2. Physical Properties of Compound (1)

In compound (1), physical properties such as a clearing point, optical anisotropy and dielectric anisotropy can be arbitrarily adjusted by suitably combining kinds of $R^1$, ring $A^1$, ring $A^2$, $Z^1$, $Z^2$, $L^1$ and $L^2$. Compound (1) may contain an isotope such as $^2H$ (deuterium) and $^{13}C$ in an amount larger than an amount of natural abundance because no significant difference is caused in physical properties of the compound. Main effects of a kind of $R^1$ or the like on physical properties of compound (1) will be explained below.

When left terminal group $R^1$ has a straight chain, the temperature range of the liquid crystal phase is wide and the viscosity is small. When $R^1$ has a branched chain, the compatibility with other liquid crystal compounds is good. A compound in which $R^1$ is optically active is useful as a chiral dopant. A reverse twisted domain generated in the liquid crystal display device can be prevented by adding the compound to the composition. A compound in which $R^1$ is not optically active is useful as a component of the composition. When $R^1$ is alkenyl, the preferred configuration depends on the position of the double bond. The alkenyl compound having the preferred configuration has a small viscosity, a high maximum temperature or a wide temperature range of the liquid crystal phase.

When all of ring $A^1$ and ring $A^2$ are 1,4-cyclohexylene, the clearing point is high and the viscosity is small. When at least one of ring $A^1$ and ring $A^2$ is 1,4-phenylene, or 1,4-phenylene in which at least one of hydrogen is replaced by halogen, the optical anisotropy is comparatively large and an orientational order parameter is comparatively large. When all of ring $A^1$ and ring $A^2$ are 1,4-phenylene, 1,4-phenylene in which at least one of hydrogen is replaced by halogen or a combination thereof, the optical anisotropy is particularly large. When at least one of ring $A^1$ and ring $A^2$ is 1,4-phenylene in which at least one of hydrogen is replaced by halogen, tetrahydropyran-2,5-diyl, pyrimidine-2,5-diyl, pyridine-2,5-diyl, 1,3-dioxane-2,5-diyl or 2,6,7-trioxabicyclo[2.2.2]octane-1,4-diyl, the dielectric anisotropy is large.

When bonding group $Z^1$ or $Z^2$ is a single bond, $-CH_2CH_2-$, $-CH=CH-$ or $-CF_2O-$, the viscosity is small. When $Z^1$ or $Z^2$ is $-CH=CH-$ or $-CH_2O-$, the temperature range of the liquid crystal phase is wide, and the elastic constant (K) is large. When $Z^1$ or $Z^2$ is $-CH=CH-$ or the optical anisotropy is large. When $Z^1$ or $Z^2$ is $-CF_2O-$ or $-COO-$, the dielectric anisotropy is large. When $Z^1$ or $Z^2$ is a single bond, $-CH_2CH_2-$ or $-CH_2O-$, the chemical stability is high.

When one of $L^1$ and $L^2$ is fluorine, the dielectric anisotropy is large. When both of $L^1$ and $L^2$ are fluorine, the dielectric anisotropy is particularly large.

As described above, a compound having objective physical properties can be obtained by suitably selecting kinds of the ring structure, the terminal group, the bonding group and so forth. Accordingly, compound (1) is useful as the component of the liquid crystal composition to be used for the liquid crystal display device having a mode such as the PC, TN, STN, ECB, OCB, IPS or VA mode.

1-3. Preferred Compound

Preferred examples of compound (1) include a compound represented by formula (1-1).

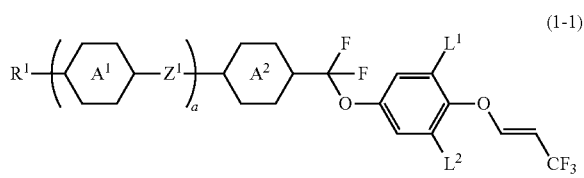

(1-1)

In formula (1-1), $R^1$ is alkyl having 1 to 10 carbons or alkenyl having 2 to 10 carbons;

ring $A^1$ and ring $A^2$ are independently 1,4-cyclohexylene, 1,4-phenylene, 2-fluoro-1,4-phenylene, 2,6-difluoro-1,4-phenylene, 2-chloro-1,4-phenylene, 2-chloro-6-fluoro-1,4-phenylene, 2,6-dichloro-1,4-phenylene, tetrahydropyran-2,5-diyl, 1,3-dioxane-2,5-diyl or 2,6,7-trioxabicyclo[2.2.2]octane-1,4-diyl;

$Z^1$ is independently a single bond, $-CH_2CH_2-$, $-CH=CH-$, $-CF_2O-$ or $-COO-$;

$L^1$ and $L^2$ are independently hydrogen, chlorine or fluorine; and a is 0, 1, 2 or 3.

Preferred examples of compound (1-1) include a compound represented by formula (1-1-1).

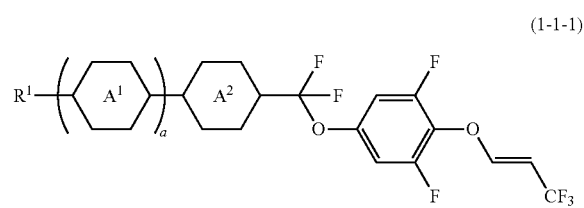

(1-1-1)

In formula (1-1-1), $R^1$ is alkyl having 1 to 10 carbons or alkenyl having 2 to 10 carbons;

ring $A^1$ and ring $A^2$ are independently 1,4-cyclohexylene, 1,4-phenylene, 2-fluoro-1,4-phenylene, 2,6-difluoro-1,4-phenylene, tetrahydropyran-2,5-diyl or 1,3-dioxane-2,5-diyl; and a is 1 or 2.

One of further preferred examples of compound (1-1) includes a compound represented by formula (1-2).

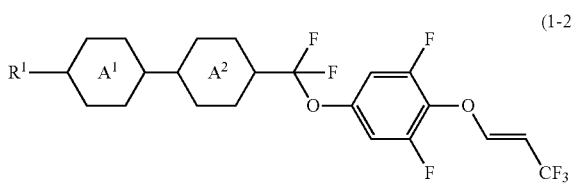

(1-2)

In formula (1-2), $R^1$ is alkyl having 1 to 10 carbons or alkenyl having 2 to 10 carbons; ring $A^1$ is 1,4-cyclohexylene, 1,4-phenylene, 1,3-dioxane-2,5-diyl or tetrahydropyran-2,5-diyl; ring $A^2$ is 1,4-cyclohexylene, 1,4-phenylene, 2-fluoro-1,4-phenylene or 2,6-difluoro-1,4-phenylene.

Most preferred examples include a compound in which, in formula (1-2), $R^1$ is alkyl having 1 to 7 carbons or alkenyl having 2 to 8 carbons; ring $A^1$ is 1,4-cyclohexylene or 1,4-phenylene; and ring $A^2$ is 1,4-cyclohexylene, 1,4-phenylene or 2,6-difluoro-1,4-phenylene.

One of further preferred examples of compound (1-1) includes a compound represented by formula (1-3).

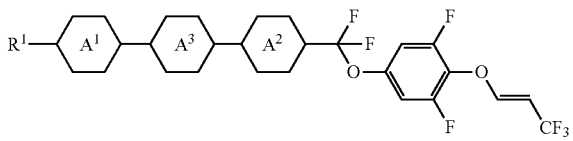

(1-3)

In formula (1-3), $R^1$ is alkyl having 1 to 10 carbons or alkenyl having 2 to 10 carbons; ring $A^1$ is 1,4-cyclohexylene, 1,4-phenylene, 1,3-dioxane-2,5-diyl or tetrahydropyran-2,5-diyl; and ring $A^2$ and ring $A^3$ are independently 1,4-cyclohexylene, 1,4-phenylene, 2-fluoro-1,4-phenylene or 2,6-difluoro-1,4-phenylene.

Most preferred examples include a compound in which, in formula (1-3), $R^1$ is alkyl having 1 to 7 carbons or alkenyl having 2 to 8 carbons; ring $A^1$ is 1,4-cyclohexylene or 1,4-phenylene; and ring $A^2$ and ring $A^3$ are independently 1,4-cyclohexylene, 1,4-phenylene or 2,6-difluoro-1,4-phenylene.

1-4. Synthesis of Compound (1)

A method for synthesizing compound (1) will be explained. Compound (1) can be prepared by suitably combining techniques in synthetic organic chemistry. A method for introducing an objective terminal group, ring and bonding group into a starting material is described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza, in Japanese) (Maruzen Co., Ltd.).

1-4-1. Formation of a Bonding Group

An example of a method for forming a bonding group in compound (1) is as described in a scheme below. In the scheme, $MSG^1$ (or $MSG$) is a monovalent organic group having at least one ring. Monovalent organic groups represented by a plurality of $MSG^1$ (or $MSG^2$) may be identical or different. Compounds (1A) to (1G) correspond to compound (1) or an intermediate of compound (1).

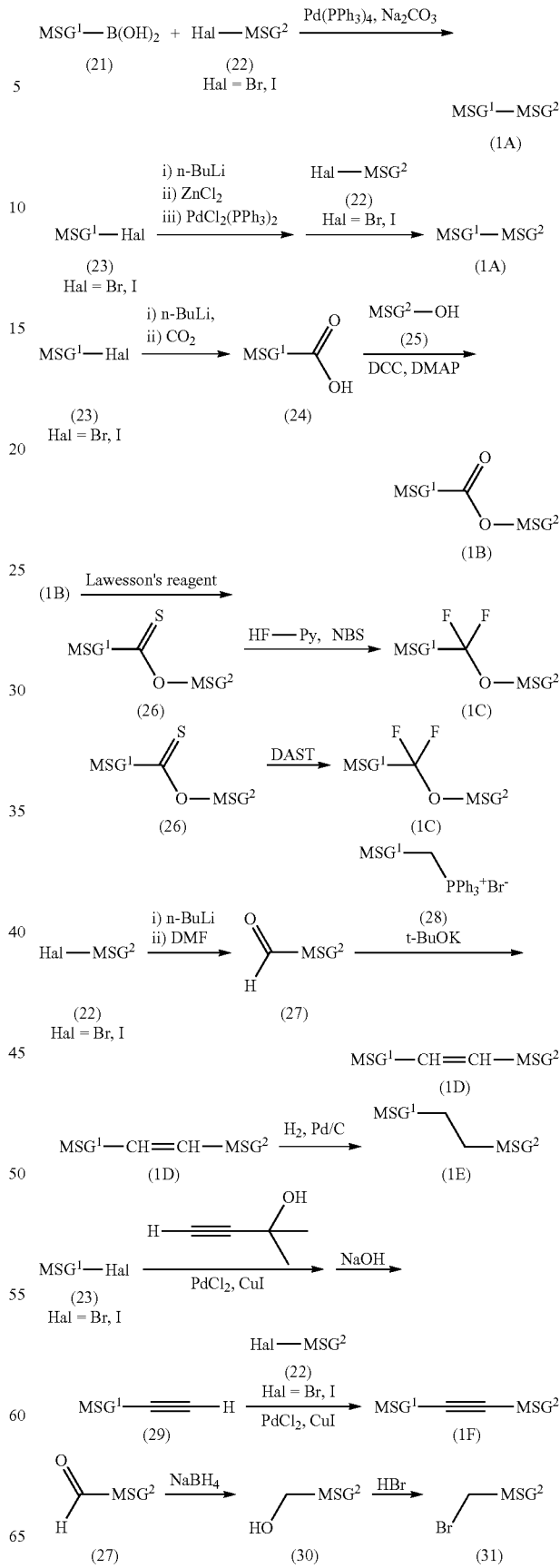

-continued

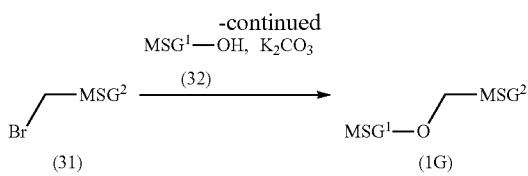

(I) Formation of a Single Bond

Compound (1A) is prepared by allowing arylboronic acid (21) to react with compound (22) in the presence of a carbonate and a tetrakis(triphenylphosphine)palladium catalyst. The compound (1A) is also prepared by allowing compound (23) to react with n-butyllithium and subsequently with zinc chloride, and further with compound (22) in the presence of a dichlorobis(triphenylphosphine)palladium catalyst (II) Formation of —COO—

Carboxylic acid (24) is obtained by allowing compound (23) to react with n-butyl lithium and subsequently with carbon dioxide. Compound (1B) having —COO— is prepared by dehydrating in the presence of 1,3-dicyclohexylcarbodiimide (DDC) and 4-dimethylaminopyridine (DMAP) the carboxylic acid (24) and phenol (25) derived from compound (21).

(III) Formation of —CF$_2$O—

Compound (26) is obtained by sulfurizing compound (1B) with Lawesson's reagent. Compound (1C) having —CF$_2$O— is prepared by fluorinating compound (26) with a hydrogen fluoride-pyridine complex and N-bromosuccinimide (NBS). See M. Kuroboshi et al., Chem. Lett, 1992, 827. Compound (1C) is also prepared by fluorinating compound (26) with (diethylamino)sulfur trifluoride (DAST). See W. H. Bunnelle et al., J. Org. Chem. 1990, 55, 768.

(IV) Formation of —CH═CH—

Aldehyde (27) is obtained by allowing compound (22) to react with n-butyl lithium and subsequently with N,N-dimethylformamide (DMF). Compound (1D) is prepared by allowing phosphorus ylide generated by allowing a phosphonium salt (28) to react with potassium tert-butoxide to react with aldehyde (27). A cis isomer is formed depending on reaction conditions, and therefore the cis isomer is isomerized into a trans isomer, when necessary, according to a known method.

(V) Formation of —CH$_2$CH$_2$—

Compound (1E) is prepared by hydrogenating compound (1D) in the presence of a palladium on carbon catalyst (VI) Formation of —C≡C—

Compound (29) is obtained by allowing compound (23) to react with 2-methyl-3-butyn-2-ol in the presence of a catalyst including dichloropalladium and copper iodide, and then performing deprotection under basic conditions. Compound (1F) is prepared by allowing compound (29) to react with compound (22) in the presence of a catalyst including dichlorobistriphenylphosphine palladium and copper halide.

(VII) Formation of —CH$_2$O—

Compound (30) is obtained by reducing compound (27) with sodium boron hydride. Compound (31) is obtained by brominating the compound (30) with hydrobromic acid or the like. Compound (1G) is prepared by allowing compound (25) to react with compound (32) in the presence of potassium carbonate.

1-4-2. Formation of Ring A$^1$ and Ring A$^2$

With regard to rings such as 1,4-cyclohexylene, 1,4-phenylene, 2-fluoro-1,4-phenylene, 2,6-difluoro-1,4-phenylene, tetrahydropyran-2,5-diyl, 1,3-dioxane-2,5-diyl, pyrimidine-2,5-diyl, pyridine-2,5-diyl and 2,6,7-trioxabicyclo[2.2.2]octane-1,4-diyl, starting materials are commercially available or a synthetic process is well known.

1-4-3. Synthesis Example

An example of a method for synthesizing compound (1) is as described below. Compound (42) is prepared in accordance with the method described in JP 2007-277127 A. Compound (1) is obtained by heating a mixture of compound (42), 1-chloro-3,3,3-trifluoro-1-propene and sodium hydride at 130° C. for 24 hours in an N-methyl-2-pyrrolidone (NMP) solvent. In the compounds, R$^1$, ring A$^1$, ring A$^2$, Z$^1$, Z$^2$, L$^1$, L$^2$ and a are defined in a manner identical with the definitions in item 1 described above.

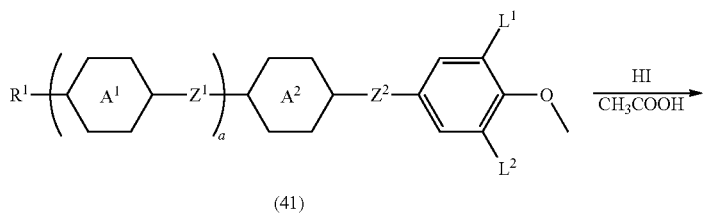

(41)

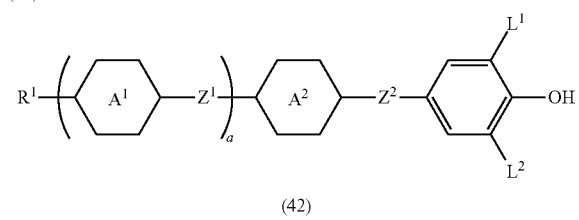

(42)

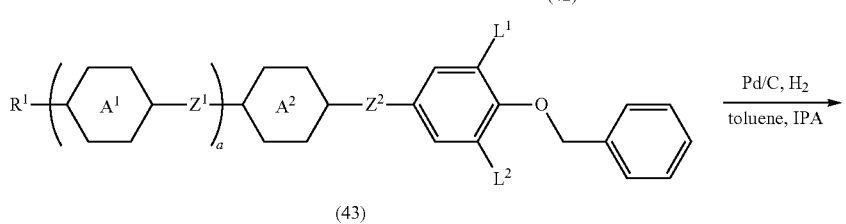

(43)

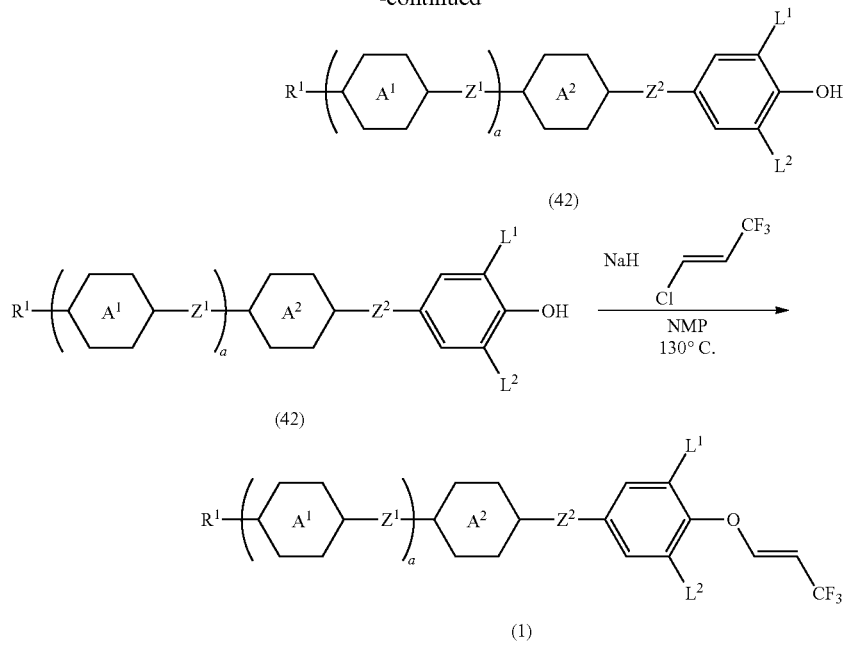

In another method, commercially available compound (44) is used as a raw material. Compound (45) is obtained by allowing the compound to react with 1-chloro-3,3,3-trifluoro-1-propene. According to the bonding group formation methods (I) to (VII), compound (1) is prepared from compound (45). In the compounds, $R^1$, ring $A^1$, ring $A^2$, $Z^1$, $Z^2$, $L^1$, $L^2$ and a are defined in a manner identical with the definitions in item 1 described above.

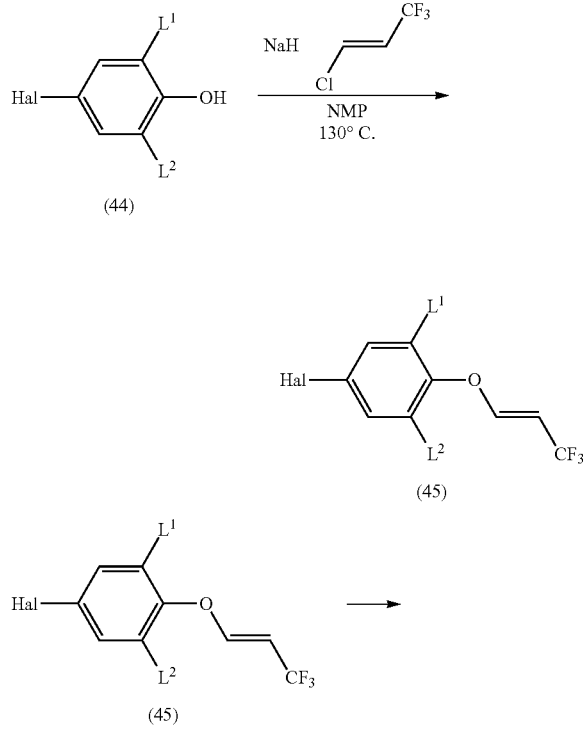

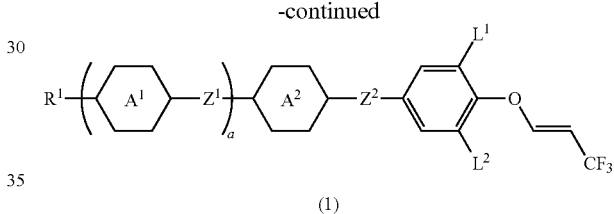

Hal = Br, I

2. Composition (1)

Liquid crystal composition (1) of the invention will be explained. Composition (1) contains at least one compound (1) as component A. Composition (1) may contain two or more kinds of compound (1). Composition (1) may contain only compound (1) as a component of the liquid crystal composition. Composition (1) preferably contains at least one of compound (1) in the range of approximately 1 to approximately 99% by weight in order to develop excellent physical properties. In a composition having a positive dielectric anisotropy, a preferred content of compound (1) is in the range of approximately 5 to approximately 60% by weight. In a composition having a negative dielectric anisotropy, a preferred content of compound (1) is approximately 30% or less by weight. Composition (1) may also contain compound (1) and various kinds of liquid crystal compounds that are not described herein.

A preferred composition contains a compound selected from components B, C, D and E shown below. When composition (1) is prepared, a component thereof can be selected, for example, by taking the dielectric anisotropy of compound (1) into consideration. When a composition having a positive dielectric anisotropy is prepared for a mode such as the TFT, IPS and FFS mode, main components include components A, B and E. When a composition having a positive dielectric anisotropy is prepared for a mode such as the STN or TN mode, main components includes components A, C and E. When a composition having a negative dielectric anisotropy is prepared for a mode such as the VA or PSA mode, main components include components D and E, and component A is added for the purpose of adjusting a voltage-transmittance curve of the device. A composition prepared by suitably selecting components has a high maximum temperature, a low minimum temperature, a small viscosity, a suitable optical anisotropy, a large dielectric anisotropy and a suitable elastic constant Component B includes compounds (2) to (4). Component C includes compound (5). Component D includes compounds (6) to (12). Component E includes compounds (13) to (15). The components will be explained in the order.

Component B includes a compound having a halogen-containing group or a fluorine-containing group at a right terminal. Preferred examples of component B include compounds (2-1) to (2-16), compounds (3-1) to (3-113) and compounds (4-1) to (4-57). In the compounds, $R^{11}$ and $X^{11}$ are defined in a manner identical with the definitions in item 9 described above.

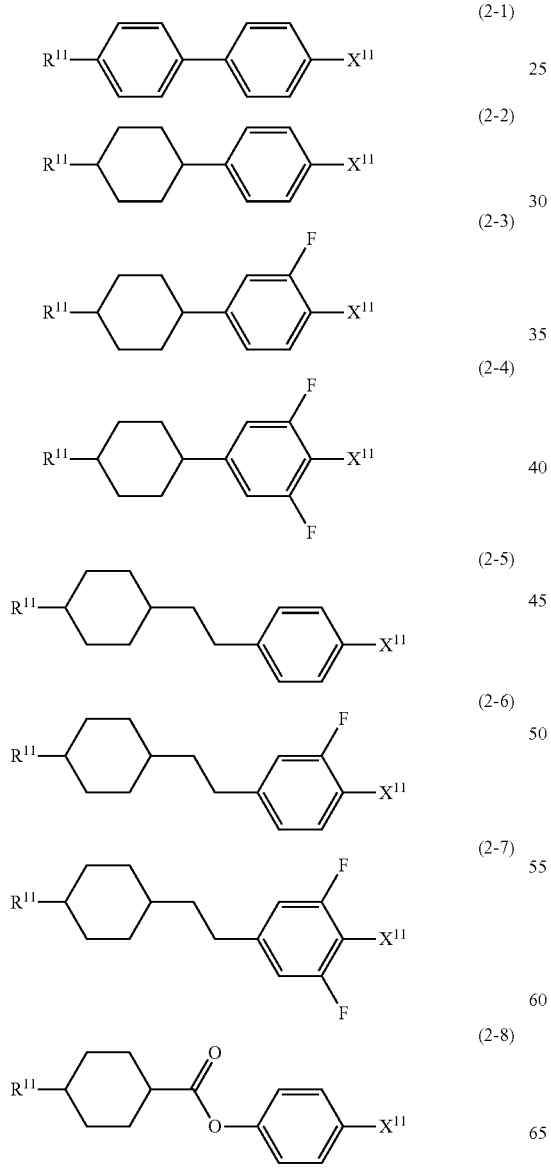
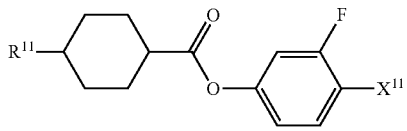
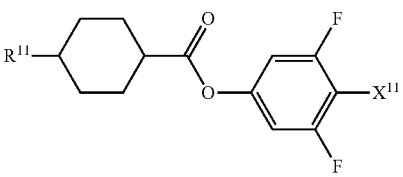
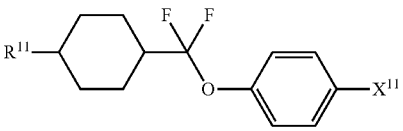
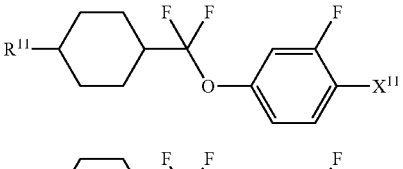
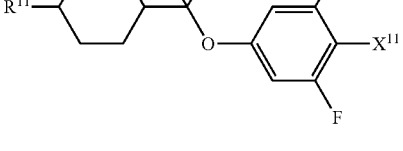
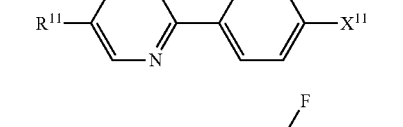
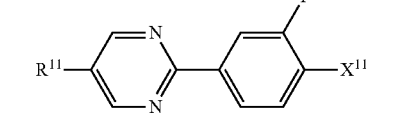
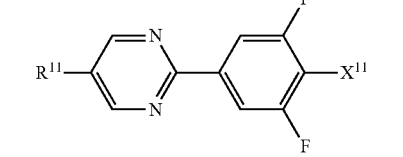
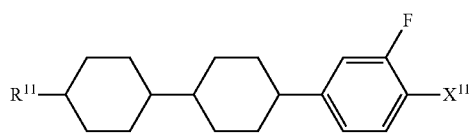
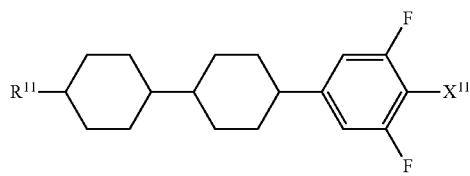

(3-4) 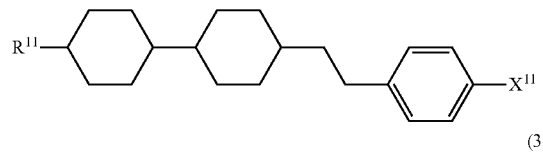
(3-5) 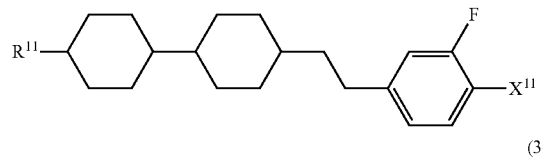
(3-6) 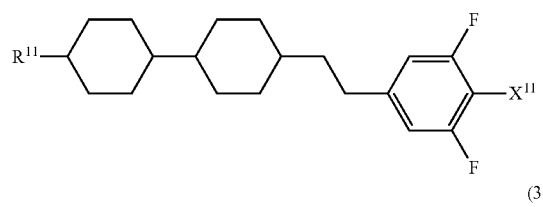
(3-7) 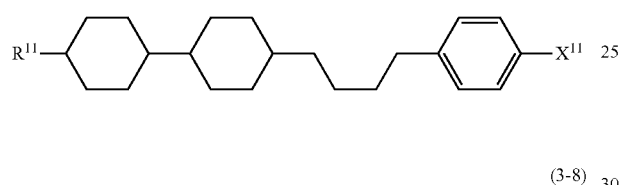
(3-8) 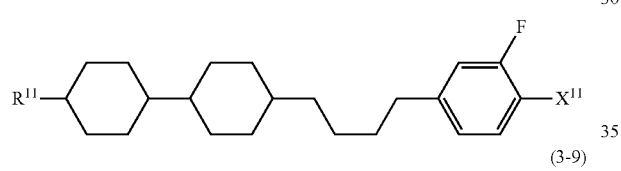
(3-9) 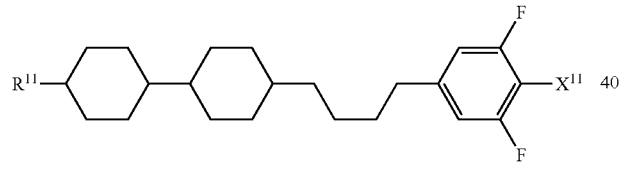
(3-10) 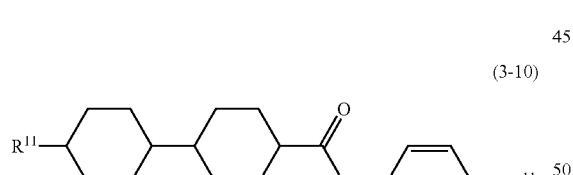
(3-11) 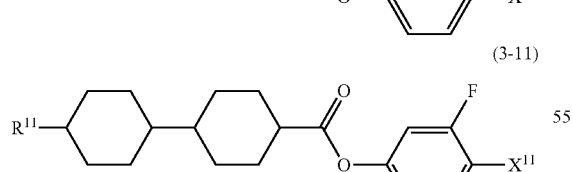
(3-12) 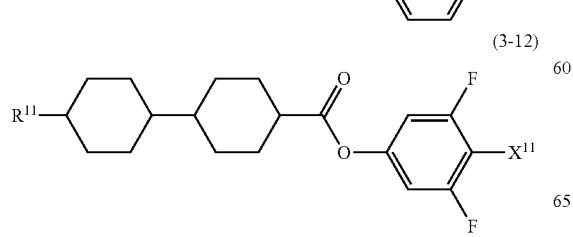
(3-13) 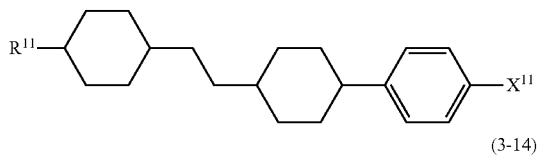
(3-14) 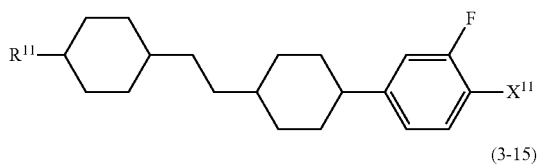
(3-15) 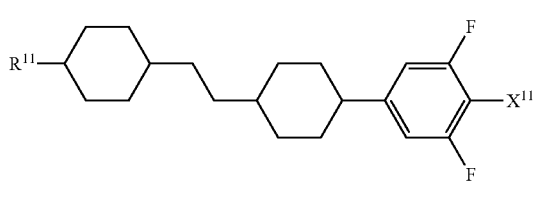
(3-16) 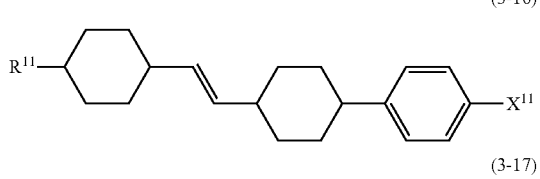
(3-17) 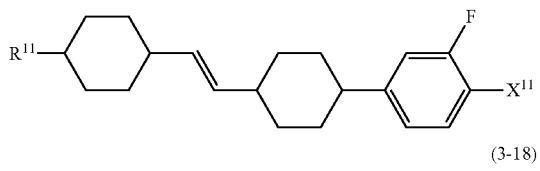
(3-18) 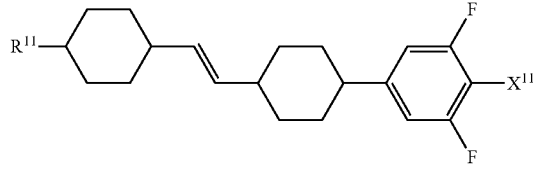
(3-19) 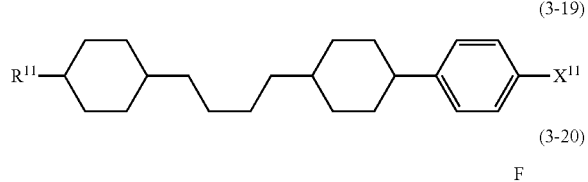
(3-20) 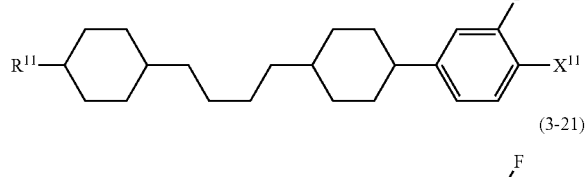
(3-21) 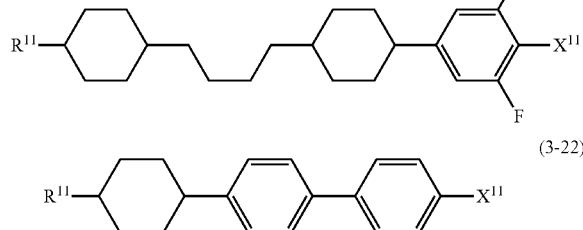
(3-22)

(3-23) 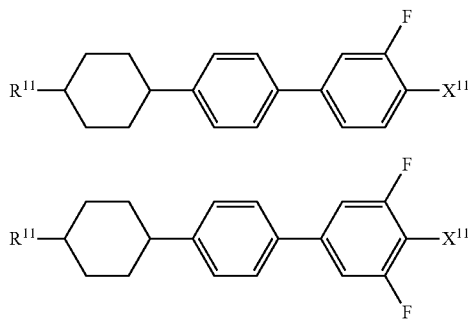
(3-24) 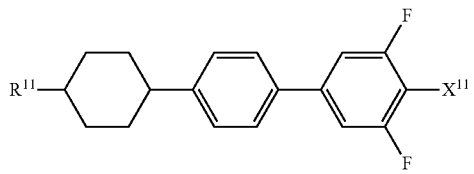
(3-25)
(3-26)
(3-27) 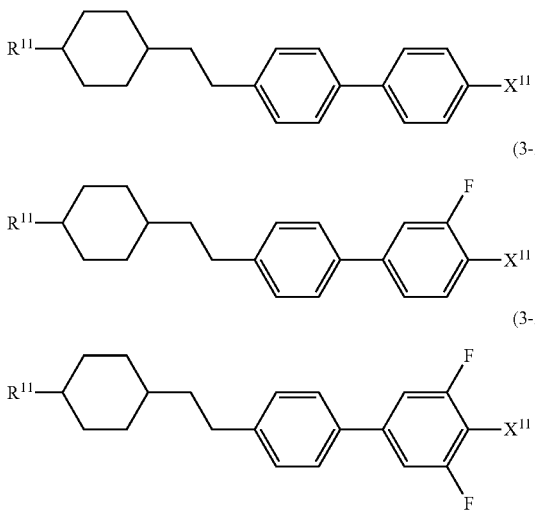
(3-28)
(3-29)
(3-30) 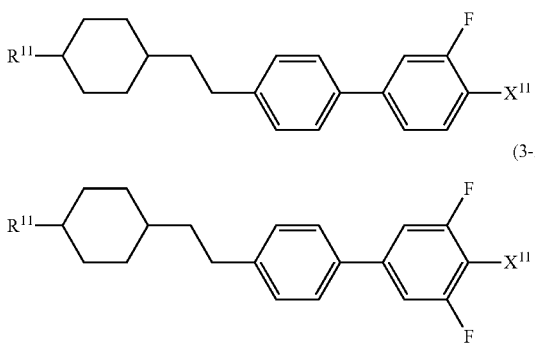
(3-31)
(3-32) 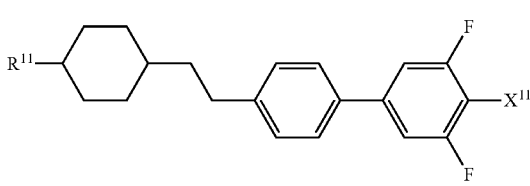
(3-33) 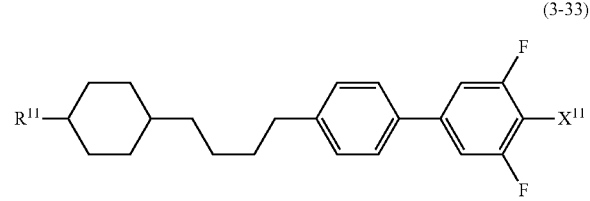
(3-34)
(3-35)
(3-36) 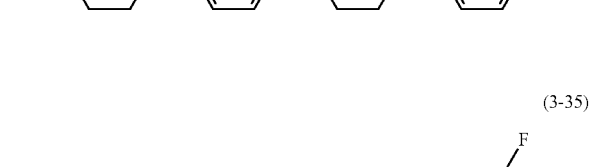
(3-37)
(3-38)
(3-39) 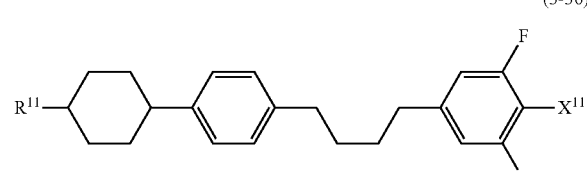
(3-40)
(3-41) 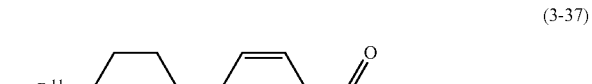

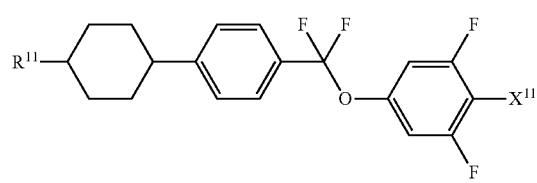 (3-42)
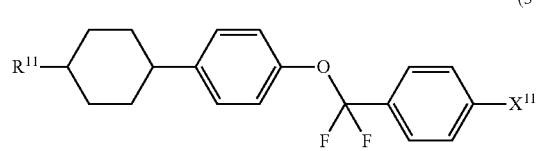 (3-43)
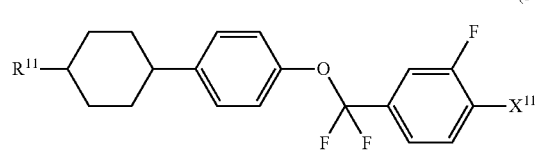 (3-44)
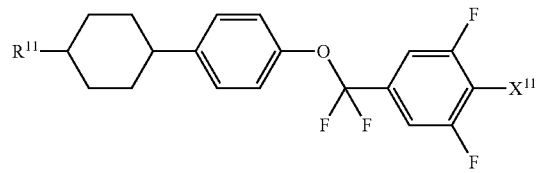 (3-45)
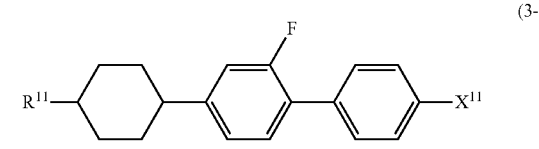 (3-46)
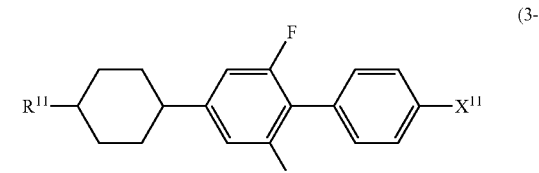 (3-47)
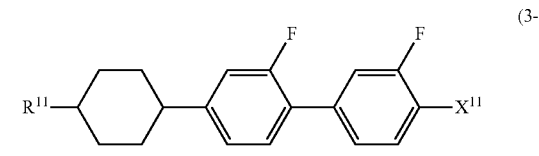 (3-48)
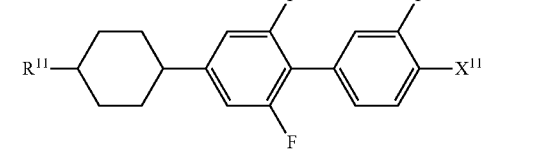 (3-49)
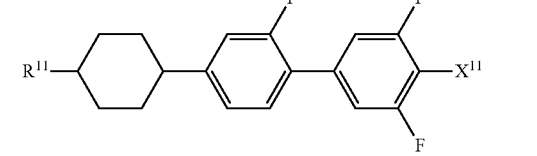 (3-50)
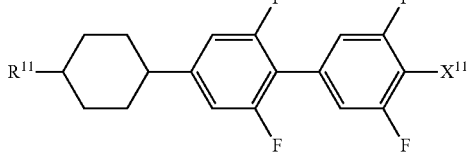 (3-51)
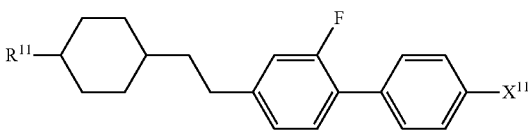 (3-52)
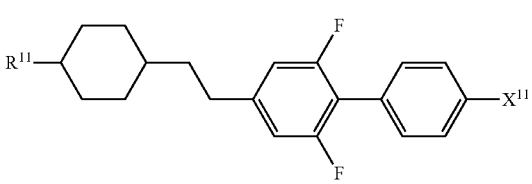 (3-53)
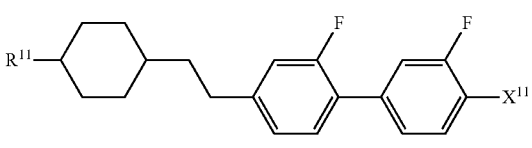 (3-54)
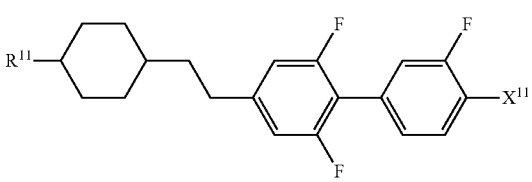 (3-55)
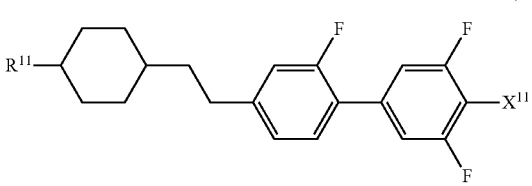 (3-56)
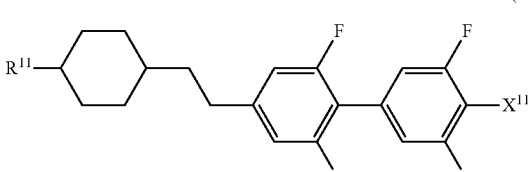 (3-57)
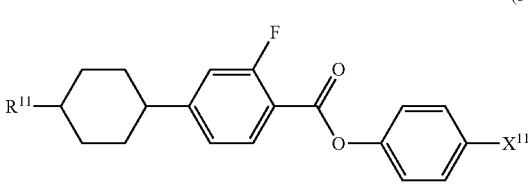 (3-58)

(3-59) 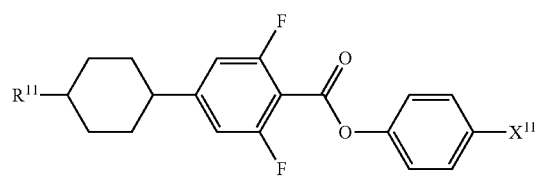
(3-60) 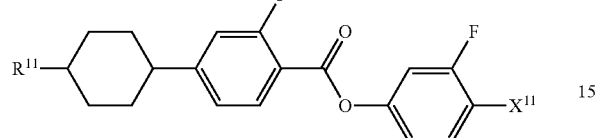
(3-61) 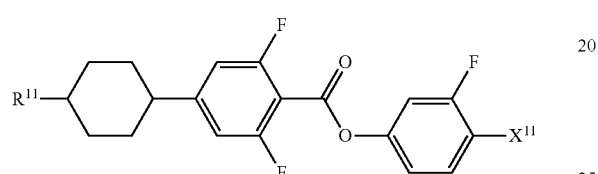
(3-62) 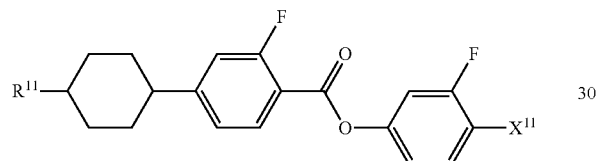
(3-63) 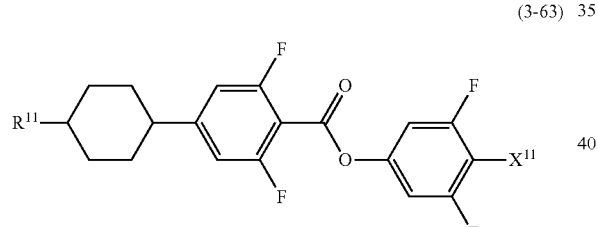
(3-64) 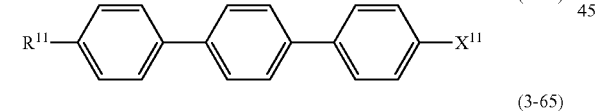
(3-65) 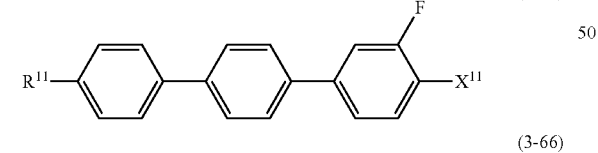
(3-66) 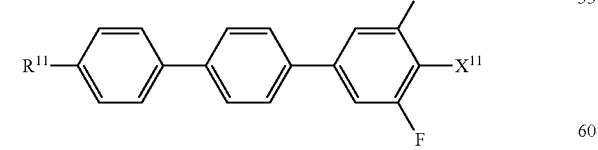
(3-67) 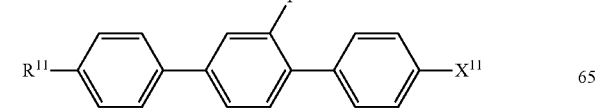
(3-68) 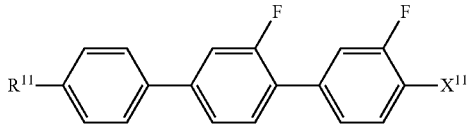
(3-69) 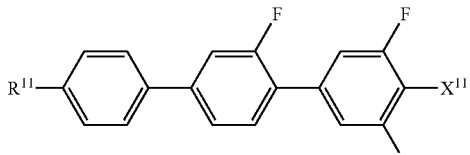
(3-70) 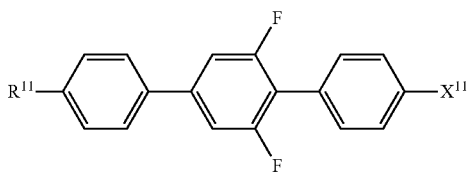
(3-71) 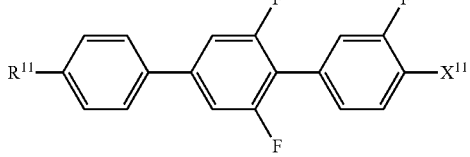
(3-72) 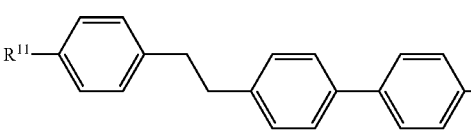
(3-73) 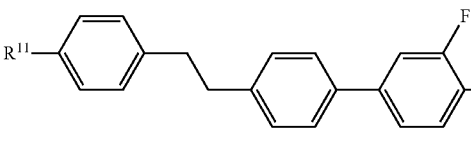
(3-74) 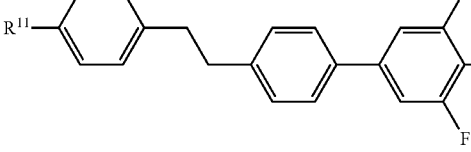
(3-75) 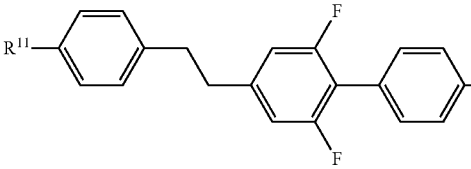
(3-76) 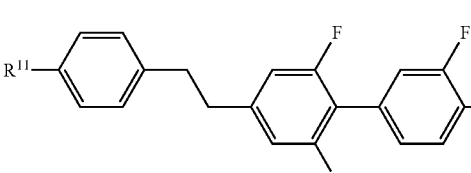

(3-77) 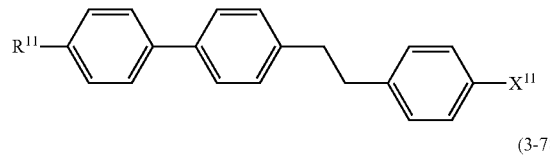
(3-78) 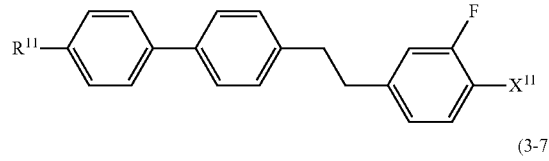
(3-79) 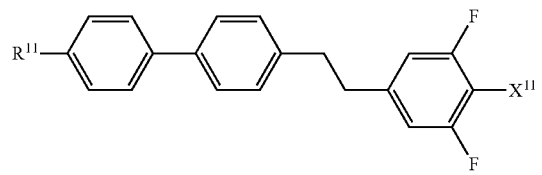
(3-80) 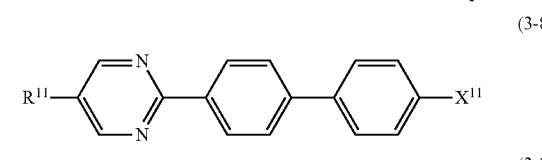
(3-81) 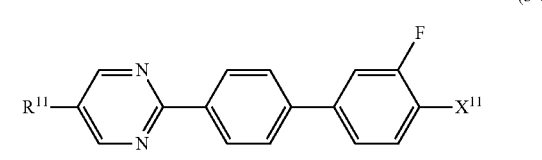
(3-82) 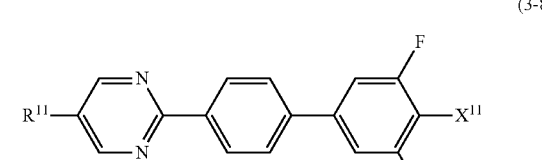
(3-83) 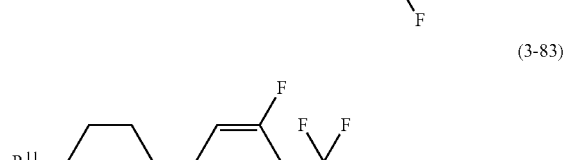
(3-84) 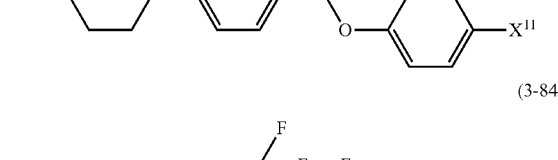
(3-85) 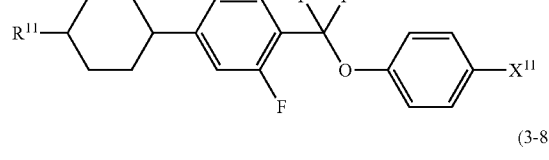
(3-86) 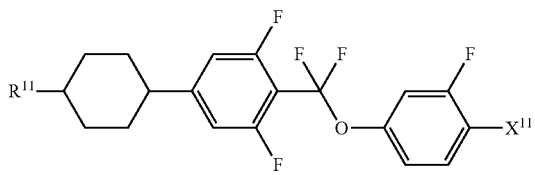
(3-87) 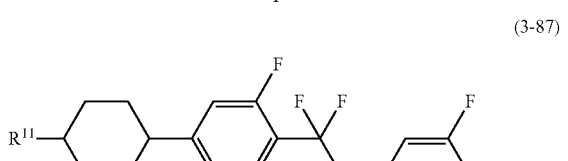
(3-88) 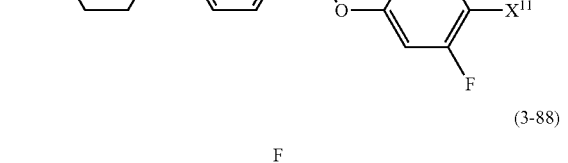
(3-89) 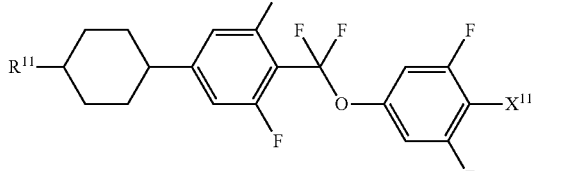
(3-90) 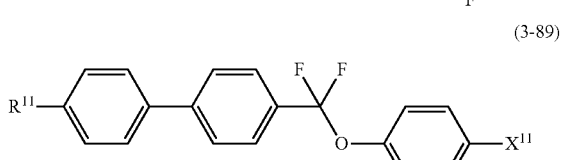
(3-91) 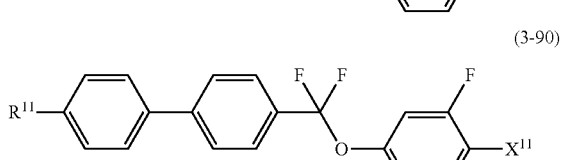
(3-92) 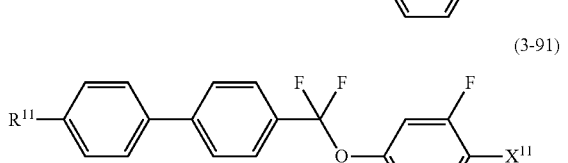
(3-93) 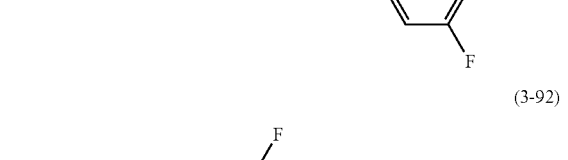

(3-94) 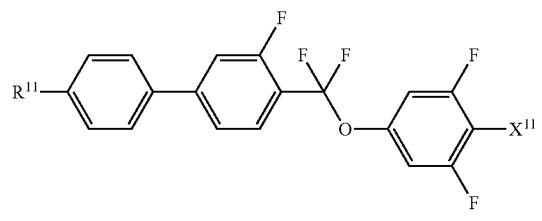
(3-95) 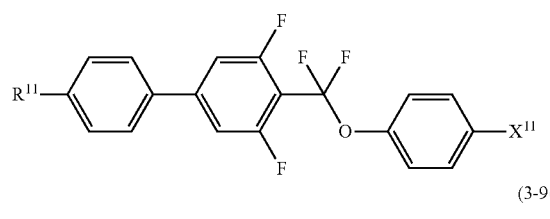
(3-96) 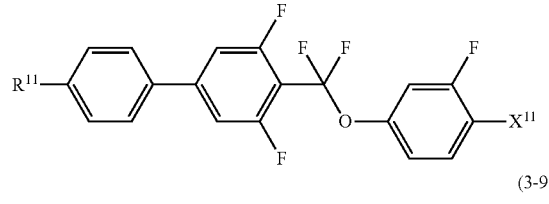
(3-97) 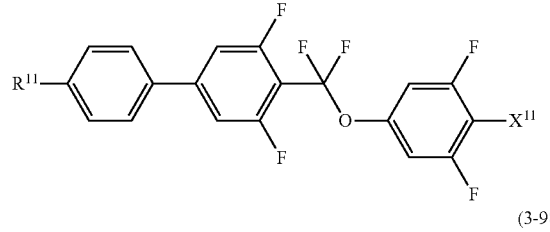
(3-98) 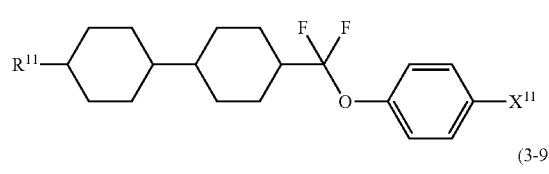
(3-99) 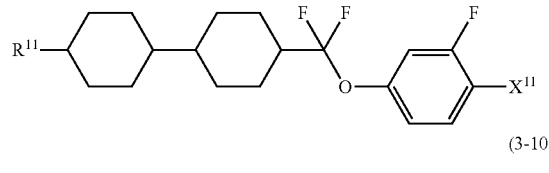
(3-100) 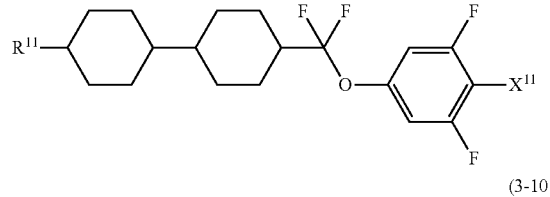
(3-101) 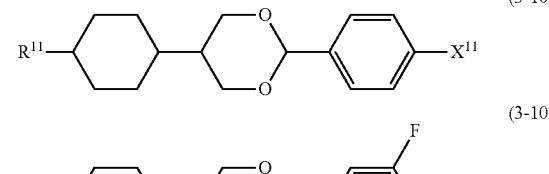
(3-102) 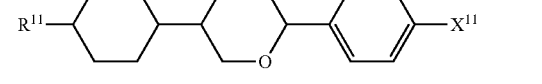
(3-103) 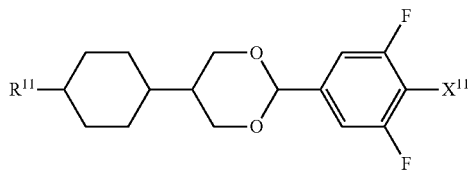
(3-104) 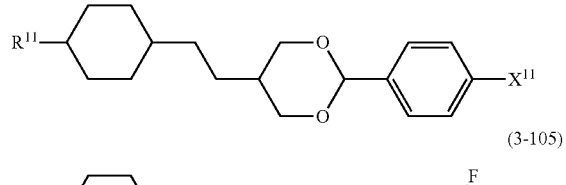
(3-105) 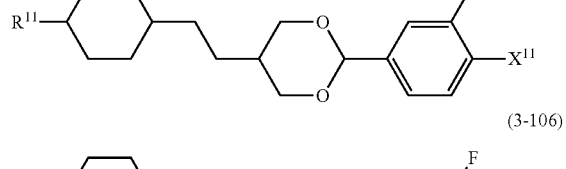
(3-106) 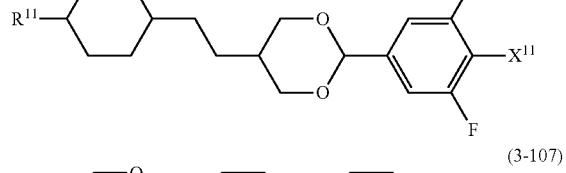
(3-107) 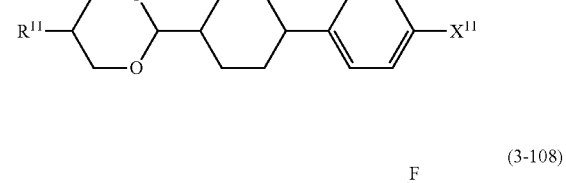
(3-108) 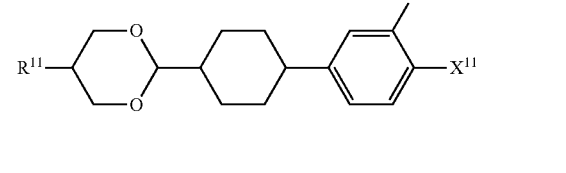
(3-109) 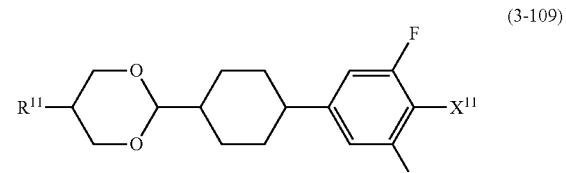
(3-110) 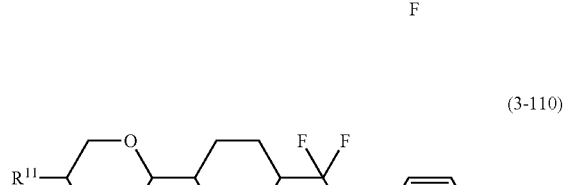
(3-111) 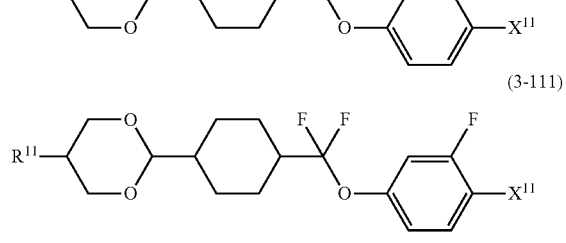

(4-17) 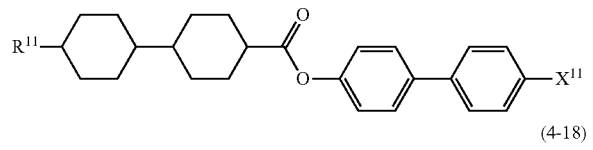
(4-18) 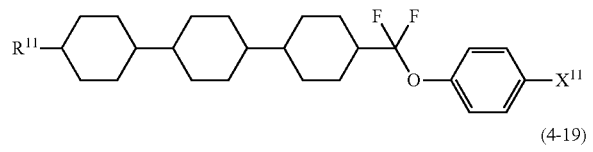
(4-19) 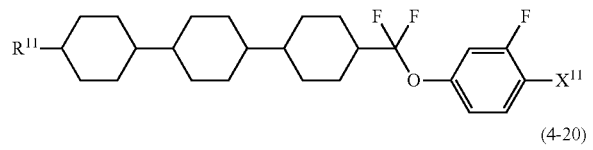
(4-20) 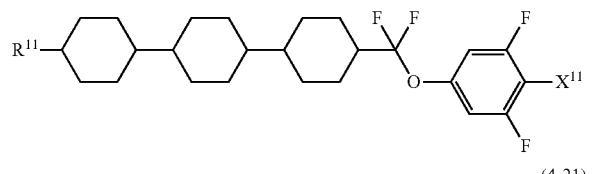
(4-21) 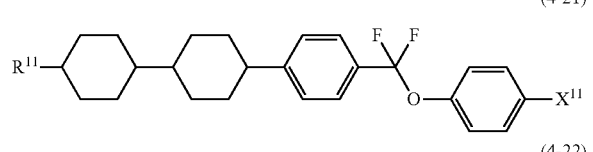
(4-22) 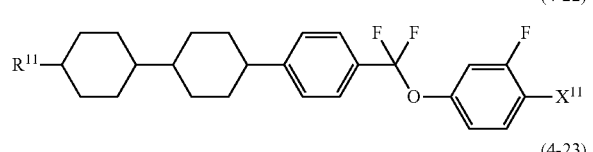
(4-23) 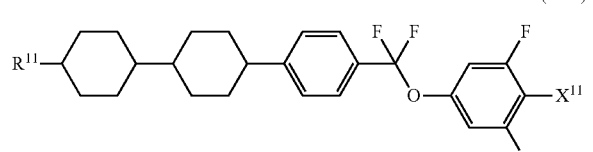
(4-24) 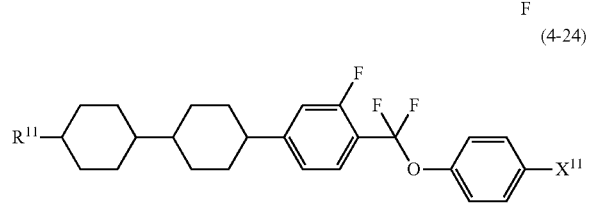
(4-25) 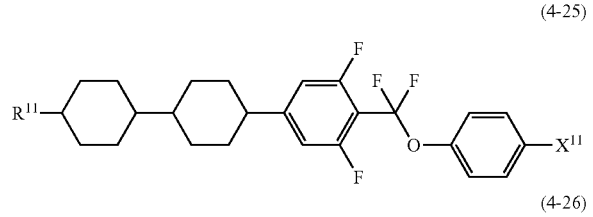
(4-26) 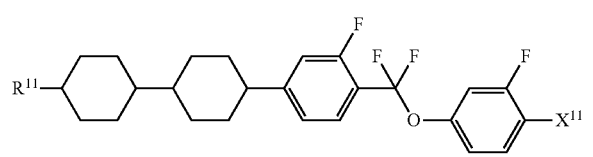
(4-27) 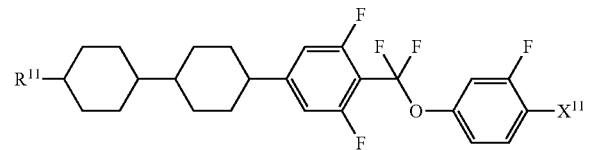
(4-28) 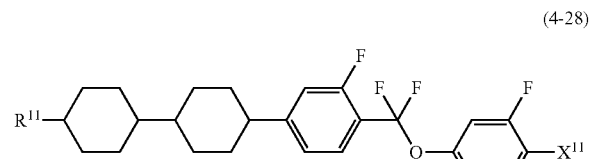
(4-29) 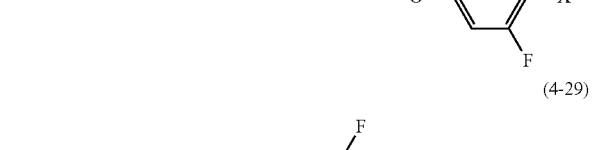
(4-30) 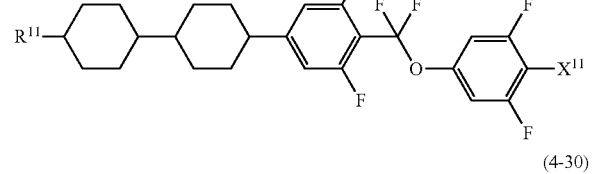
(4-31) 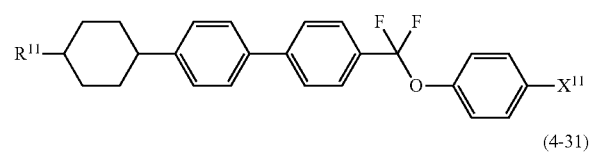
(4-32) 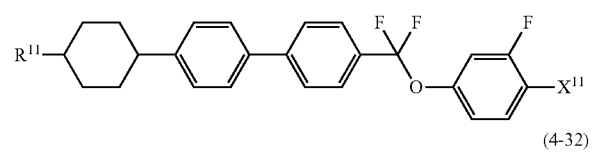
(4-33) 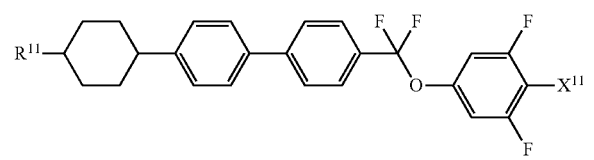
(4-34) 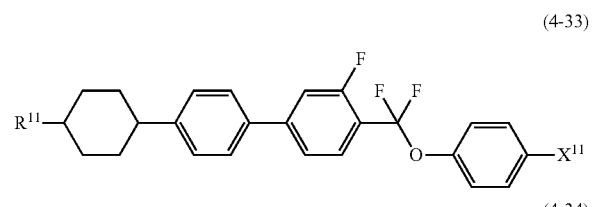
(4-35) 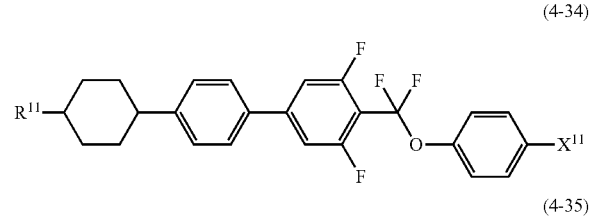
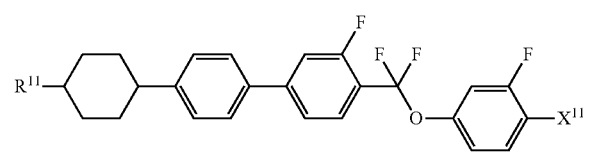

(4-36)
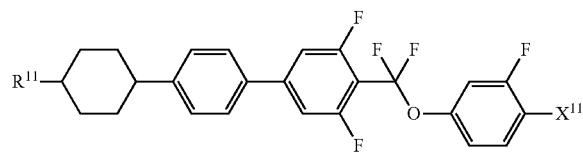
(4-37)
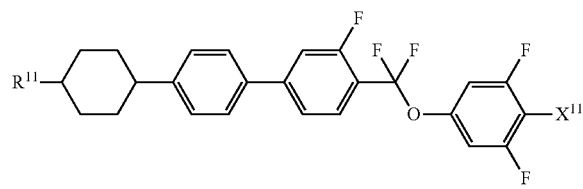
(4-38)
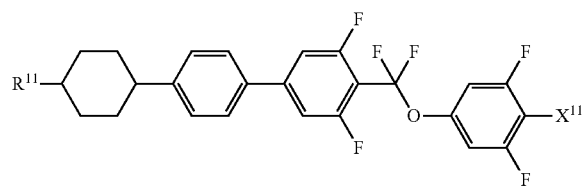
(4-39)
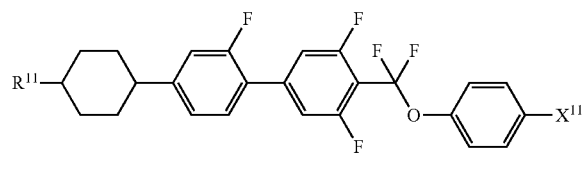
(4-40)
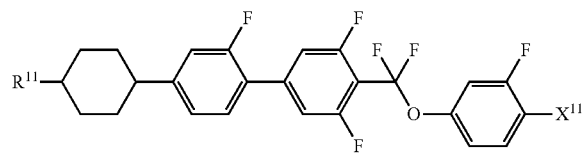
(4-41)
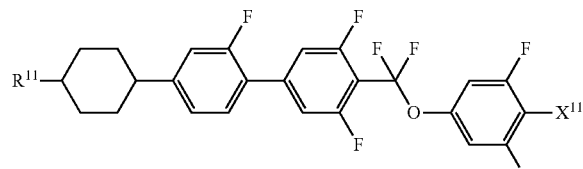
(4-42)
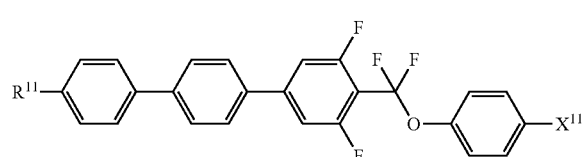
(4-43)
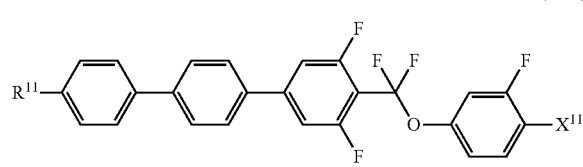
(4-44)
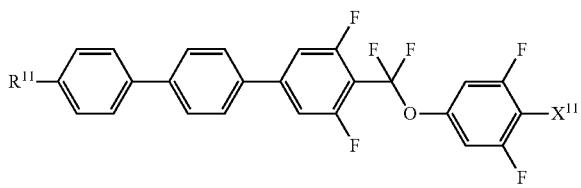
(4-45)
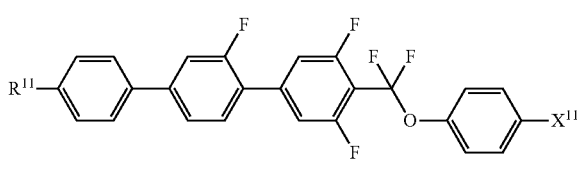
(4-46)
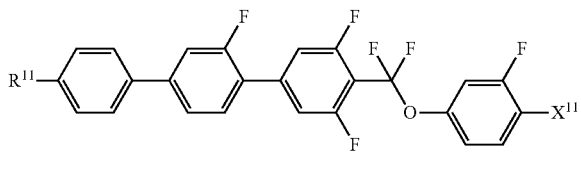
(4-47)
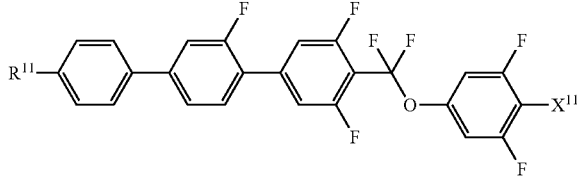
(4-48)
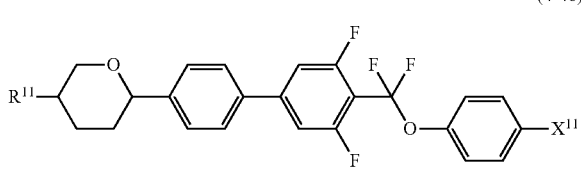
(4-49)
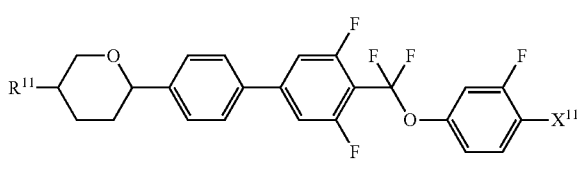
(4-50)
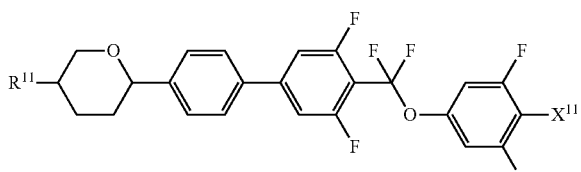
(4-51)
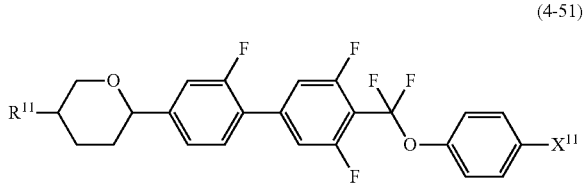

(4-52)
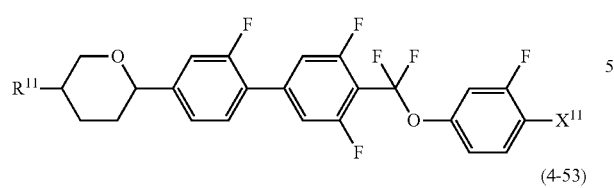

(4-53)
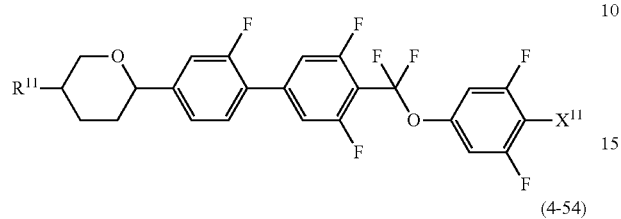

(4-54)
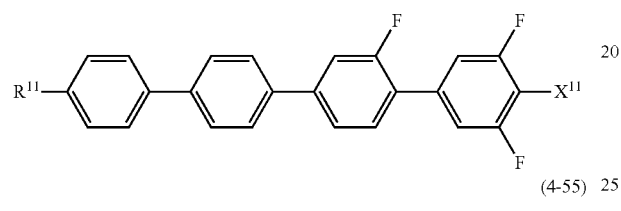

(4-55)
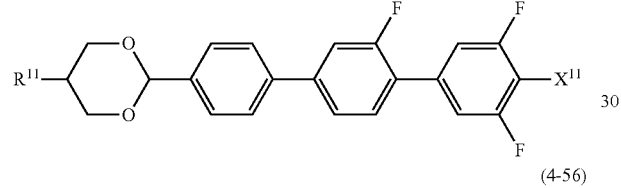

(4-56)
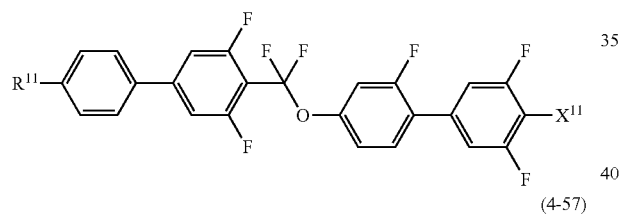

(4-57)
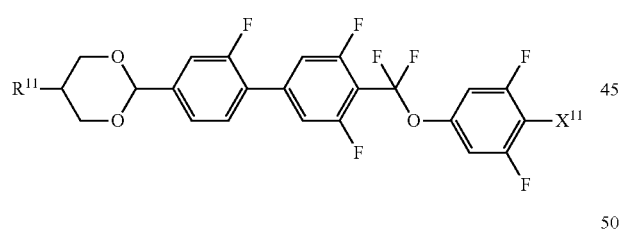

Component B has a positive dielectric anisotropy and a superb stability to heat, light and so forth, and therefore is used for preparing a composition for the TFT mode, the IPS mode, the FFS mode or the like. The content of component B is suitably in the range of approximately 1 to approximately 99% by weight, preferably, in the range of approximately 10 to approximately 97% by weight, and further preferably, in the range of approximately 40 to approximately 95% by weight, based on the weight of the composition. Viscosity of the composition can be adjusted by further adding compounds (13) to (15) (component E) thereto.

Component C includes compound (5) having —C≡N or —C≡C—C≡N as a right terminal group. Preferred examples of component C include compounds (5-1) to (5-64). In the compounds (component C), $R^{12}$ and $X^{12}$ are defined in a manner identical with the definitions in item 10 described above.

(5-1)
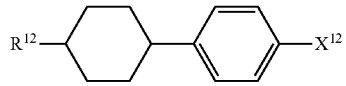

(5-2)
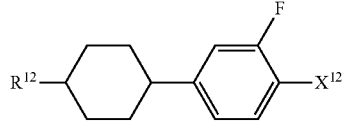

(5-3)
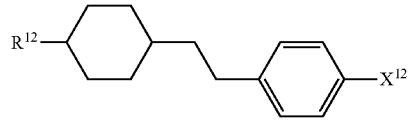

(5-4)
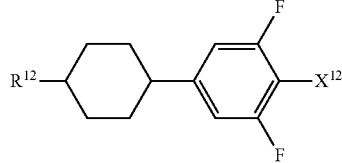

(5-5)
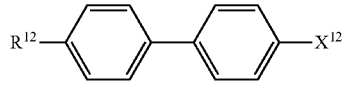

(5-6)
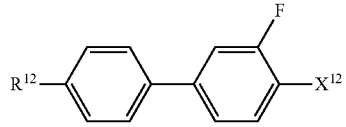

(5-7)
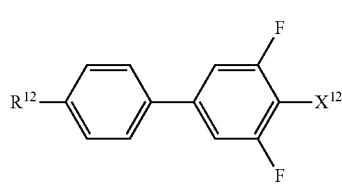

(5-8)
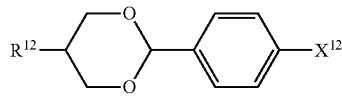

(5-9)
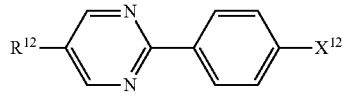

(5-10)
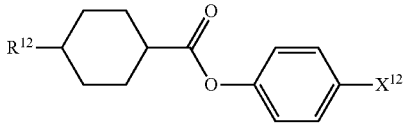

(5-11)
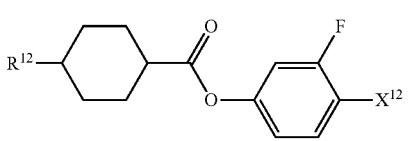

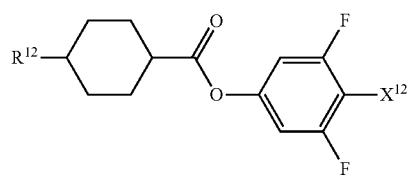 (5-12)
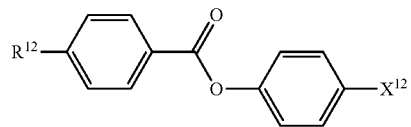 (5-13)
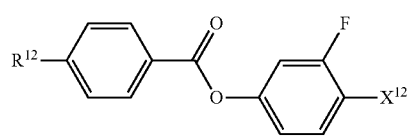 (5-14)
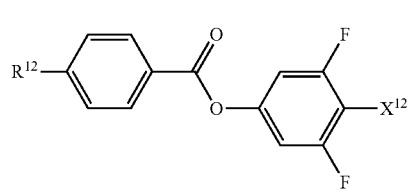 (5-15)
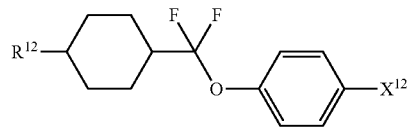 (5-16)
 (5-17)
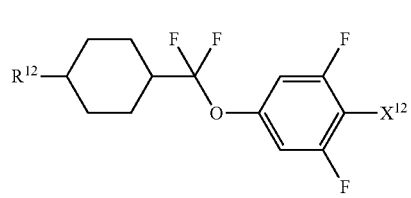 (5-18)
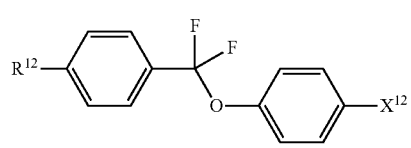 (5-19)
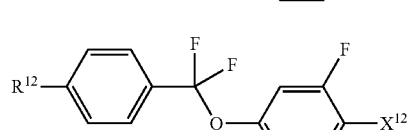 (5-20)
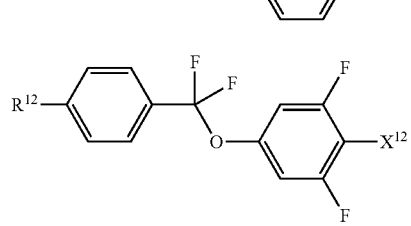 (5-21)
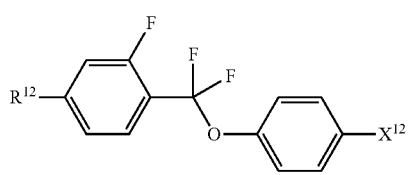 (5-22)
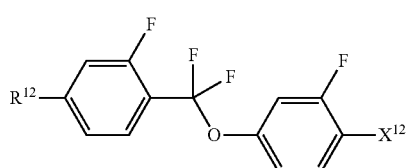 (5-23)
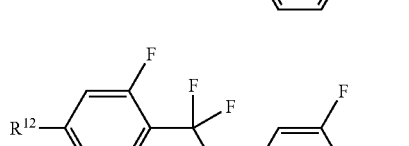 (5-24)
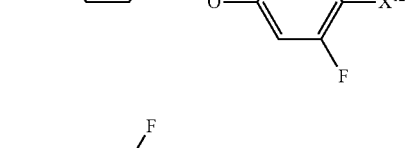 (5-25)
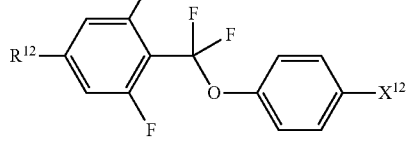 (5-26)
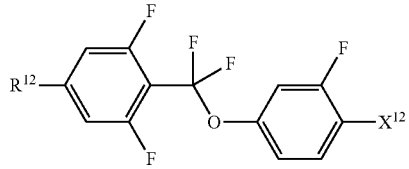 (5-27)
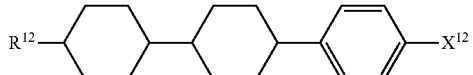 (5-28)
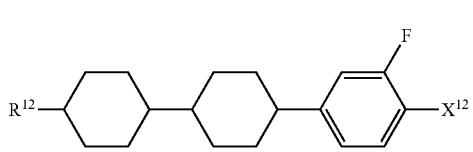 (5-29)
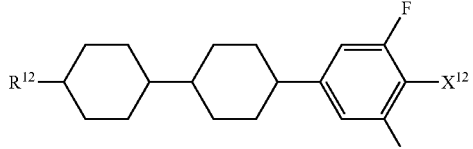 (5-30)

-continued
(5-31) 
(5-32) 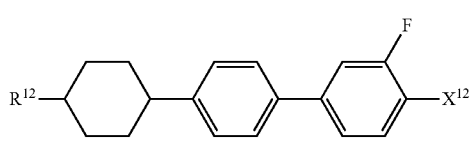
(5-33) 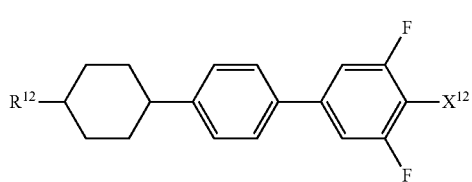
(5-34) 
(5-35) 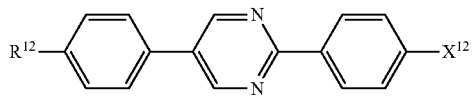
(5-36) 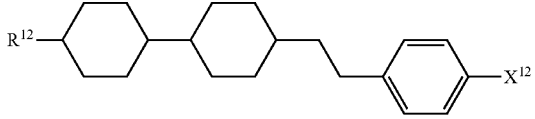
(5-37) 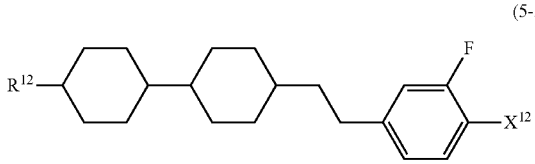
(5-38) 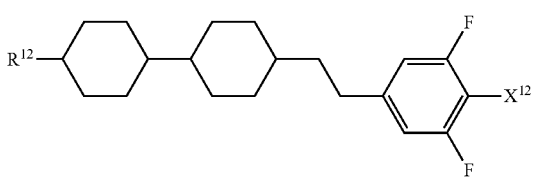
(5-39) 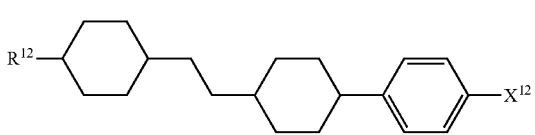
(5-40) 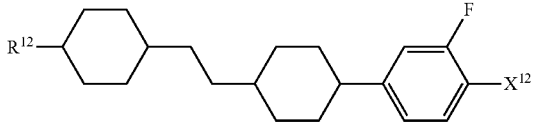
-continued
(5-41) 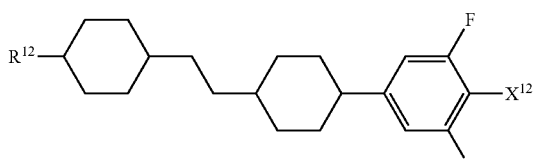
(5-42) 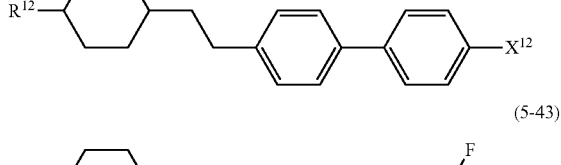
(5-43) 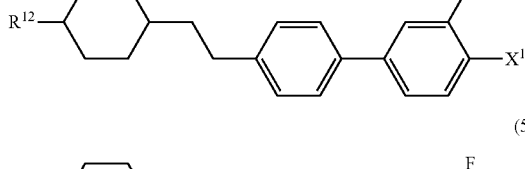
(5-44) 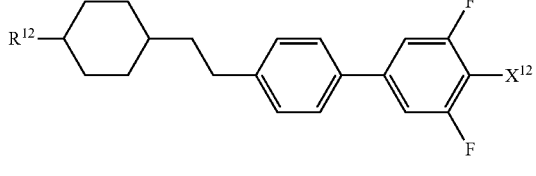
(5-45) 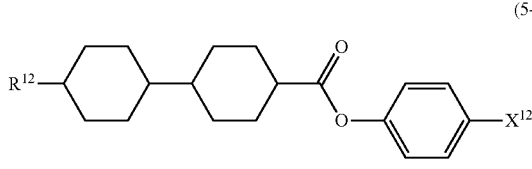
(5-46) 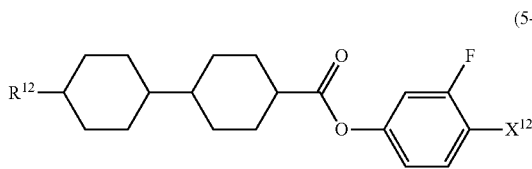
(5-47) 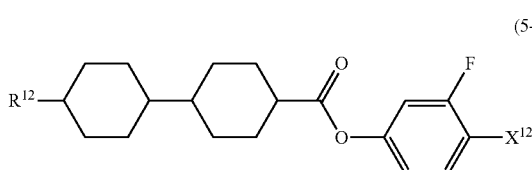
(5-48) 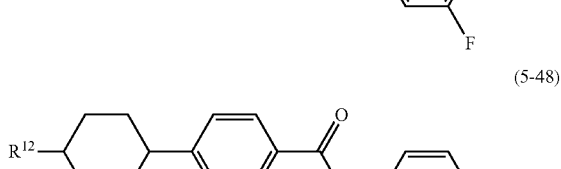
(5-49) 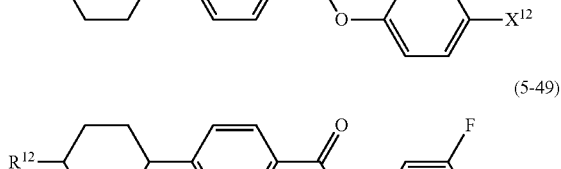

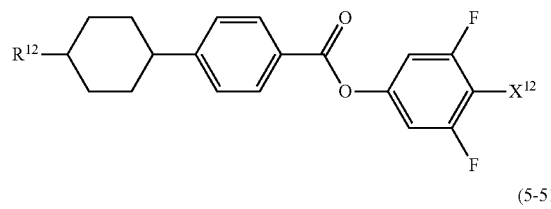

(5-50)

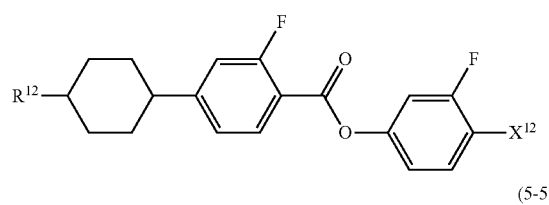

(5-51)

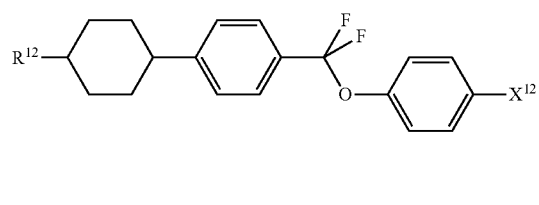

(5-52)

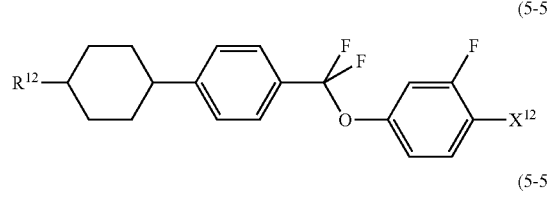

(5-53)

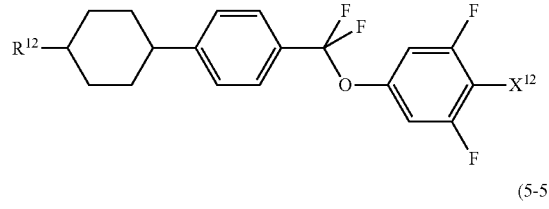

(5-54)

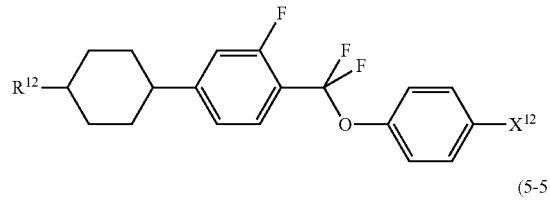

(5-55)

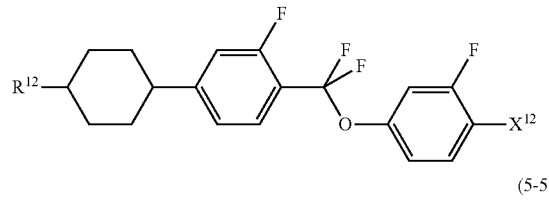

(5-56)

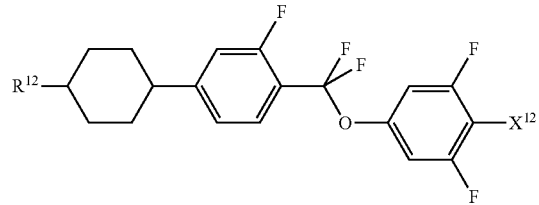

(5-57)

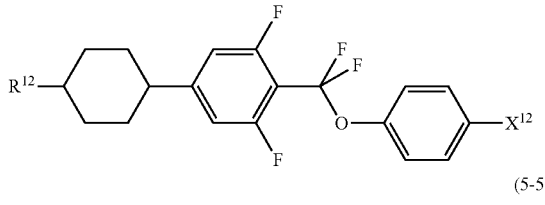

(5-58)

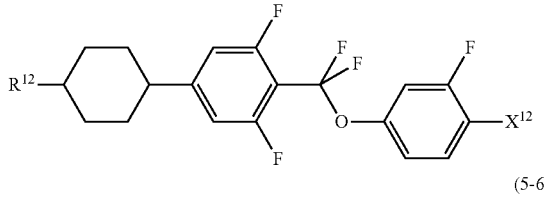

(5-59)

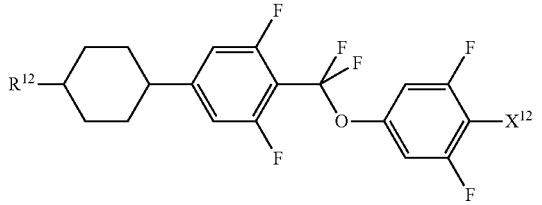

(5-60)

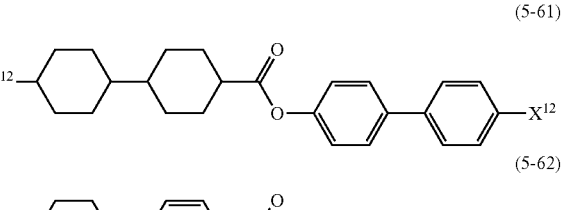

(5-61)

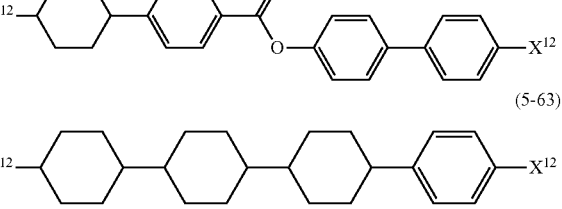

(5-62)

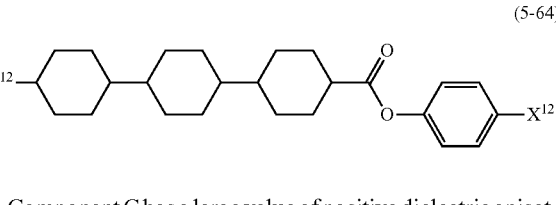

(5-63)

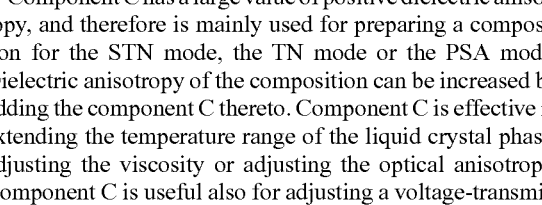

(5-64)

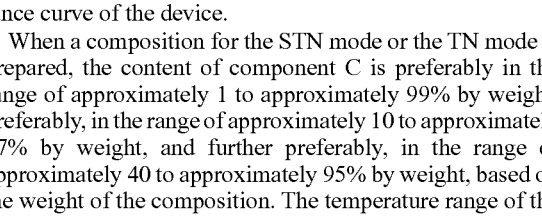

Component C has a large value of positive dielectric anisotropy, and therefore is mainly used for preparing a composition for the STN mode, the TN mode or the PSA mode. Dielectric anisotropy of the composition can be increased by adding the component C thereto. Component C is effective in extending the temperature range of the liquid crystal phase, adjusting the viscosity or adjusting the optical anisotropy. Component C is useful also for adjusting a voltage-transmittance curve of the device.

When a composition for the STN mode or the TN mode is prepared, the content of component C is preferably in the range of approximately 1 to approximately 99% by weight, preferably, in the range of approximately 10 to approximately 97% by weight, and further preferably, in the range of approximately 40 to approximately 95% by weight, based on the weight of the composition. The temperature range of the liquid crystal phase, the viscosity, the optical anisotropy, the dielectric anisotropy or the like of the composition can be adjusted by adding component E thereto.

Component D includes compounds (6) to (12). The compounds have a benzene ring in which atoms on lateral positions are replaced by two halogen atoms, such as 2,3-difluoro-1,4-phenylene. Preferred examples of component D include compounds (6-1) to (6-8), compounds (7-1) to (7-17), compound (8-1), compounds (9-1) to (9-3), compounds (10-1) to (10-11), compounds (11-1) to (11-3) and compounds (12-1) to (12-3). In the compounds (component D), $R^{13}$, $R^{14}$ and $R^{15}$ are defined in a manner identical with the definitions in item (11) described above.

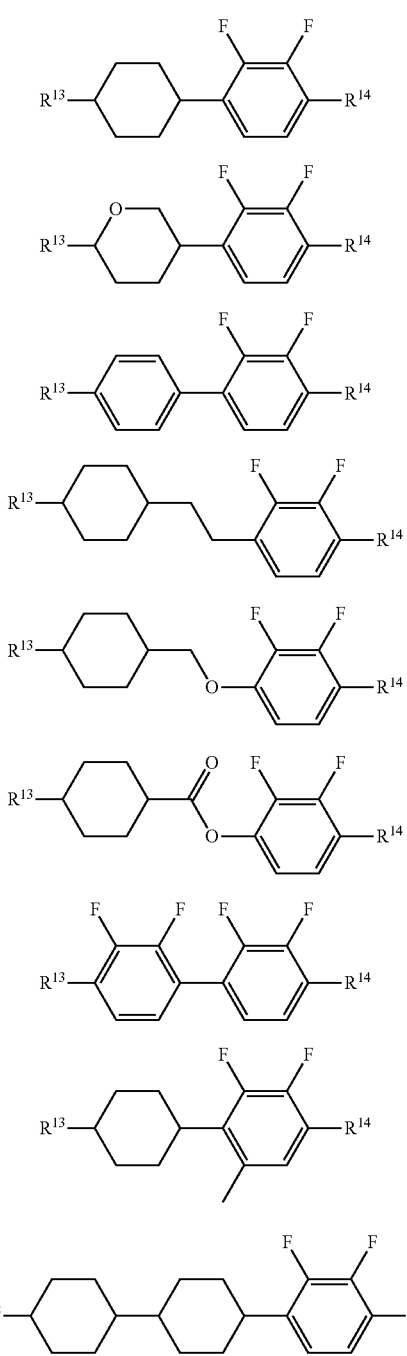

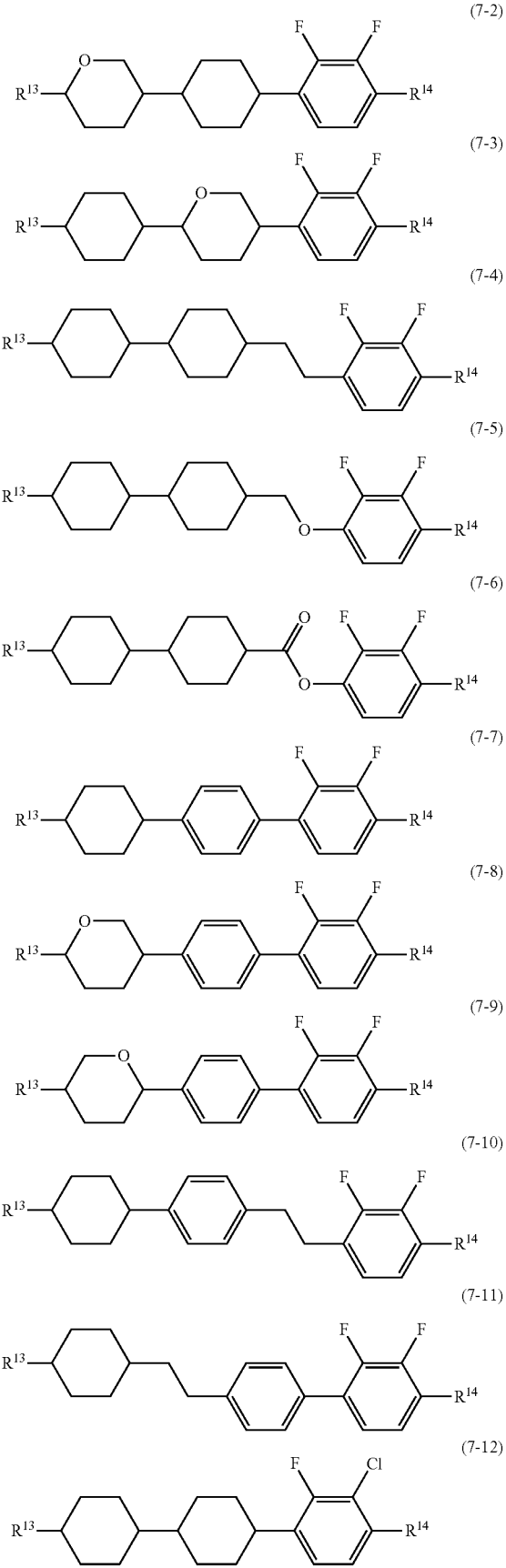

(7-13) 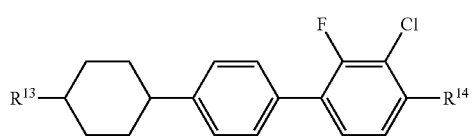
(7-14) 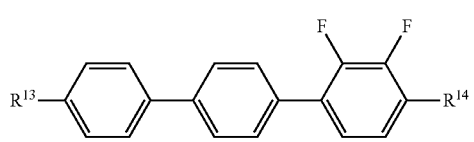
(7-15) 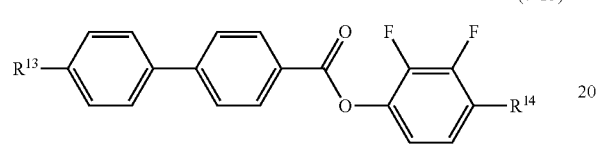
(7-16) 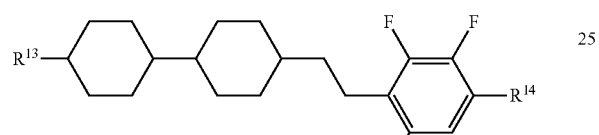
(7-17) 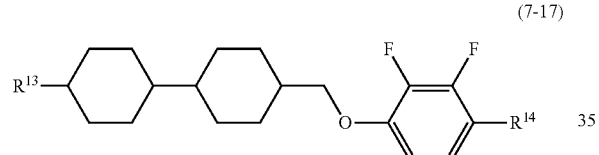
(8-1) 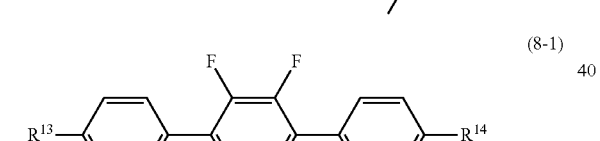
(9-1) 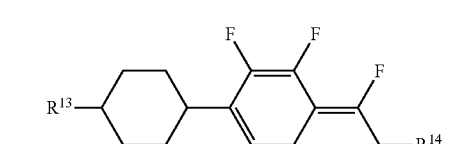
(9-2) 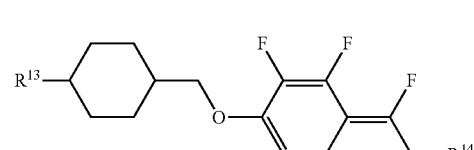
(9-3) 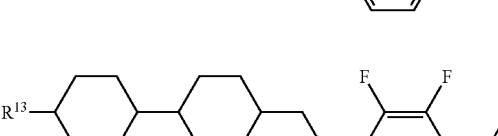
(10-1) 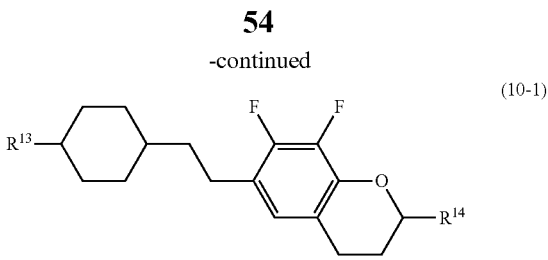
(10-2) 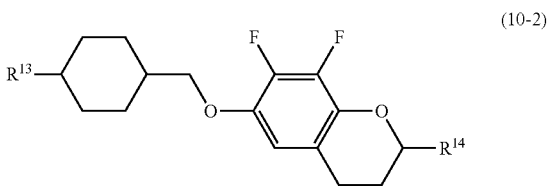
(10-3) 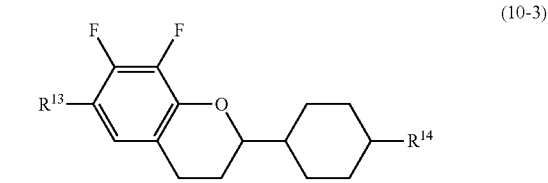
(10-4) 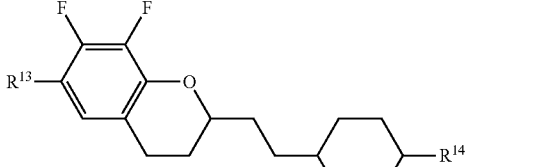
(10-5) 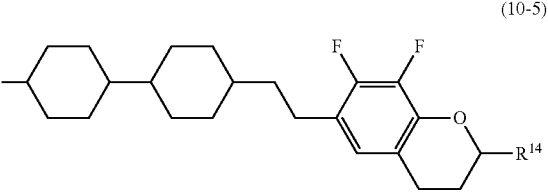
(10-6) 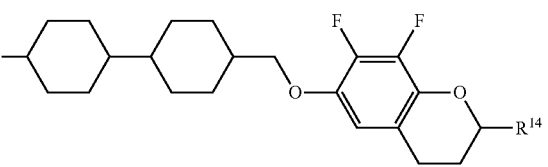
(10-7) 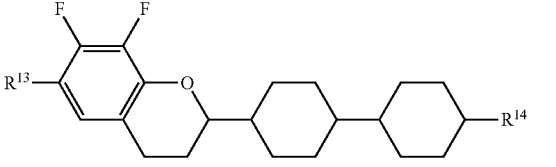
(10-8) 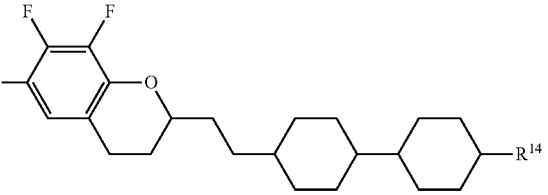

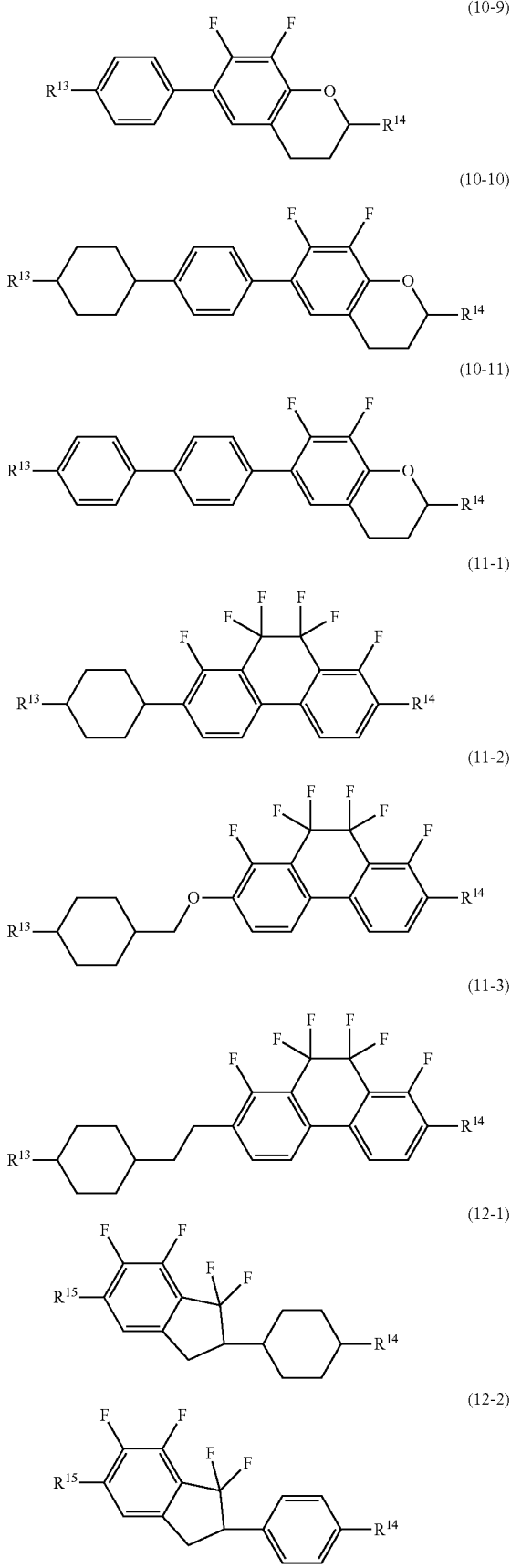

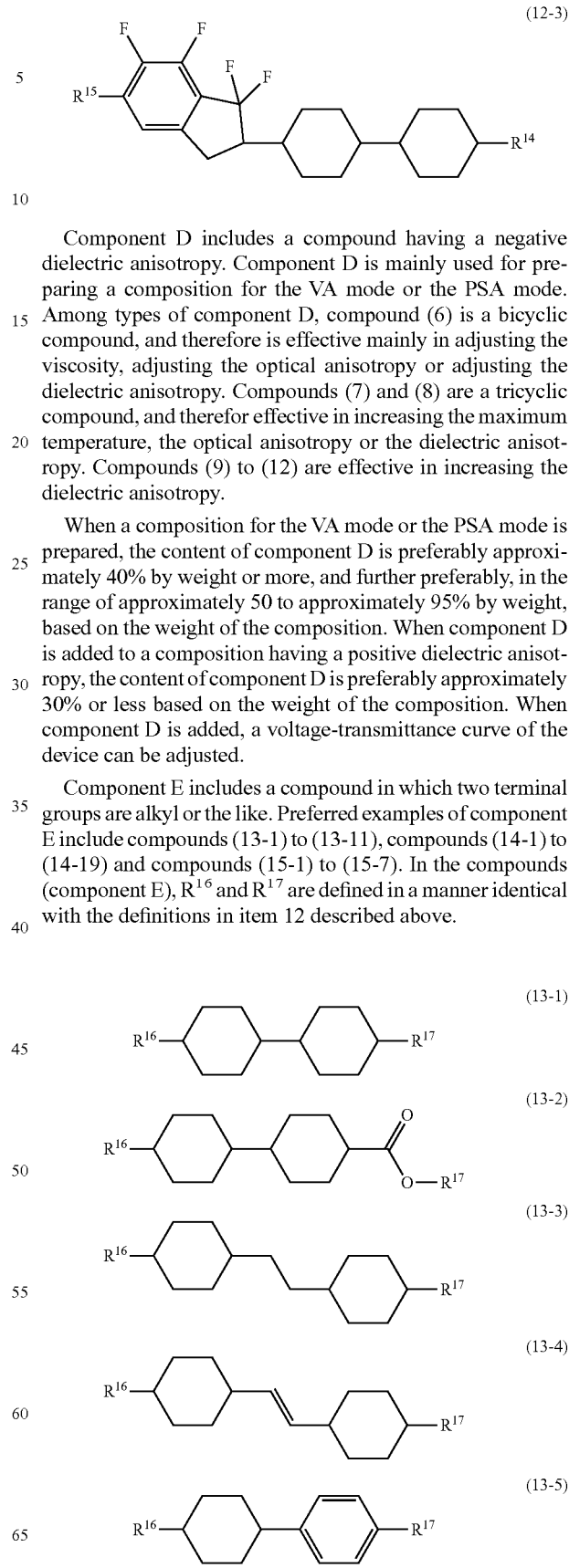

Component D includes a compound having a negative dielectric anisotropy. Component D is mainly used for preparing a composition for the VA mode or the PSA mode. Among types of component D, compound (6) is a bicyclic compound, and therefore is effective mainly in adjusting the viscosity, adjusting the optical anisotropy or adjusting the dielectric anisotropy. Compounds (7) and (8) are a tricyclic compound, and therefor effective in increasing the maximum temperature, the optical anisotropy or the dielectric anisotropy. Compounds (9) to (12) are effective in increasing the dielectric anisotropy.

When a composition for the VA mode or the PSA mode is prepared, the content of component D is preferably approximately 40% by weight or more, and further preferably, in the range of approximately 50 to approximately 95% by weight, based on the weight of the composition. When component D is added to a composition having a positive dielectric anisotropy, the content of component D is preferably approximately 30% or less based on the weight of the composition. When component D is added, a voltage-transmittance curve of the device can be adjusted.

Component E includes a compound in which two terminal groups are alkyl or the like. Preferred examples of component E include compounds (13-1) to (13-11), compounds (14-1) to (14-19) and compounds (15-1) to (15-7). In the compounds (component E), $R^{16}$ and $R^{17}$ are defined in a manner identical with the definitions in item 12 described above.

(13-6) 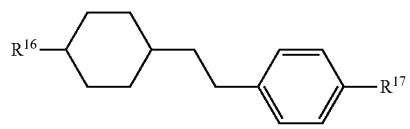
(13-7) 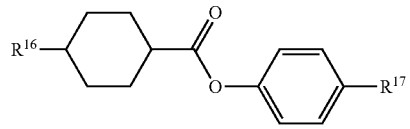
(13-8) 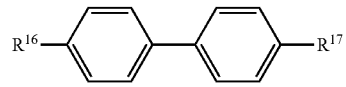
(13-9) 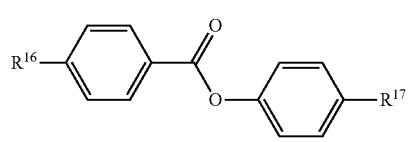
(13-10) 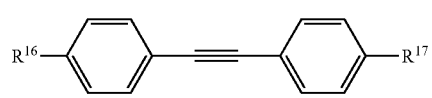
(13-11) 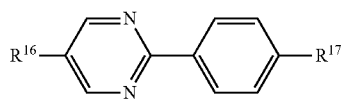
(14-1) 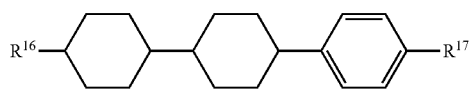
(14-2) 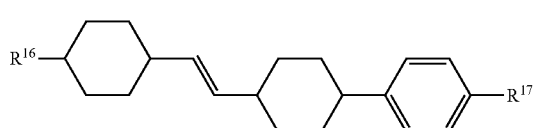
(14-3) 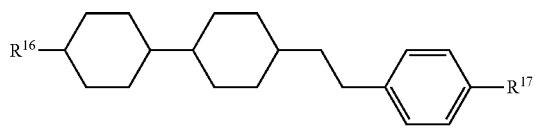
(14-4) 
(14-5) 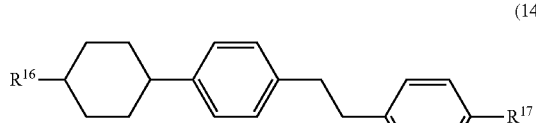
(14-6) 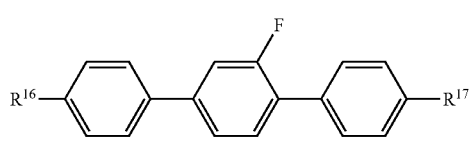
(14-7) 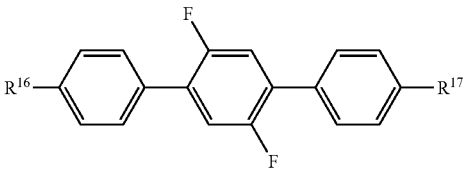
(14-8) 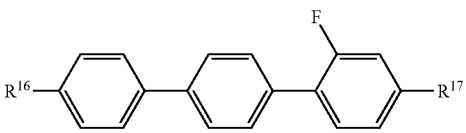
(14-9) 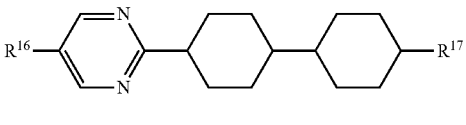
(14-10) 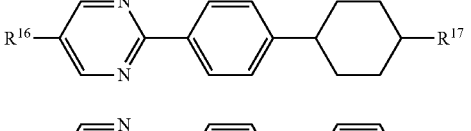
(14-11) 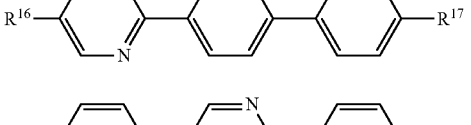
(14-12) 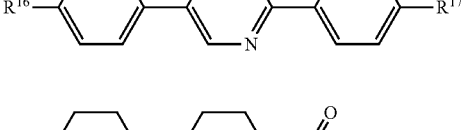
(14-13) 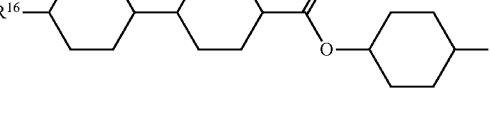
(14-14) 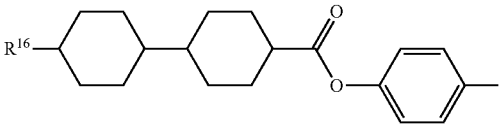
(14-15) 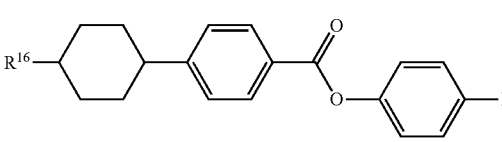
(14-16) 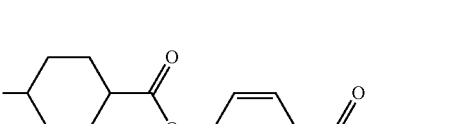
(14-17) 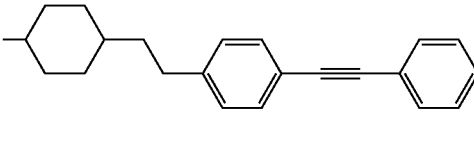

(14-18)
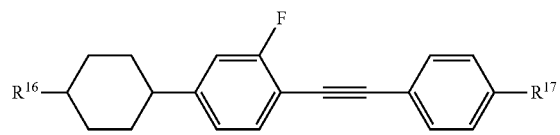

(14-19)
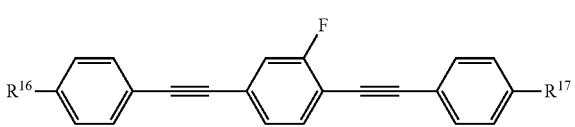

(15-1)
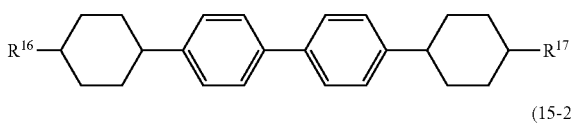

(15-2)
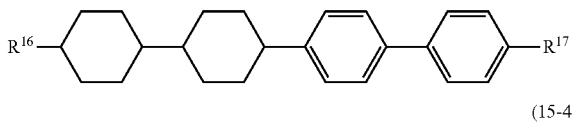

(15-3)
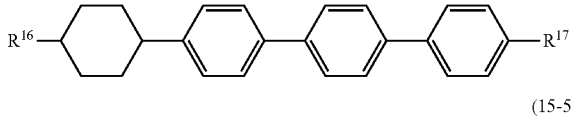

(15-4)
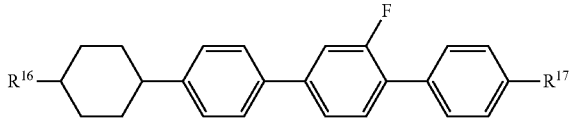

(15-5)
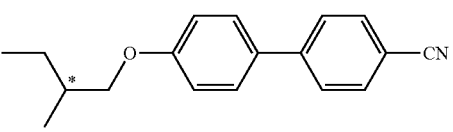

(15-6)
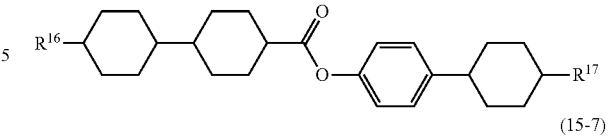

(15-7)
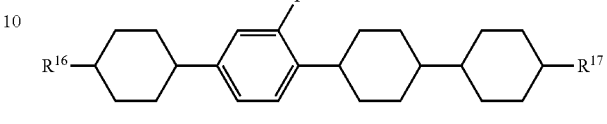

Component E has a small absolute value of dielectric anisotropy, and therefore is a compound close to neutrality. Compound (13) is effective mainly in adjusting the viscosity or the optical anisotropy. Compound (14) and (15) are effective in extending the temperature range of the nematic phase by increasing the maximum temperature, or adjusting the optical anisotropy.

When the content of component E is increased, the dielectric anisotropy of the composition decreases, but the viscosity also decreases. Thus, as long as a desired value of threshold voltage of the device is met, the content is preferably as large as possible. Therefore, when the composition is prepared, the content of component E is preferably approximately 30% by weight or more, and further preferably, approximately 40% by weight or more, based on the weight of the composition.

Composition (1) is prepared by a method for dissolving necessary components at a high temperature, or the like. According to an application, an additive may be added to the composition. Examples of the additive include an optically active compound, a polymerizable compound, a polymerization initiator, an antioxidant, an ultraviolet light absorber, a light stabilizer, a heat stabilizer, a defoaming agent and a dye. Such additives are well known to those skilled in the art, and are described in literatures.

Composition (1) may further contain at least one optically active compound. The optically active compound is effective in inducing a helical structure in liquid crystal molecules to give a necessary twist angle, thereby preventing a reverse twist. Preferred examples of the optically active compound include compounds (Op-1) to (Op-18) below.

(Op-1)
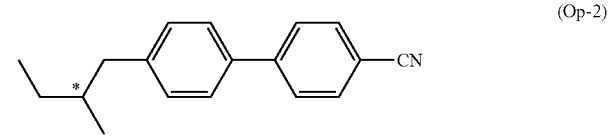

(Op-2)

(Op-3)
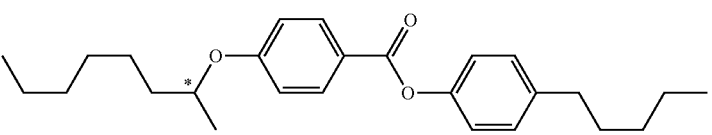

(Op-4)
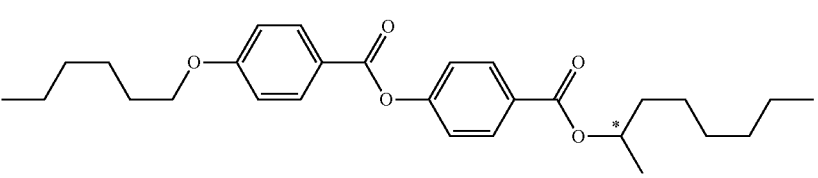

-continued
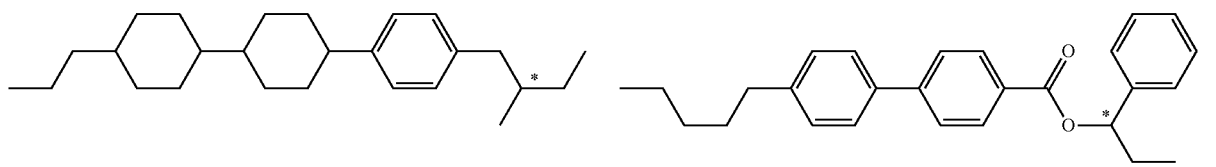
(Op-5)
(Op-6)
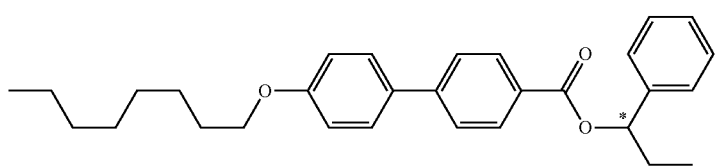
(Op-7)
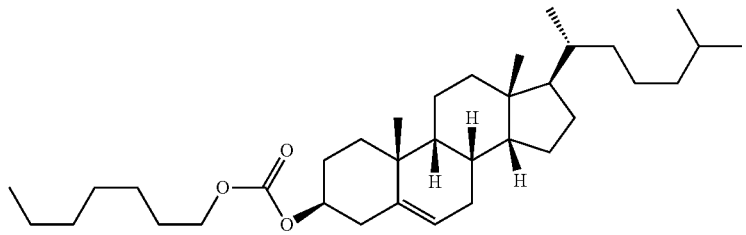
(Op-8)
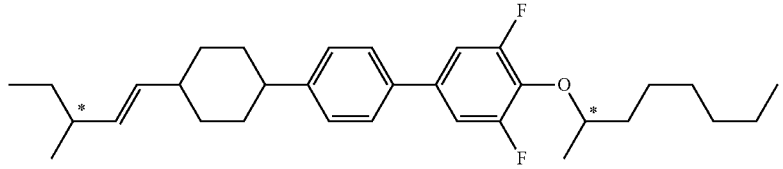
(Op-9)
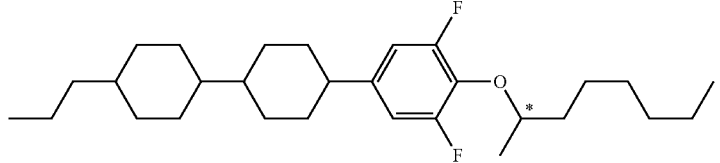
(Op-10)
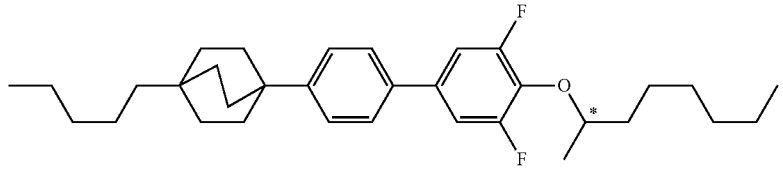
(Op-11)
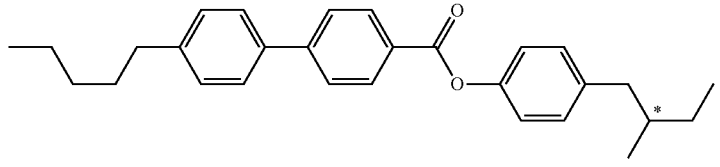
(Op-12)
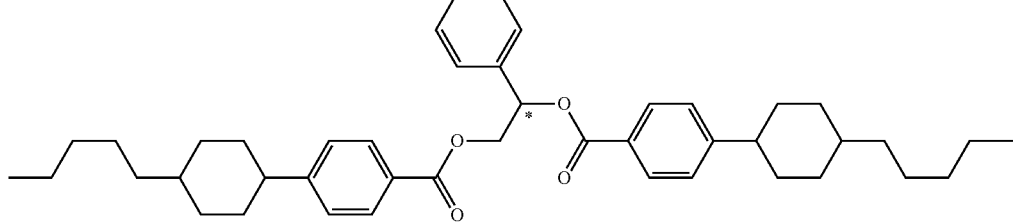
(Op-13)

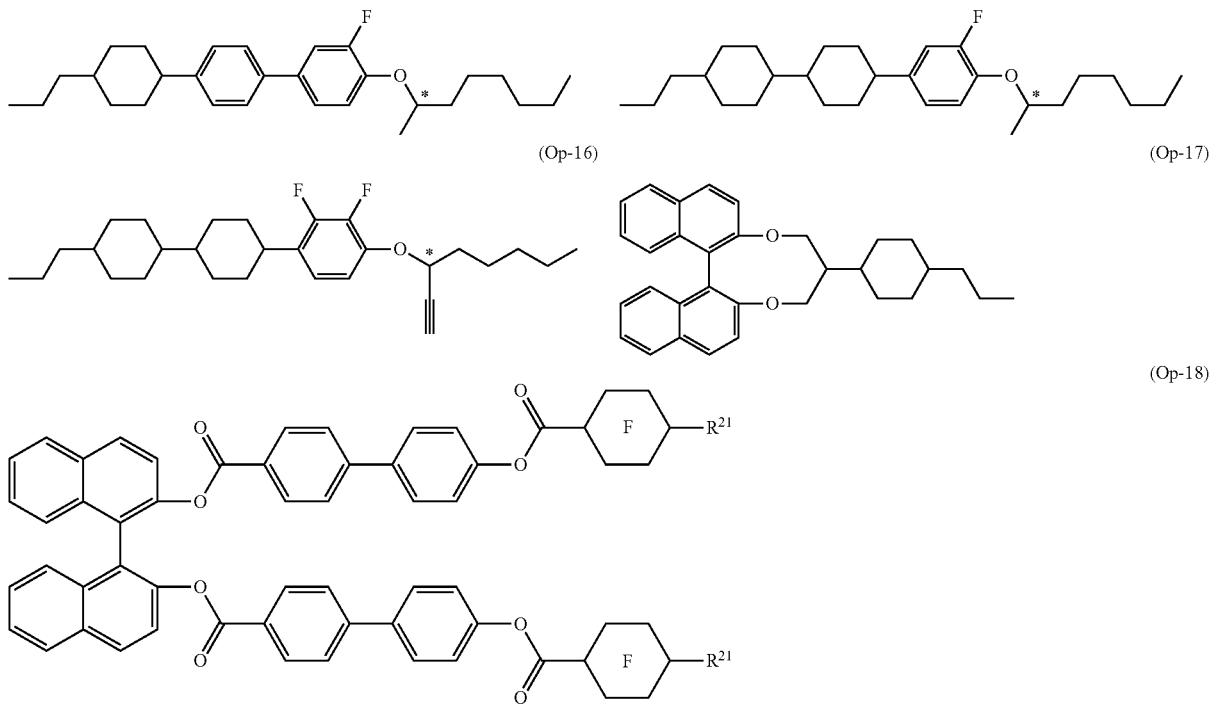

In compound (Op-18), ring F is 1,4-cyclohexylene or 1,4-phenylene, and R²¹ is alkyl having 1 to 10 carbons.

In composition (1), a helical pitch is adjusted by addition of such an optically active compound. The helical pitch is preferably adjusted to the range of approximately 40 to approximately 200 micrometers in a composition for the TFT mode and the TN mode. The helical pitch is preferably adjusted to the range of approximately 6 to approximately 20 micrometers in a composition for the STN mode. In the case of a composition for the BTN mode, the helical pitch is preferably adjusted to the range of approximately 1.5 to approximately 4 micrometers. Two or more optically active compounds may be added for the purpose of adjusting temperature dependence of the helical pitch.

Composition (1) can also be used for the PSA mode by adding a polymerizable compound. Examples of the polymerizable compound include an acrylate, methacrylate, vinyl compound, vinyloxy compound, propenyl ether, epoxy compound (oxirane, oxetane) or vinyl ketone. The polymerizable compound polymerizes by irradiation with ultraviolet light or the like. An initiator such as a photopolymerization initiator may be added. Suitable conditions for the polymerization, suitable types of the initiator and suitable amounts thereof are known to those skilled in the art and are described in literatures. Preferred examples of the polymerizable compound include compounds (M-1) to (M-12).

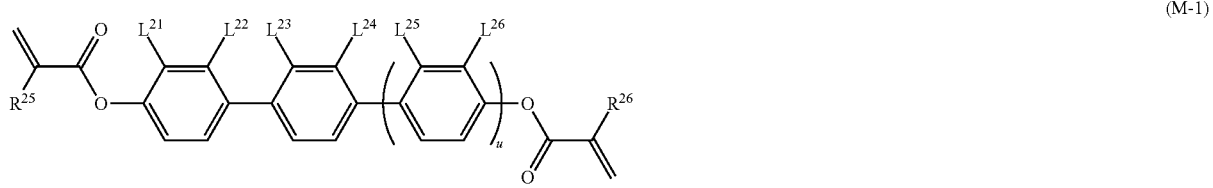

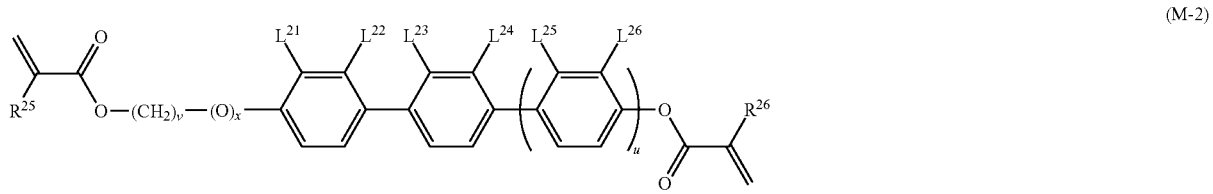

-continued
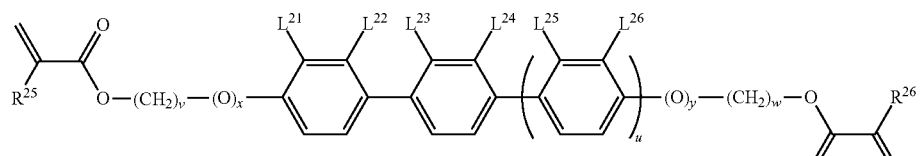
(M-3)
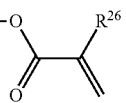
(M-4)
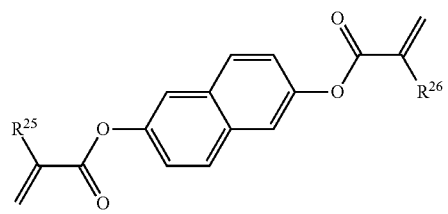
(M-5)
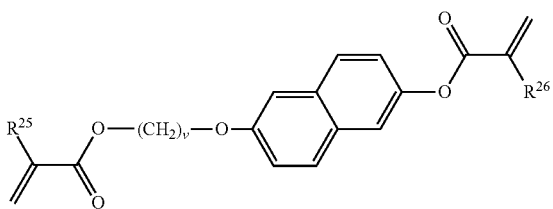
(M-6)
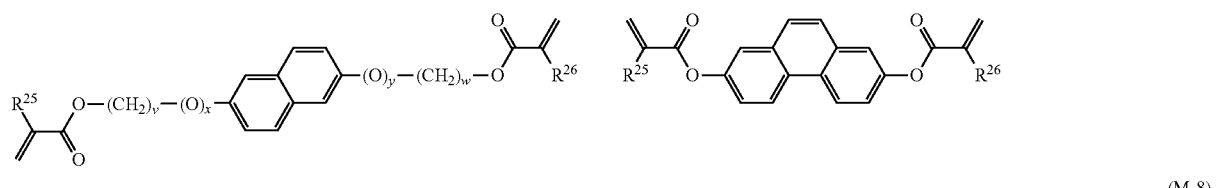
(M-7)
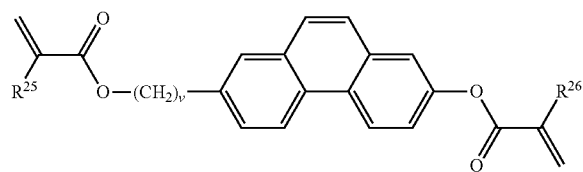
(M-8)
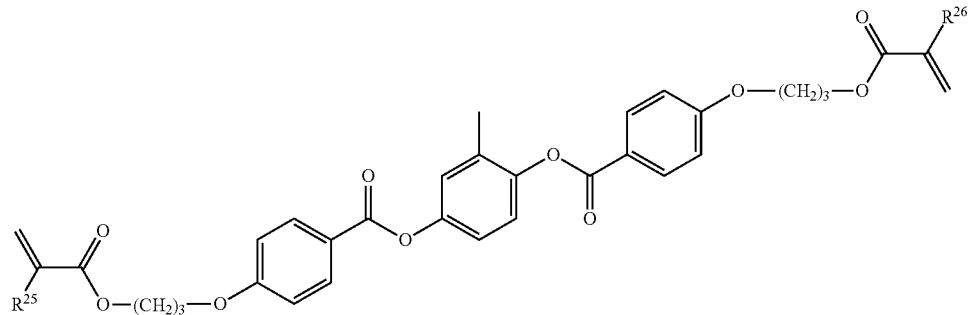
(M-9)
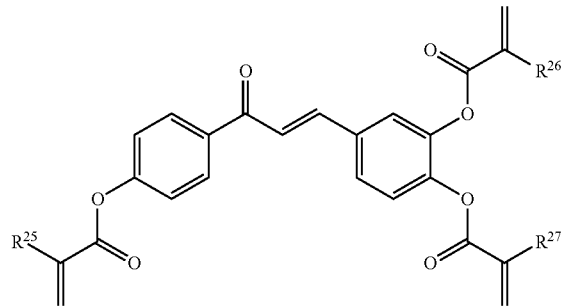
(M-10)
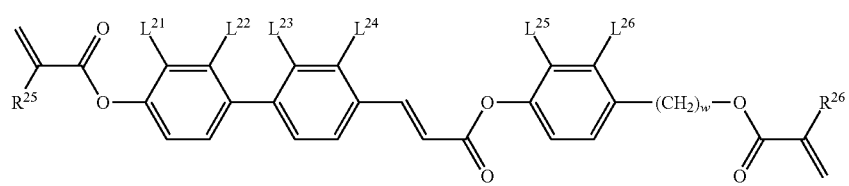
(M-11)

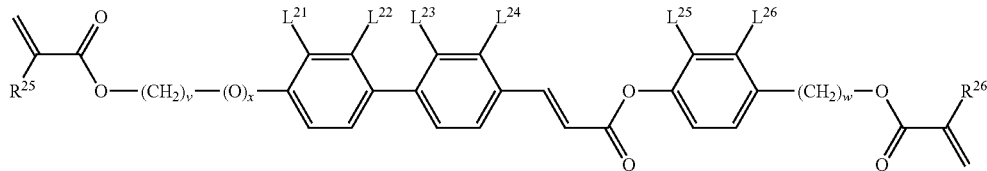
(M-12)

In compounds (M-1) to (M-12), $R^{25}$, $R^{26}$ and $R^{27}$ are independently hydrogen or methyl; u, x and y are independently 0 or 1; v and w are independently an integer from 1 to 10; $L^{21}$, $L^{22}$, $L^{23}$, $L^{24}$, $L^{25}$ and $L^{26}$ are independently hydrogen or fluorine.

The antioxidant is effective for maintaining a large voltage holding ratio. Preferred examples of the antioxidant include compounds (AO-1) and (AO-2) below, IRGANOX 415, IRGANOX 565, IRGANOX 1010, IRGANOX 1035, IRGANOX 3114 and IRGANOX 1098 (trade names. BASF A.G.). The ultraviolet light absorber is effective for preventing a decrease of the maximum temperature. Preferred examples of the ultraviolet light absorber include a benzophenone derivative, a benzoate derivative and a triazole derivative. Specific examples include compounds (AO-3) and (AO-4) below, TINTVIN 329, TINTVIN P, TINTVIN 326, TINTVIN 234, TINTVIN 213, TINTVIN 400, TINTVIN 328, TINTVIN 99-2 (trade names. BASF A.G.) and 1,4-diazabicyclo[2.2.2] octane (DABCO). A light stabilizer such as amine having steric hindrance is preferred for maintaining a large voltage holding ratio. Specific examples of the light stabilizer include compounds (AO-5) and (AO-6) below, TINTVIN 144, TINTVIN 765 and TINTVIN 770DF (trade names. BASF A.G.). The heat stabilizer is also effective for maintaining a large voltage holding ratio, and preferred examples include IRGAFOS 168 (trade name. BASF A.G.). The defoaming agent is effective for preventing foam formation. Preferred examples of the defoaming agent include dimethyl silicone oil and methylphenyl silicone oil.

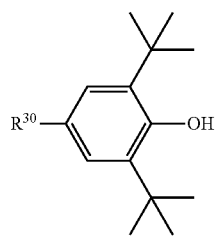
(AO-1)

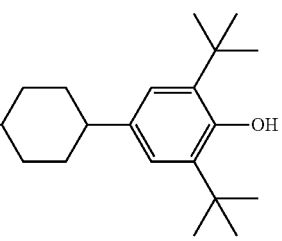
(AO-2)

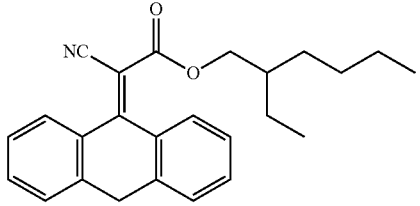
(AO-3)

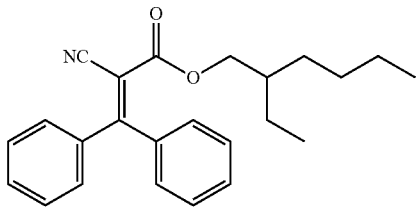
(AO-4)

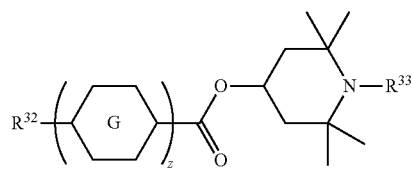
(AO-5)

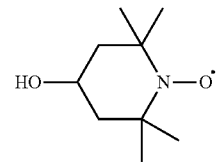
(AO-6)

In compound (AO-1), $R^{30}$ is alkyl having 1 to 20 carbons, alkoxy having 1 to 20 carbons, —$COOR^{31}$ or —$CH_2CH_2COOR^{31}$, wherein $R^{31}$ is alkyl having 1 to 20 carbons. In compound (AO-2), $R^{32}$ is alkyl having 1 to 20 carbons. In compound (AO-5), $R^{32}$ is alkyl having 1 to 20 carbons; $R^{33}$ is hydrogen, methyl or O. (oxygen radical); ring G is 1,4-cyclohexylene or 1,4-phenylene; and z is 1, 2 or 3.

Composition (1) can be used for a guest host (GH) mode by addition of a dichroic dye of a merocyanine type, a stylyl type, an azo type, an azomethine type, an azoxy type, a quinophthalone type, an anthraquinone type, a tetrazine type or the like.

3. Liquid Crystal Display Device

Composition (1) can be used for a liquid crystal display device having an operating mode such as the PC mode, the TN mode, the STN mode, the OCB mode and the PSA mode, and driven by an active matrix (AM) mode. Composition (1) can also be used for a liquid crystal display device having an operating mode such as the PC mode, the TN mode, the STN mode, the OCB mode, the VA mode and the IPS mode, and driven by a passive matrix (PM) mode. The devices having the AM and PM modes can be applied to any type of a reflection type, a transmission type and a transflective type.

Composition (1) can also be used for a nematic curvilinear aligned phase (NCAP) device prepared by microencapsulating a nematic liquid crystal, a polymer dispersed liquid crystal display (PDLCD) device in which a three-dimensional network-polymer is formed in the liquid crystal, and a polymer network liquid crystal display device (PNLCD).

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

The invention will be explained in greater detail by way of Examples. The invention is not restricted by the Examples.
1-1. Example of Compound (1)

Compound (1) was synthesized by procedures as described below. The synthesized compound was identified by a method such as an NMR analysis. Physical properties of the compound were measured by methods as described below.
NMR Analysis DRX-500 (made by Bruker BioSpin Corporation) was used for measurement. In $^1$H-NMR measurement, a sample was dissolved in a deuterated solvent such as $CDCl_3$, and measurement was carried out under conditions of room temperature, 500 MHz and 16 times of accumulation. Tetramethylsilane was used as an internal standard. In $^{19}$F-NMR measurement, measurement was carried out under conditions of 24 times of accumulation using $CFCl_3$ as an internal standard. In the explanation of nuclear magnetic resonance spectra, s, d, t, q, quin, sex, m and br stand for a singlet, a doublet, a triplet, a quartet, a quintet, a sextet, a multiplet and being broad, respectively.
Sample for Measurement In measuring a phase structure and a transition temperature, a liquid crystal compound itself was used as a sample. In measuring physical properties such as a maximum temperature of a nematic phase, viscosity, optical anisotropy and dielectric anisotropy, a composition prepared by mixing the compound with a base liquid crystal was used as a sample.

In the case when the sample prepared by mixing the compound with the base liquid crystal was used, measurement was carried out as described below. A sample was prepared by mixing 15% by weight of the compound and 85% of the base liquid crystal. An extrapolated value was calculated from a measured value of the sample, according to an extrapolation method based on an equation below, and the value was described. {Extrapolated value}={100×(measured value of a sample)−(% by weight of base liquid crystal)×(measured value of the base liquid crystal)}/(% of the compound).

When crystals (or a smectic phase) precipitated at 25° C. even at the ratio of the compound to the base liquid crystal, a ratio of the compound to the base liquid crystal was changed in the order of (10% by weight:90% by weight), (5% by weight:95% by weight) and (1% by weight:99% by weight). Physical properties of a sample were measured at a ratio in which the crystals (or the smectic phase) did not precipitate at 25° C. In addition, unless otherwise noted, the ratio of the compound to the base liquid crystal is 15% by weight:85% by weight.

As the base liquid crystal, base liquid crystal (i) below was used. Ratios of components of base liquid crystal (i) are expressed in terms of % by weight.

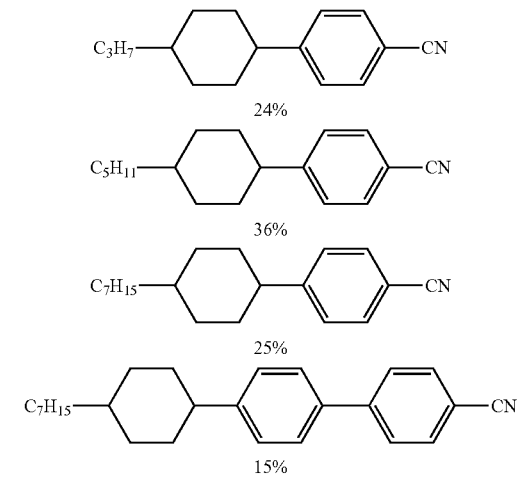

Measurement Method

Physical properties of a compound were measured according to the methods described below. Most of the measurement methods are applied as described in the Standard of the Japan Electronics and Information Technology Industries Association (hereinafter, abbreviated as JEITA) (JEITA EIAJ ED-2521B) discussed and established by JEITA, or modified thereon. No TFT was attached to a TN device used for measurement.
(1) Phase Structure A sample was placed on a hot plate of a melting point apparatus (FP52 Hot Stage made by Mettler-Toledo International Inc.) equipped with a polarizing microscope, and a state of a phase and a change thereof were observed with the polarizing microscope while the sample was heated at a rate of 3° C. per minute, and a kind of the phase was specified.
(2) Transition Temperature (° C.)

Differential Scanning calorimeter Diamond DSC System made by PerkinElmer, Inc. or High Sensitivity Differential Scanning calorimeter X-DSC7000 made by SR Nano Technology Inc. was used for measurement. Temperature was increased or decreased at a rate of 3° C. per minute, and a starting point of an endothermic peak or exothermic peak caused by a change in a phase of the sample was determined by extrapolation, and thus a phase transition temperature was determined. Temperature at which a compound undergoes transition from a solid to a liquid crystal phase such as a smectic phase and a nematic phase may be occasionally abbreviated as "minimum temperature of the liquid crystal phase." Temperature at which a compound undergoes transition from a liquid crystal phase to an isotropic liquid may be occasionally abbreviated as "clearing point."

Crystals were expressed as C, and when kinds of the crystals were distinguishable, each of the crystals was expressed as $C_1$ or $C_2$. A smectic phase or a nematic phase was expressed as S or N. When smectic A phase, smectic B phase, smectic C phase or smectic F phase was distinguishable among the smectic phases, the phases were expressed as $S_A$, $S_B$, $S_C$ or $S_F$, respectively. A liquid (isotropic) was expressed as I. A transition temperature was expressed as "C 50.0 N 100.0 I," for example. The expression indicates that a transition temperature from a crystal to a nematic phase is 50.0° C., and a transition temperature from the nematic phase to a liquid is 100.0° C.

(3) Compatibility at a Low Temperature:

Samples in which the base liquid crystal and a compound were mixed for the compound to be 20% by weight, 15% by weight, 10% by weight, 5% by weight, 3% by weight and 1% by weight were prepared, and put in glass vials. The glass vials were kept in freezers at −10° C. or −20° C. for a predetermined period of time, and then whether or not crystals or a smectic phase precipitated was observed.

(4) Maximum Temperature of a Nematic Phase ($T_{NI}$ or NI; ° C.)

A sample was placed on a hot plate of a melting point apparatus equipped with a polarizing microscope and was heated at a rate of 1° C. per minute. Temperature was measured when part of the sample began to change from a nematic phase to an isotropic liquid. A maximum temperature of the nematic phase may be occasionally abbreviated as "maximum temperature." When the sample was a mixture of a compound and the base liquid crystal, the maximum temperature was expressed as a symbol $T_{NI}$. When the sample was a mixture of a compound and component B and so forth, the maximum temperature was expressed as a symbol NI.

(5) Minimum Temperature of a Nematic Phase ($T_c$; ° C.)

Samples each having a nematic phase were kept in freezers at temperatures of 0° C., −10° C., −20° C., −30° C. and −40° C. for 10 days, and then liquid crystal phases were observed. For example, when the sample maintained the nematic phase at −20° C. and changed to crystals or a smectic phase at −30° C., $T_c$ was expressed as $T_c \leq -20°$ C. A minimum temperature of the nematic phase may be occasionally abbreviated as a minimum temperature.

(6) Viscosity (Bulk Viscosity; η; Measured at 20° C.; mPa·s)

A cone plate-type (E type) rotational viscometer made by Tokyo Keiki Inc. was used for measurement.

(7) Viscosity (Rotational Viscosity; γ1; Measured at 25° C.; mPa·s)

Measurement was carried out according to the method described in M. Imai et al., Molecular Crystals and Liquid Crystals, Vol. 259, p. 37 (1995). A sample was put in a TN device in which a twist angle was 0 degrees and a distance (cell gap) between two glass substrates was 5 micrometers. Voltage was applied stepwise to the device in the range of 16 V to 19.5 V at an increment of 0.5 V. After a period of 0.2 second with no voltage, voltage was applied repeatedly under the conditions of only one rectangular wave (rectangular pulse; 0.2 second) and no voltage (2 seconds). A peak current and a peak time of a transient current generated by the applied voltage were measured. A value of rotational viscosity was obtained from measured values and a calculation equation (8) on page 40 of the paper presented by M. Imai et al. A dielectric anisotropy value required for the calculation was determined by using the device used for measuring the rotational viscosity and the method described below.

(8) Optical Anisotropy (Refractive Index Anisotropy; Δn; Measured at 25° C.)

Measurement was carried out by an Abbe refractometer with a polarizing plate mounted on an ocular by using light at a wavelength of 589 nanometers. A surface of a main prism was rubbed in one direction, and then a sample was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of refractive index anisotropy was calculated from an equation: Δn=n∥−n⊥.

(9) Dielectric Anisotropy (Δ∈; Measured at 25° C.)

A sample was put in a TN device in which a distance (cell gap) between two glass substrates was 9 micrometers and a twist angle was 80 degrees. Sine waves (10 V, 1 kHz) were applied to the device, and after 2 seconds, a dielectric constant (∈∥) in the major axis direction of liquid crystal molecules was measured. Sine waves (0.5 V, 1 kHz) were applied to the device, and after 2 seconds, a dielectric constant (∈⊥) in the minor axis direction of the liquid crystal molecules was measured. A value of dielectric anisotropy was calculated from an equation: Δ∈=∈∥−∈⊥

(10) Elastic Constant (K; Measured at 25° C.; pN)

ITP4284A-type LCR Meter by Yokogawa-Hewlett-Packard Company was used for measurement. A sample was put in a horizontal alignment device in which a distance (cell gap) between two glass substrates was 20 micrometers. An electric charge of 0 V to 20 V was applied to the device, and electrostatic capacity and applied voltage were measured. Measured values of electrostatic capacity (C) and applied voltage (V) were fitted to equation (2.98) and equation (2.101) on page 75 of the "Liquid Crystal Device Handbook (Ekisho Debaisu Handobukku, in Japanese)" (The Nikkan Kogyo Shimbun, Ltd.), and values of $K_{11}$ and $K_{33}$ were obtained from equation (2.99). Next, $K_{22}$ was calculated using the previously obtained value of $K_{11}$ and $K_{33}$ in formula (3.18) on page 171. The elastic constant K was represented by a mean value of $K_{11}$, $K_{22}$ and $K_{33}$ thus obtained.

(11) Threshold Voltage (Vth; Measured at 25° C.; V)

An LCD-5100 luminance meter made by Otsuka Electronics Co., Ltd. was used for measurement. A light source is a halogen lamp. A sample was put into a normally white mode TN device in which a distance (cell gap) between two glass substrates was approximately 0.45/Δn micrometer and a twist angle was 80 degrees. Voltage (32 Hz, rectangular waves) applied to the device was increased stepwise from 0 V to 10 V at an increment of 0.02 V. On the occasion, the device was irradiated with light from a direction perpendicular to the device, and an amount of light transmitted through the device was measured. A voltage-transmittance curve was prepared, in which the maximum value of the amount of light corresponded to 100% transmittance and the minimum value of the amount of light corresponded to 0% transmittance. A threshold voltage is a voltage at 90% transmittance.

(12) Voltage Holding Ratio (VHR-1; Measured at 25° C.; %)

A TN device used for measurement had a polyimide alignment film and a distance (cell gap) between two glass plates was 5 micrometers. A sample was put in the device, and then the device was sealed with an ultraviolet-curable adhesive. The device was charged at 25° C. by applying pulse voltage (60 microseconds at 5 V). A decaying voltage was measured for 16.7 milliseconds with a high-speed voltmeter, and area A between a voltage curve and a horizontal axis in a unit cycle was obtained. Area B was an area without the decay. A voltage holding ratio was represented by a percentage of area A to area B.

(13) Voltage Holding Ratio (VHR-2; Measured at 80° C.; %)

A voltage holding ratio (VHR-2) was measured in a manner similar to the operations in measuring VHR-1 except that measurement was carried out at 80° C.

Example 1

Synthesis of (E)-4-((3,5-difluoro-4-((3,3,3-trifluoro-1-propene-1-yl)oxy)phenoxy)difluoromethyl)-4'-propyl-1,1'-bi(cyclo hexane) ((E) isomer of No. 38)

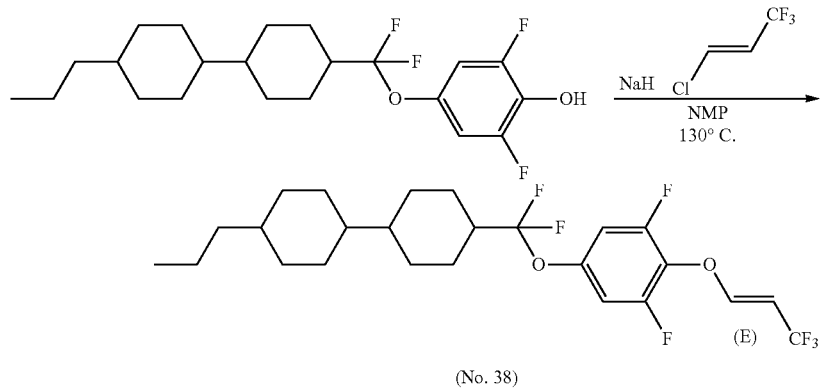

(No. 38)

Then, 4-(difluoro(4'-propyl-[1,1'-bi(cyclohexane)]-4-yl)methoxy)-2,6-difluorophenol (3.0 g, 7.45 mmol) prepared by a publicly known method and sodium hydride (55%; 0.325 g, 7.45 mmol) were stirred in N-methylpyrrolidone at 60° C. for 30 minutes. Then, (E)-1-chloro-3,3,3-trifluoro-1-propene (2.43 g, 18.6 mmol) was added to the reaction mixture, and the resulting mixture was stirred at 130° C. for 24 hours. The reaction mixture was poured into water and extracted with toluene. A combined organic layer was washed with water and saturated brine, and then dried over magnesium sulfate and the solvent was distilled off by an evaporator. The resulting residue was purified by silica gel chromatography and recrystallization to give a (E) isomer of compound No. 38 (yield 56%).

$^1$H-NMR (CDCl$_3$) (δ ppm): 7.22-7.17 (m, 1H), 6.90-6.85 (m, 2H), 5.22 (dq, 1H), 2.05-1.94 (m, 3H), 1.88-1.82 (m, 2H), 1.80-1.68 (m, 4H), 1.39-1.25 (m, 4H), 1.20-0.93 (m, 9H), 0.91-0.80 (m, 5H).

A liquid crystal composition was prepared from 15% by weight of a compound ((E) isomer of No. 38) and 85% by weight of a base liquid crystal. Physical properties of the liquid crystal composition obtained were measured and values of physical properties of the compound were calculated by extrapolating the measured values. The results were as described below.

Phase transition temperature: C 52.7 N 101.0 I. Maximum temperature (NI)=69.7° C.; dielectric anisotropy (Δ∈)=17.8; optical anisotropy (Δn)=0.084; viscosity (η)=69.4 mPa·s.

Example 2

Synthesis of (E)-2-(4-((3,5-difluoro-4-((3,3,3-trifluoro-1-propene-1-yl)oxy)phenoxy)difluoromethyl)-3,5-difluorophenyl)-5-propyl-1,3-dioxane ((E) isomer of No. 44)

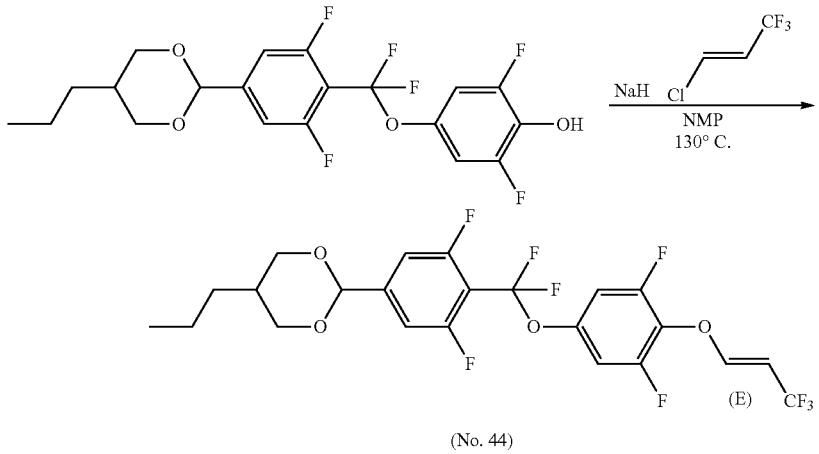

(No. 44)

Then, 4-((2,6-difluoro-4-(5-propyl-1,3-dioxane-2-yl)phenyl)difluoromethoxy)-2,6-difluorophenol (3.0 g, 6.88 mmol) prepared by a publicly known method and sodium hydride (55%; 0.30 g, 6.88 mmol) were stirred in N-methylpyrrolidone at 60° C. for 30 minutes. Then, (E)-1-chloro-3,3,3-trifluoro-1-propene (2.25 g, 17.2 mmol) was added to the reaction mixture, and the resulting mixture was stirred at 130°

C. for 24 hours. The reaction mixture was poured into water and extracted with toluene. A combined organic layer was washed with water and saturated brine, then, dried with magnesium sulfate, and the solvent was distilled off by an evaporator. The resulting residue was purified by silica gel chromatography and recrystallization to give a (E) isomer of compound No. 44 (yield 44%).

$^1$H-NMR (CDCl$_3$) (δ ppm): 7.22-7.17 (m, 1H), 7.17-7.13 (m, 2H), 7.01-6.95 (m, 2H), 5.37 (s, 1H), 5.25 (dq, 1H), 4.24 (dd, 2H), 3.53 (dd, 2H), 2.13 (m, 1H), 1.39-1.30 (m, 2H), 1.3-1.06 (m, 2H), 0.93 (t, 3H).

A liquid crystal composition was prepared from 15% by weight of a compound ((E) isomer of No. 44) and 85% by weight of a base liquid crystal. Physical properties of the liquid crystal composition obtained were measured, and values of physical properties of the compound were calculated by extrapolating the measured values. The results were as described below.

Phase transition temperature: C 59.1 I. Maximum temperature (NI)=−16.3° C.; dielectric anisotropy (Δ∈)=36.6; optical anisotropy (Δn)=0.070; viscosity (η)=78.8 mPa·s.

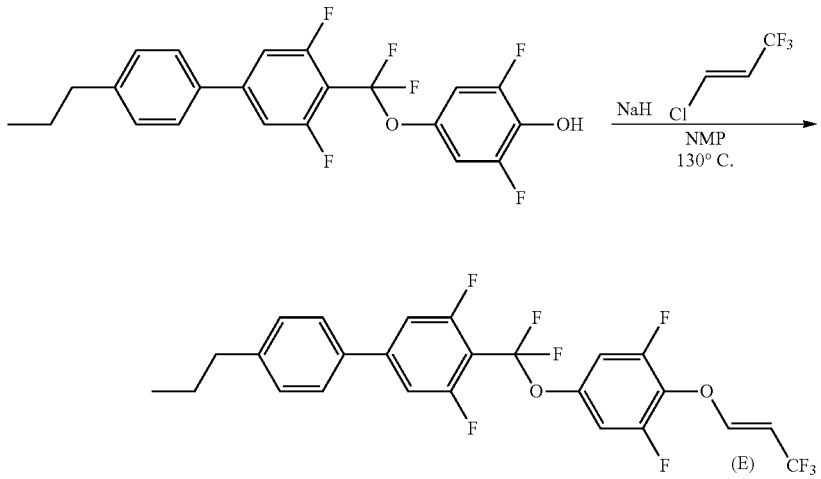

(No. 32)

Example 3

Synthesis of (E)-4-((3,5-difluoro-4-((3,3,3-trifluoro-1-propene-1-yl)oxy)phenoxy)difluoromethyl)-3,5-difluoro-4'-propyl-1,1'-biphenyl((E) isomer of No. 32)

Then, 4-((3,5-difluoro-4'-propyl-[1,1'-biphenyl]-4-yl)difluoromethoxy)-2,6-difluorophenol (3.0 g, 7.04 mmol) prepared by a publicly known method and sodium hydride (55%; 0.31 g, 7.10 mmol) were stirred in N-methylpyrrolidone at 60° C. for 30 minutes. Then, (E)-1-chloro-3,3,3-trifluoro-1-propene (2.30 g, 17.6 mmol) was added to the reaction mixture, and the resulting mixture was stirred at 130° C. for 24 hours. The reaction mixture was poured into water and extracted with toluene. A combined organic layer was washed with water and saturated brine, then, dried over magnesium sulfate, and the solvent was distilled off by an evaporator. The resulting residue was purified by silica gel chromatography and recrystallization to give a (E) isomer of compound No. 32 (yield 48%).

$^1$H-NMR (CDCl$_3$) (δ ppm): 7.51-7.47 (m, 2H), 7.31-7.28 (m, 2H), 7.24-7.18 (m, 3H), 7.05-6.99 (m, 2H), 5.26 (dq, 1H), 2.65 (t, 2H), 1.68 (tq, 2H), 0.97 (t, 3H).

A liquid crystal composition was prepared from 15% by weight of a compound ((E) isomer of No. 32), and 85% by weight of the base liquid crystal. Physical properties of the liquid crystal composition obtained were measured, and values of physical properties of the compound were calculated by extrapolating the measured values. The results were as described below.

Phase transition temperature: C 43.6 I. Maximum temperature (NI)=−9.6° C.; dielectric anisotropy (Δ∈)=33.2; optical anisotropy (Δn)=0.110; viscosity (η)=80.8 mPa·s.

Example 4

Synthesis of (E)-4-((3,5-difluoro-4-((3,3,3-trifluoro-1-propene-1-yl)oxy)phenoxy)difluoromethyl)-4'-propyl-1,1'-biphenyl ((E) isomer of No. 31)

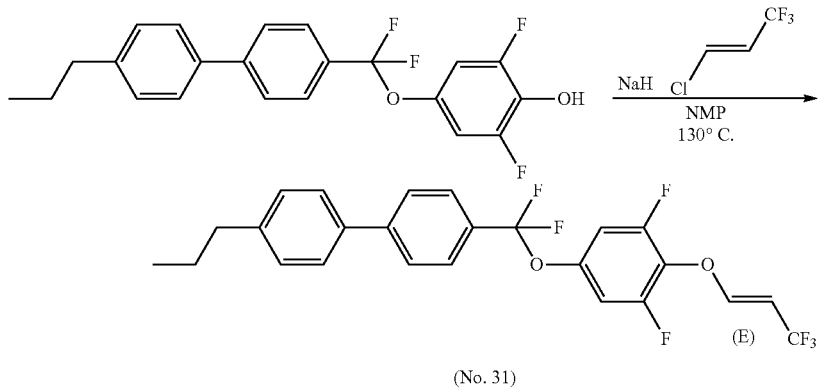

(No. 31)

Then, 4-((difluoro(4'-propyl-[1,1'-biphenyl]-4-yl)methoxy)-2,6-difluorophenol (3.0 g, 7.69 mmol) prepared by a publicly known method and sodium hydride (55%; 0.336 g, 7.70 mmol) were stirred at 60° C. for 30 minutes in N-methylpyrrolidone. Then, (E)-1-chloro-3,3,3-trifluoro-1-propene (2.51 g, 19.2 mmol) was added to the reaction mixture and the resulting mixture was stirred at 130° C. for 24 hours. The reaction mixture was poured into water and extracted with toluene. A combined organic layer was washed with water and saturated brine, then, dried over magnesium sulfate, and the solvent was distilled off by an evaporator. The resulting residue was purified by silica gel chromatography and recrystallization to give a (E) isomer of compound No. 31 (yield 54%).

$^1$H-NMR (CDCl$_3$) (δ ppm): 7.77-7.73 (m, 2H), 7.72-7.68 (m, 2H), 7.56-7.52 (m, 2H), 7.31-7.27 (m, 2H), 7.24-7.19 (m, 1H), 7.04-6.98 (m, 2H), 5.26 (dq, 1H), 2.65 (t, 2H), 1.69 (tq, 2H), 0.98 (t, 3H).

A liquid crystal composition was prepared from 15% by weight of a compound ((E) isomer of No. 31) and 85% by weight of a base liquid crystal. Physical properties of the liquid crystal composition obtained were measured, and values of physical properties of the compound were calculated by extrapolating the measured values. The results were as described below.

Phase transition temperature: C 89.0 C 91.6 I. Maximum temperature (NI)=−29.7° C.; dielectric anisotropy (Δ∈)=25.9; optical anisotropy (Δn)=0.137; viscosity (η)=65.5 mPa·s.

Example 5

Synthesis of (E)-4-((3,5-difluoro-4-((3,3,3-trifluoro-1-propene-1-yl)oxy)phenoxy)difluoromethyl)-3,5-difluoro-4'-(4-propylcyclohexyl)-1,1'-biphenyl ((E) isomer of No. 78)

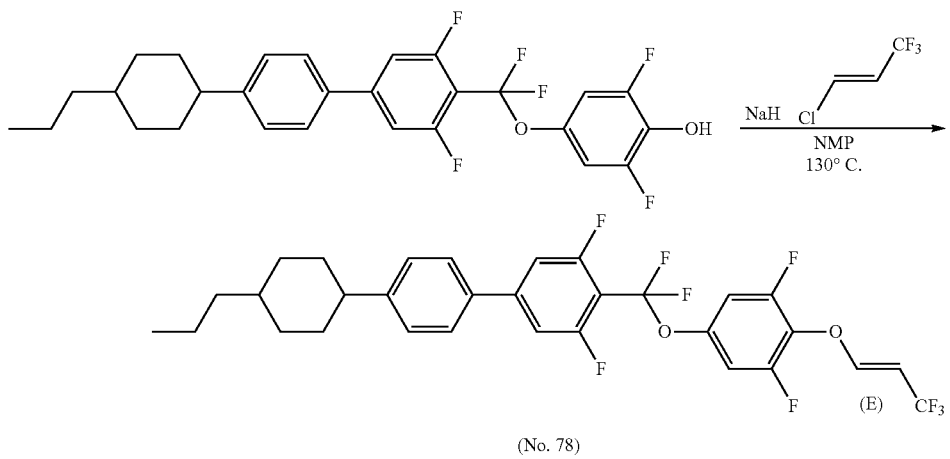

(No. 78)

Then, 4-((3,5-difluoro-4'-(4-propylcyclohexyl)-[1,1'-biphenyl]-4-yl)difluoromethoxy)-2,6-difluorophenol (3.0 g, 5.90 mmol) prepared by a publicly known method and sodium hydride (55%; 0.257 g, 5.90 mmol) were stirred in N-methylpyrrolidone at 60° C. for 30 minutes. Then, (E)-1-chloro-3,3,3-trifluoro-1-propene (1.93 g, 14.8 mmol) was added to the reaction mixture, and the resulting mixture was stirred at 130° C. for 24 hours. The reaction mixture was poured into water and extracted with toluene. A combined organic layer was washed with water and saturated brine, then, dried over magnesium sulfate, and the solvent was distilled off by an evaporator. The resulting residue was purified by silica gel chromatography and recrystallization to give a (E) isomer of compound No. 78 (yield 61%).

$^1$H-NMR (CDCl$_3$) (δ ppm): 7.52-7.47 (m, 2H), 7.35-7.30 (m, 2H), 7.24-7.17 (m, 3H), 7.05-6.98 (m, 2H), 5.26 (dq, 1H), 2.53 (tt, 1H), 1.96-1.85 (m, 4H), 1.56-1.43 (m, 2H), 1.42-1.27 (m, 3H), 1.27-1.20 (m, 2H), 1.13-1.02 (m, 2H), 0.91 (t, 3H).

A liquid crystal composition was prepared from 15% by weight of a compound ((E) isomer of No. 78) and 85% by weight of a base liquid crystal. Physical properties of the liquid crystal composition obtained were measured, and values of physical properties of the compound were calculated by extrapolating the measured values. The results were as described below.

Phase transition temperature: C 101.2 N 130.1 I. Maximum temperature (NI)=97.0° C.; dielectric anisotropy (Δ∈)=31.4; optical anisotropy (Δn)=0.150; viscosity (η)=111.7 mPa·s.

Example 6

Synthesis of (E)-2-(4'-((3,5-difluoro-4-((3,3,3-trifluoro-1-propene-1-yl)oxy)phenoxy)difluoromethyl)-2,3',5'-trifluoro-[1,1'-biphenyl]-4-yl)-5-propyl-1,3-dioxane ((E) isomer of No. 121)

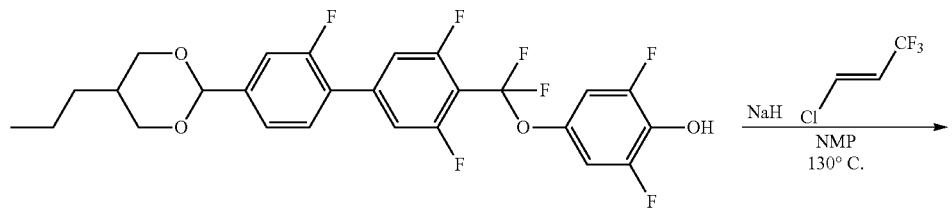

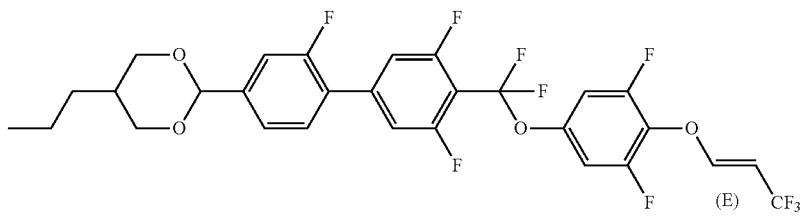

(No. 121)

Then, 4-(difluoro(2',3,5-trifluoro-4'-(5-propyl-1,3-dioxane-2-yl)-[1,1'-biphenyl]-4-yl)methoxy)-2,6-difluorophenol (3.0 g, 5.85 mmol) prepared by a publicly known method and sodium hydride (55%; 0.255 g, 5.85 mmol) were stirred in N-methylpyrrolidone at 60° C. for 30 minutes. Then, (E)-1-chloro-3,3,3-trifluoro-1-propene (1.91 g, 14.6 mmol) was added to the reaction mixture, and the resulting mixture was stirred at 130° C. for 24 hours. The reaction mixture was poured into water and extracted with toluene. A combined organic layer was washed with water and saturated brine, then, dried over magnesium sulfate, and the solvent was distilled off by an evaporator. The resulting residue was purified by silica gel chromatography and recrystallization to give a (E) isomer of compound No. 121 (yield 57%).

$^1$H-NMR (CDCl$_3$) (δ ppm): 7.45-7.40 (m, 1H), 7.40-7.34 (m, 2H), 7.24-7.18 (m, 3H), 7.05-6.99 (m, 2H), 5.44 (s, 1H), 5.21 (dq, 1H), 4.29-4.23 (m, 2H), 3.59-3.52 (m, 2H), 2.16 (m, 1H), 1.35 (m, 2H), 1.10 (m, 2H), 0.94 (t, 3H).

A liquid crystal composition was prepared from 15% by weight of a compound ((E) isomer of No. 121) and 85% by weight of a base liquid crystal. Physical properties of the liquid crystal composition obtained were measured, and values of physical properties of the compound were calculated by extrapolating the measured values. The results were as described below.

Phase transition temperature: C 73.8 SA 83.3 N 98.4 I. Maximum temperature (NI)=79.7° C.; dielectric anisotropy (Δ∈)=49.4; optical anisotropy (Δn)=0.137; viscosity (η)=125.7 mPa·s.

Example 7

Synthesis of (E)-4-((3,5-difluoro-4-((3,3,3-trifluoro-1-propene-1-yl)oxy)phenoxy)difluoromethyl)-2',3,5-trifluoro-4"-propyl-1,1':4',1"-terphenyl ((E) isomer of No. 122)

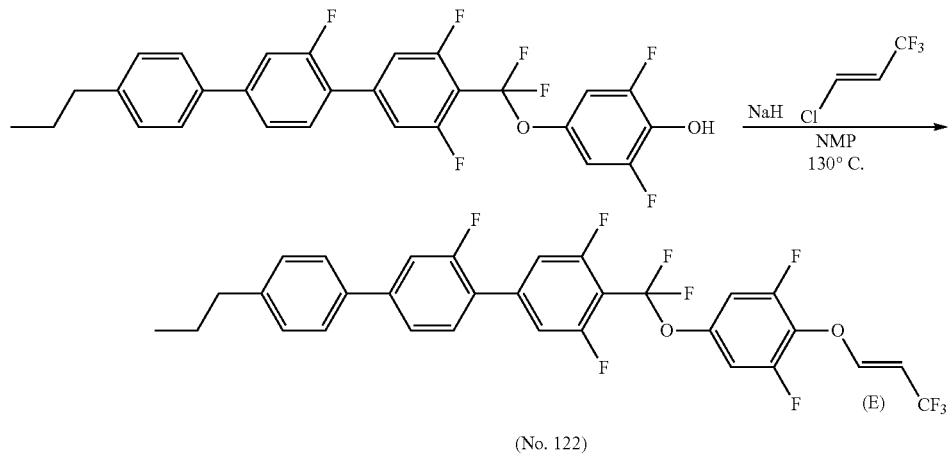

(No. 122)

Then, 4-(difluoro(2'-3,5-trifluoro-4"-propyl-[1,1':4',1"-terphenyl]-4-yl)methoxy)-2,6-difluorophenol (3.0 g, 5.97 mmol) prepared by a publicly known method and sodium hydride (55%; 0.261 g, 5.97 mmol) were stirred in N-methylpyrrolidone at 60° C. for 30 minutes. Then, (E)-1-chloro-3,3,3-trifluoro-1-propene (1.95 g, 14.9 mmol) was added to the reaction mixture and the resulting mixture was stirred at 130° C. for 24 hours. The reaction mixture was poured into water and extracted with toluene. A combined organic layer was washed with water and saturated brine, then, dried over magnesium sulfate, and the solvent was distilled off by an evaporator. The resulting residue was purified by silica gel chromatography and recrystallization to give a (E) isomer of compound No. 122 (yield 62%).

$^1$H-NMR (CDCl$_3$) (δ ppm): 7.56-7.52 (m, 2H), 7.51-7.47 (m, 2H), 7.45-7.40 (m, 1H), 7.32-7.25 (m, 4H), 7.24-7.18 (m, 1H), 7.06-7.00 (m, 2H), 5.26 (dq, 1H), 2.65 (t, 2H), 1.69 (dq, 2H), 0.98 (t, 3H).

A liquid crystal composition was prepared from 15% by weight of a compound ((E) isomer of No. 122) and 85% by weight of a base liquid crystal. Physical properties of the liquid crystal composition obtained were measured, and values of physical properties of the compound were calculated by extrapolating the measured values. The results were as described below.

Phase transition temperature: C 80.9 SC 102.5 N 123.0 I. Maximum temperature (NI)=83.7° C.; dielectric anisotropy (Δε)=42.6; optical anisotropy (Δn)=0.124; viscosity (η)=116.3 mPa·s.

Example 8

Synthesis of (E)-4-butyl-4"-((3,5-difluoro-4-((3,3,3-trifluoro-1-propene-1-yl)oxy)phenoxy)difluoromethyl)-2,3',3",5,5"-pentafluoro-1,1':4',1"-terphenyl ((E) isomer of No. 123)

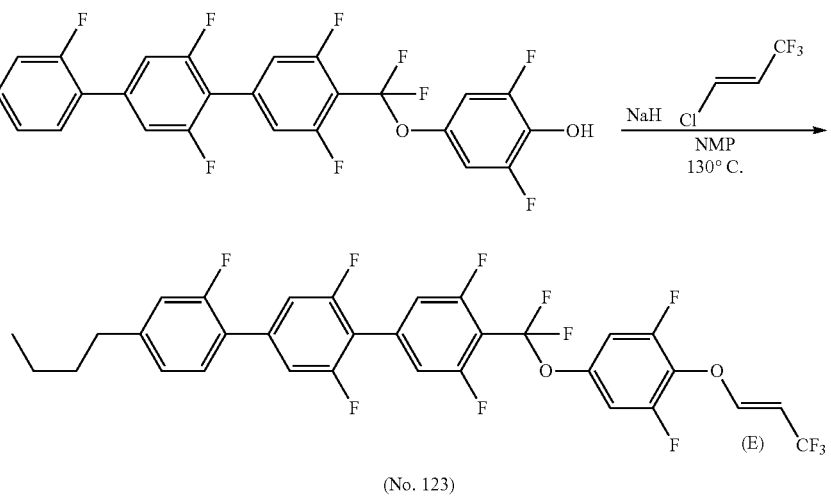

(No. 123)

Then, 4-((4''-butyl-2',2'',3,5,6'-pentafluoro[1,1':4',1''-terphenyl]-4-yl)difluoromethoxy)-2,6-difluorophenol (5.0 g, 8.77 mmol) and sodium hydride (55%; 0.210 g, 8.77 mmol) which were compounded by the publicly known method were stirred in N-methylpyrrolidone at 60° C. for 30 minutes. (E)-1-chloro-3,3,3-trifluoro-1-propene (2.86 g, 21.9 mmol) was added to the reaction mixture, and the resulting mixture was stirred at 130° C. for 24 hours. The reaction mixture was poured into water and extracted with toluene. A combined organic layer was washed with water and saturated brine, then, dried over magnesium sulfate, and the solvent was distilled off by an evaporator. The resulting residue was purified by silica gel chromatography and recrystallization to give a (E) isomer of compound No. 123 (yield 69%).

$^1$H-NMR (CDCl$_3$) (δ ppm): 7.38-7.34 (m, 1H), 7.28-7.18 (m, 5H), 7.10-7.06 (m, 1H), 7.06-7.01 (m, 3H), 5.27 (dq, 1H), 2.67 (t, 2H), 1.64 (tt, 2H), 1.39 (tq, 2H), 0.96 (t, 3H).

A liquid crystal composition was prepared from 5% by weight of a compound ((E) object of No. 123), and 95% by weight of a base liquid crystal. Physical properties of the liquid crystal composition obtained were measured, and values of physical properties of the compound were calculated by extrapolating the measured values. The results were as described below.

Phase transition temperature: C 109.1 I. Maximum temperature (NI)=45.7° C.; dielectric anisotropy (Δ∈)=54.1; optical anisotropy (Δn)=0.177; viscosity (η)=84.9 mPa·s.

Example 9

Synthesis of (Z)-4-((3,5-difluoro-4-((3,3,3-trifluoro-1-propene-1-yl)oxy)phenoxy)difluoromethyl)-3,5-difluoro-4'-(4-propylcyclohexyl)-1,1'-biphenyl ((Z) isomer of No. 78)

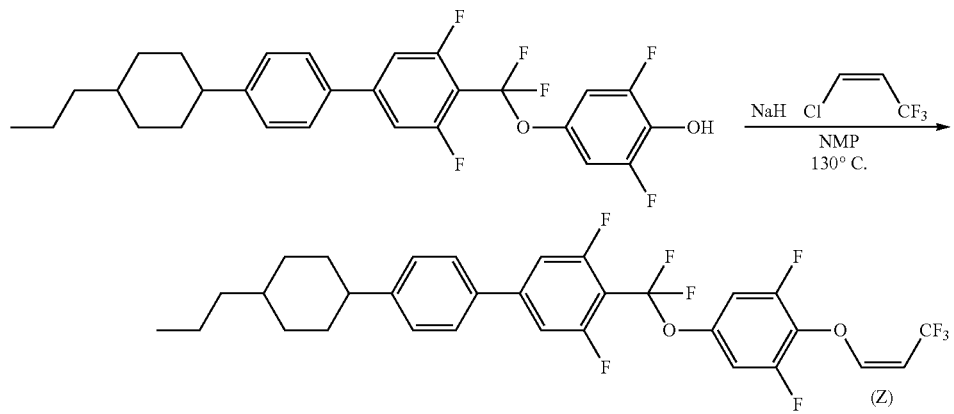

(No. 78)

Then, 4-((3,5-difluoro-4'-(4-propylcyclohexyl)-[1,1'-biphenyl]-4-yl)difluoromethoxy)-2,6-difluorophenol (4.0 g, 7.87 mmol) prepared by a publicly known method and sodium hydride (55%, 0.343 g, 7.87 mmol) were stirred in N-methylpyrrolidone at 60° C. for 30 minutes. Then, (Z)-1-chloro-3,3,3-trifluoro-1-propene (2.57 g, 19.7 mmol) was added to the reaction mixture, and the resulting mixture was stirred at 130° C. for 24 hours. The reaction mixture was poured into water and extracted with toluene. A combined organic layer was washed with water and saturated brine, then dried over magnesium sulfate, and the solvent was distilled off by an evaporator. The resulting residue was purified by silica gel chromatography and recrystallization to give a (Z) isomer of compound No. 78 (yield 64%).

$^1$H-NMR (CDCl$_3$) (δ ppm): 7.49 (dd, 2H), 7.32 (dd, 2H), 7.20 (dd, 2H), 6.99 (dd, 2H), 6.57-6.53 (m, 1H), 5.04 (dq, 1H), 2.53 (tt, 1H), 1.96-1.85 (m, 4H), 1.53-1.43 (m, 2H), 1.41-1.28 (m, 3H), 1.27-1.19 (m, 2H), 1.12-1.02 (m, 2H), 0.91 (t, 3H).

A liquid crystal composition was prepared from 15% by weight of a compound ((Z) isomer of No. 78) and 85% by weight of a base liquid crystal. Physical properties of the liquid crystal composition obtained were measured, and values of physical properties of the compound were calculated by extrapolating the measured values. The results were as described below.

Phase transition temperature: C 94.9 N 188.0 I. Maximum temperature (NI)=130.4; dielectric anisotropy (Δ∈)=40.1; optical anisotropy (Δn)=0.170; viscosity (η)=76.1 mPa·s.

Example 10

Synthesis of (Z)-4-((3,5-difluoro-4-((3,3,3-trifluoro-1-propene-1-yl)oxy)phenoxy)difluoromethyl)-2',3,5-trifluoro-4"-prop yl-1,1':4',1"-terphenyl ((Z) isomer of No. 122)

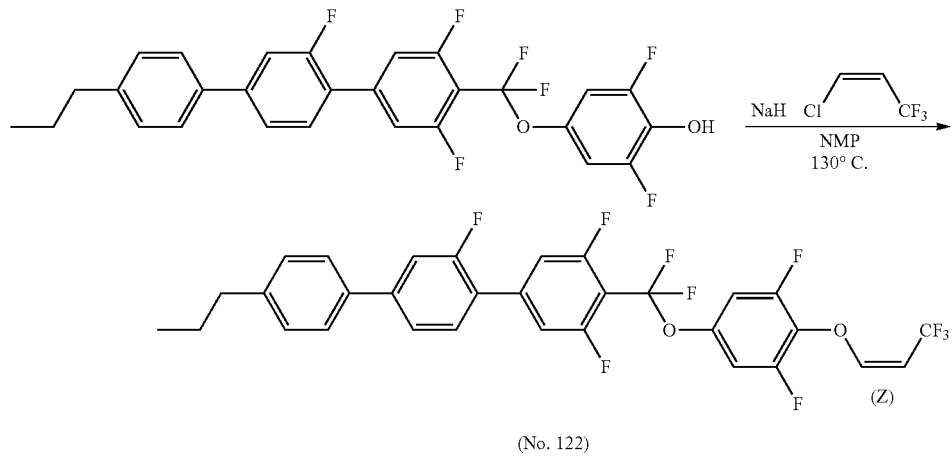

(No. 122)

Then, 4-(difluoro(2',3,5-trifluoro-4"-propyl-[1,1':4',1"-terphenyl]-4-yl)methoxy)-2,6-difluorophenol (3.0 g, 5.97 mmol) prepared by a publicly known method and sodium hydride (55%; 0.261 g, 5.97 mmol) were stirred in N-methylpyrrolidone at 60° C. for 30 minutes. Then, (Z)-1-chloro-3,3,3-trifluoro-1-propene (1.95 g, 14.9 mmol) was added to the reaction mixture and stirred at 130° C. for 24 hours. The reaction mixture was poured into water and extracted with toluene. A combined organic layer was washed with water and saturated brine, then, dried over magnesium sulfate, and the solvent was distilled off by an evaporator. The resulting residue was purified by silica gel chromatography and recrystallization to give a (Z) isomer of compound No. 122 (yield 63%).

$^1$H-NMR (CDCl$_3$) (δ ppm): 7.57-7.52 (m, 2H), 7.51-7.47 (m, 2H), 7.45-7.40 (m, 1H), 7.32-7.25 (m, 4H), 7.04-6.98 (m, 2H), 6.59-6.54 (m, 1H), 5.05 (dq, 1H), 2.65 (t, 2H), 1.69 (tq, 2H), 0.98 (t, 3H).

A liquid crystal composition was prepared from 10% by weight of a compound ((Z) isomer of No. 122) and 90% by weight of a base liquid crystal. Physical properties of the liquid crystal composition obtained were measured, and values of physical properties of the compound were calculated by extrapolating the measured values. The results were as described below.

Phase transition temperature: C 114.8 SA 150.5 N 189.9 I. Maximum temperature (NI)=117.7; dielectric anisotropy (Δ∈)=50.9; optical anisotropy (Δn)=0.217; viscosity (η)=88.1 mPa·s.

Example 11

Synthesis of (Z)-4-((3,5-difluoro-4-((3,3,3-trifluoro-1-propene-1-yl)oxy)phenoxy)difluoromethyl)-4'-propyl-1,1'-bi(cyclo hexane) ((Z) isomer of No. 38)

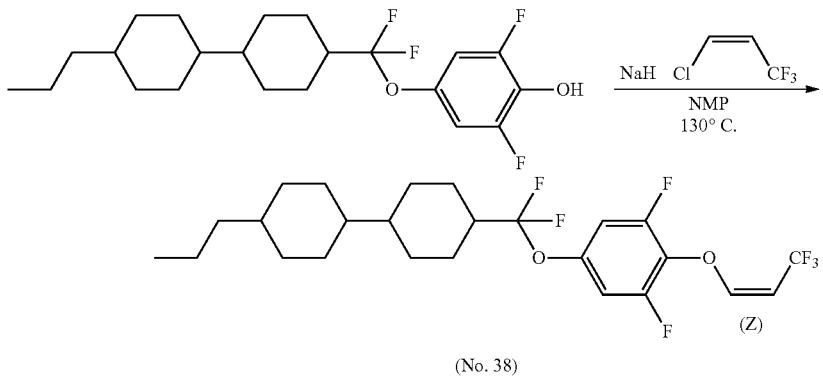

(No. 38)

Then, 4-(difluoro(4'-propyl-[1,1'-bi(cyclohexane)]-4-yl) methoxy)-2,6-difluorophenol (4.0 g, 9.94 mmol) prepared by a publicly known method and sodium hydride (55%; 0.434 g, 9.94 mmol) were stirred in N-methylpyrrolidone at 60° C. for 30 minutes. Then, (Z)-1-chloro-3,3,3-trifluoro-1-propene (3.24 g, 24.9 mmol) was added to the reaction mixture, and the reaction mixture was stirred at 130° C. for 24 hours. The reaction mixture was poured into water and extracted with toluene. A combined organic layer was washed with water and saturated brine, then dried over magnesium sulfate, and the solvent was distilled off by an evaporator. The resulting residue was purified by silica gel chromatography and recrystallization to give a (Z) isomer of compound No. 38 (yield 43%).

$^1$H-NMR (CDCl$_3$) (δ ppm): 6.85 (dd, 2H), 6.55-6.51 (m, 1H), 5.02 (dq, 1H), 2.05-1.92 (m, 3H), 1.88-1.81 (m, 2H), 1.79-1.68 (m, 4H), 1.39-1.25 (m, 4H), 1.20-0.93 (m, 9H), 0.91-0.80 (m, 5H).

A liquid crystal composition was prepared from 15% by weight of a compound ((Z) isomer of No. 38) and 85% by weight of a base liquid crystal. Physical properties of the liquid crystal composition obtained were measured, and values of physical properties of the compound were calculated by extrapolating the measured values. The results were as described below.

Phase transition temperature: C 65.2 N 169.7 I. Maximum temperature (NI)=119.0; dielectric anisotropy (Δ∈)=25.4; optical anisotropy (Δn)=0.104; viscosity (η)=52.8 mPa·s.

Example 12

Synthesis of (Z)-2-(4'-((3,5-difluoro-4-((3,3,3-trifluoro-1-propene-1-yl)oxy)phenoxy)difluoromethyl)-2,3',5'-trifluoro-[1,1'-biphenyl]-4-yl)-5-propyl-1,3-dioxane ((Z) isomer of No. 121)

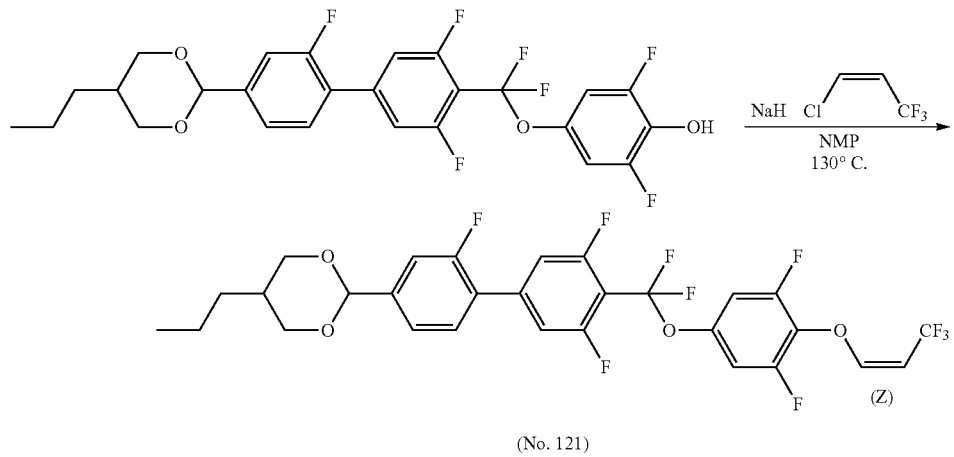

(No. 121)

Then, 4-(difluoro(2',3,5-trifluoro-4'-(5-propyl-1,3-dioxane-2-yl)-[1,1'-biphenyl]-4-yl)methoxy)-2,6-difluorophenol (4.0 g, 7.54 mmol) prepared by a publicly known method and sodium hydride (55%; 0.329 g, 7.54 mmol) were stirred in N-methylpyrrolidone at 60° C. for 30 minutes. Then, (Z)-1-chloro-3,3,3-trifluoro-1-propene (2.46 g, 18.9 mmol) was added to the reaction mixture, and the resulting mixture was stirred at 130° C. for 24 hours. The reaction mixture was poured into water and extracted with toluene. A combined organic layer was washed with water and saturated brine, then dried over magnesium sulfate, and the solvent was distilled off by an evaporator. The resulting residue was purified by silica gel chromatography and recrystallization to give a (Z) isomer of compound No. 121 (yield 61%).

$^1$H-NMR (CDCl$_3$) (δ ppm): 7.45-7.40 (m, 1H), 7.40-6.34 (m, 2H), 7.23-7.17 (m, 2H), 7.02-6.97 (m, 2H), 6.56 (m, 1H), 5.44 (s, 1H), 5.04 (dq, 1H), 4.28-4.23 (m, 2H), 3.59-3.52 (m, 2H), 2.16 (m, 1H), 1.40-1.31 (m, 2H), 1.14-1.08 (m, 2H), 0.94 (t, 3H).

A liquid crystal composition was prepared from 10% by weight of a compound ((Z) isomer of No. 121), and 90% by weight of a base liquid crystal. Physical properties of the liquid crystal composition obtained were measured, and values of physical properties of the compound were calculated by extrapolating the measured values. The results were as described below.

Phase transition temperature: C 109.4 N 160.7 I. Maximum temperature (NI)=108.7; dielectric anisotropy (Δ∈)=56.9; optical anisotropy (Δn)=0.157; viscosity (η)=98.6 mPa·s.

According to the already-described synthesis methods of compound (1) and the synthesis procedures described in Examples 1 to 12, compounds (No. 1 to No. 123) described below can be prepared.

89     90
1
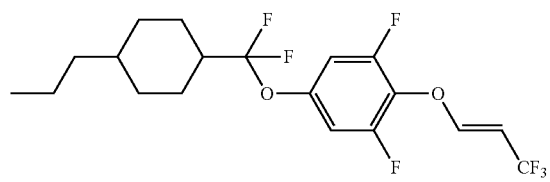
2
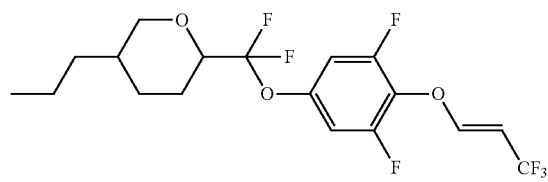
3
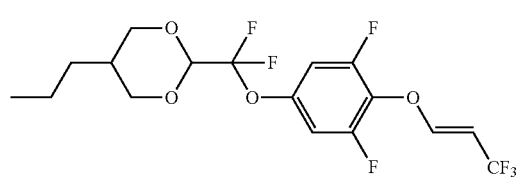
4
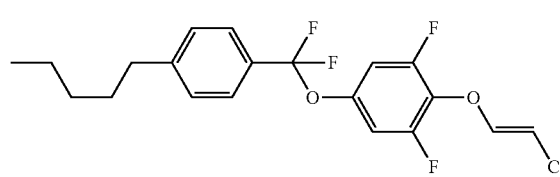
5
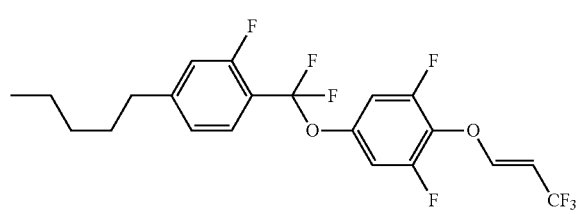
6
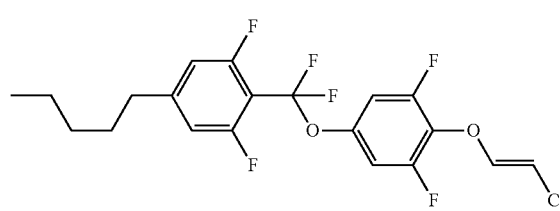
7
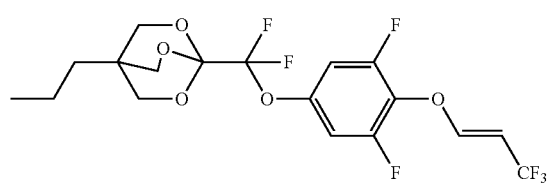
8
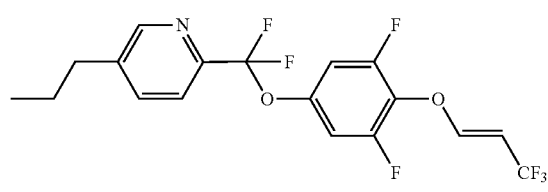
9
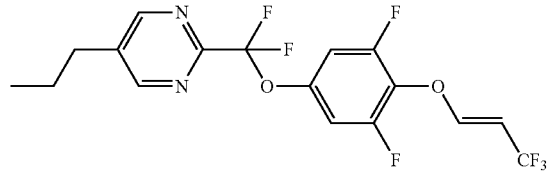
10
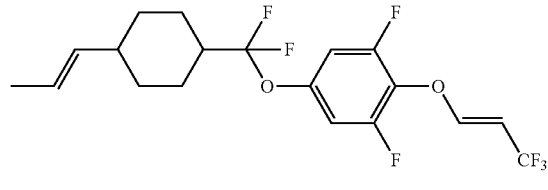
11
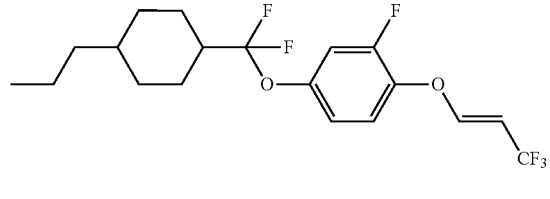
12
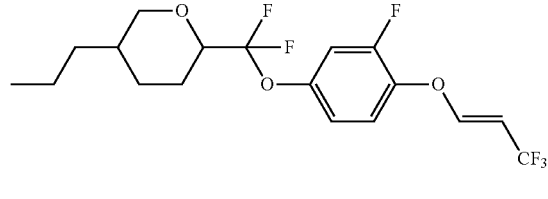
13
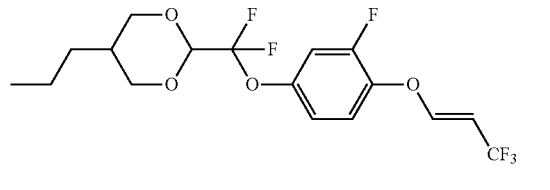
14
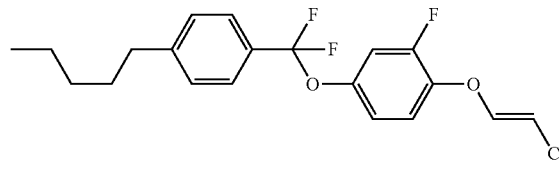
15
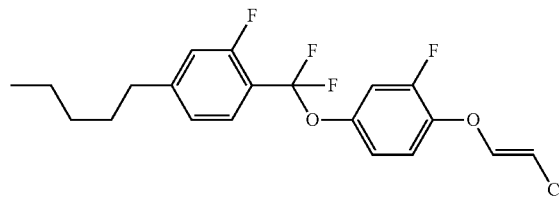
16
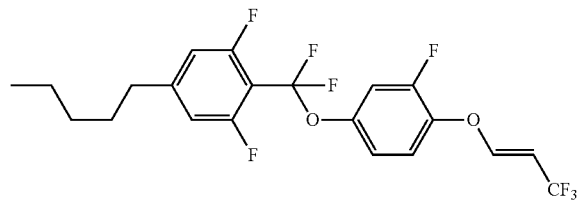

-continued
| 17 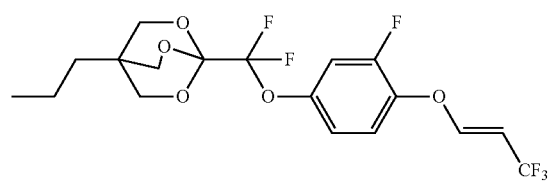 | 18 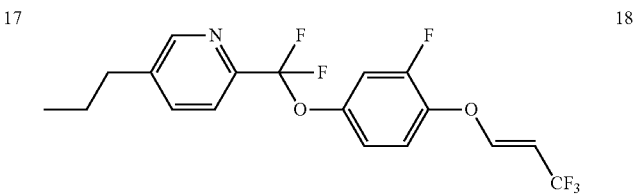 |
| --- | --- |
| 19 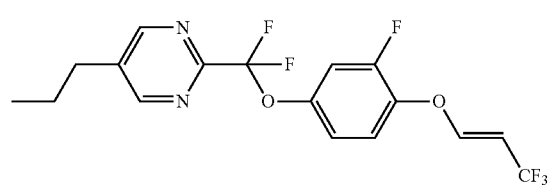 | 20 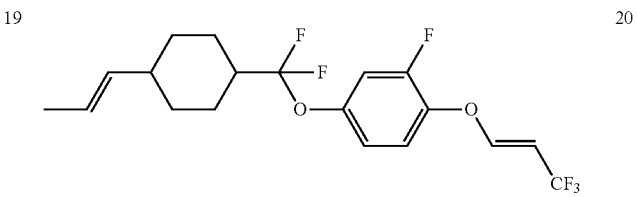 |
| 21 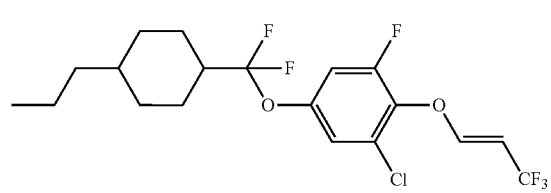 | 22 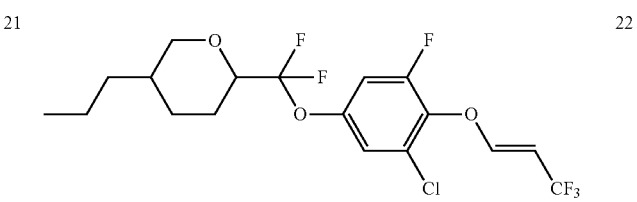 |
| 23 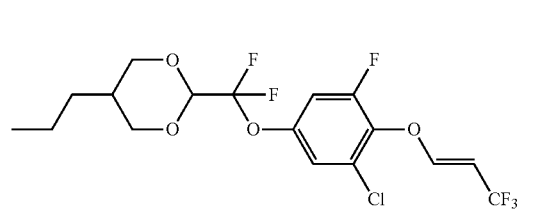 | 24 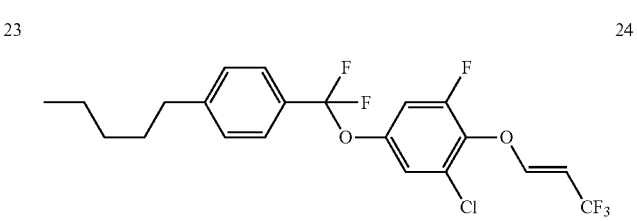 |
| 25 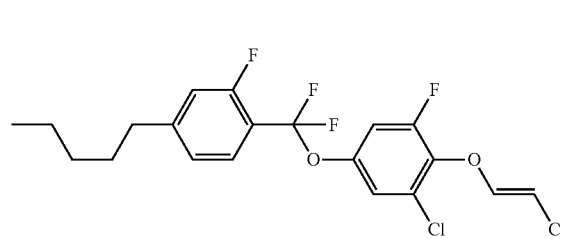 | 26 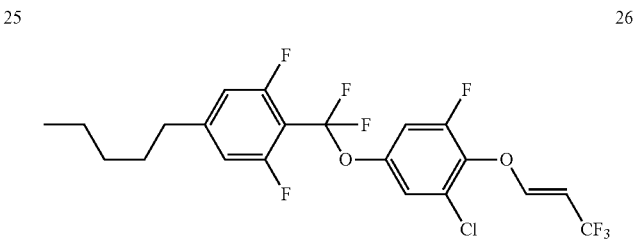 |
| 27 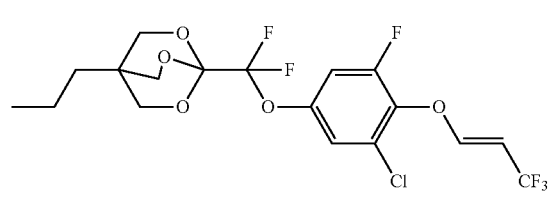 | 28 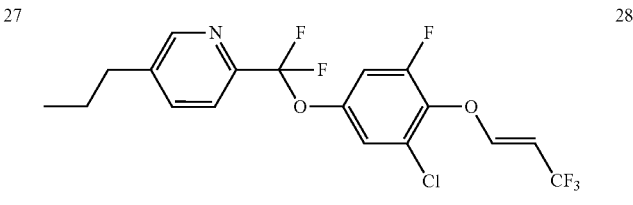 |
| 29 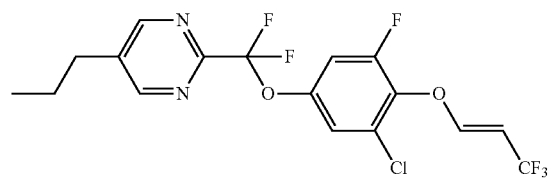 | 30 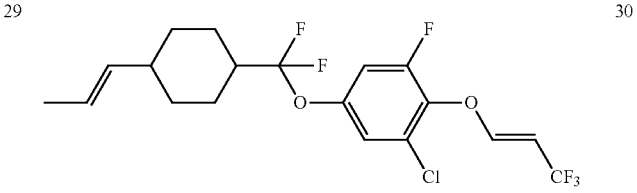 |
| 31 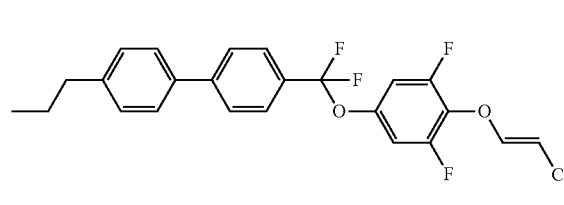 | 32 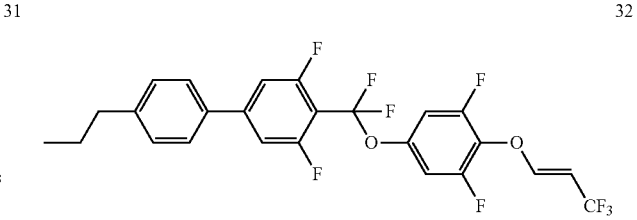 |

-continued
33 34
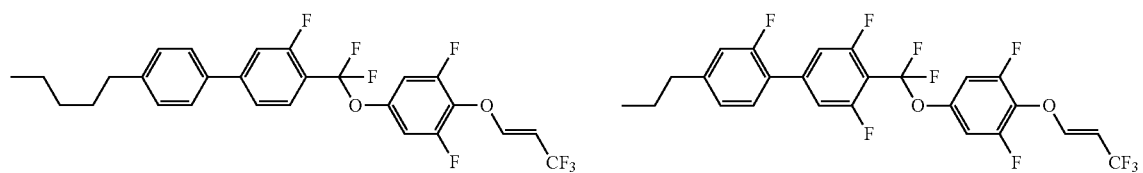
35 36
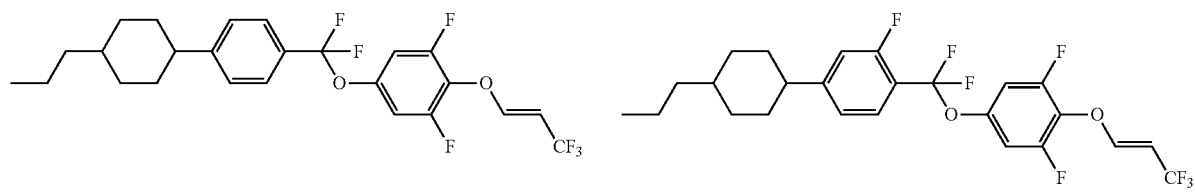
37 38
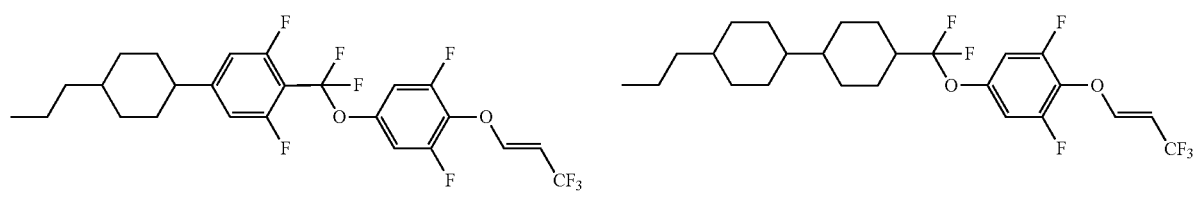
39 40
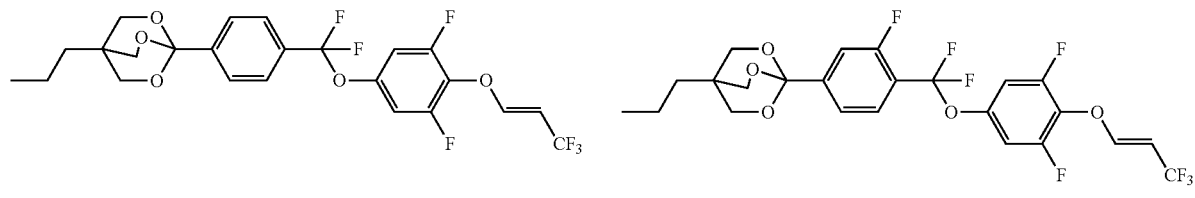
41 42
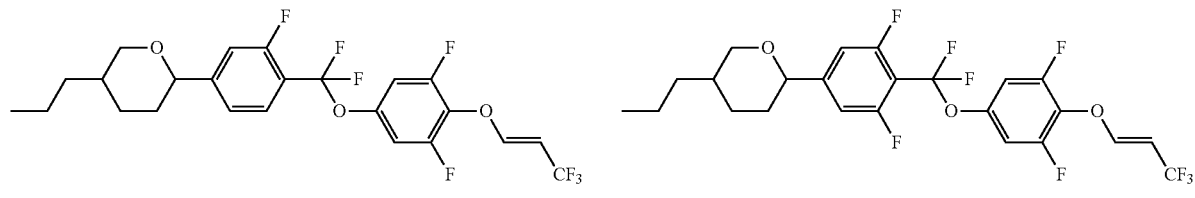
43 44
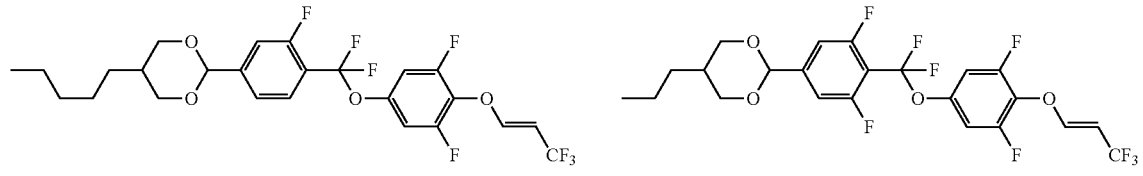
45 46
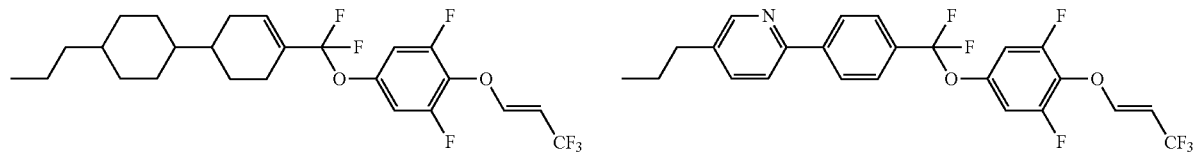

-continued
47
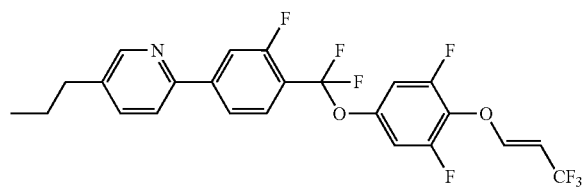
48
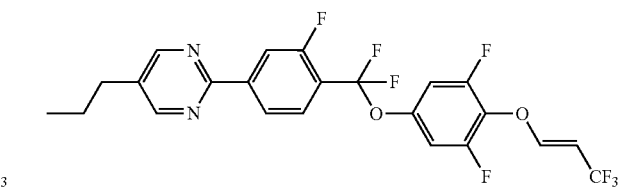
49
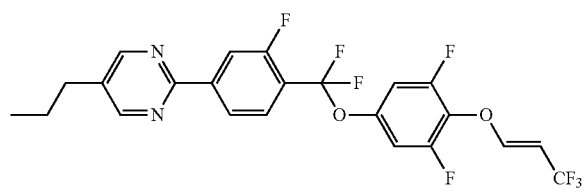
50
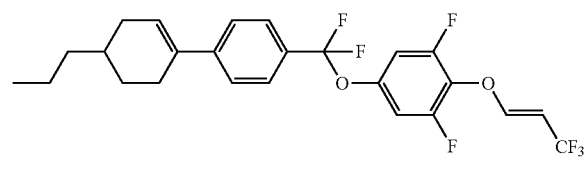
51
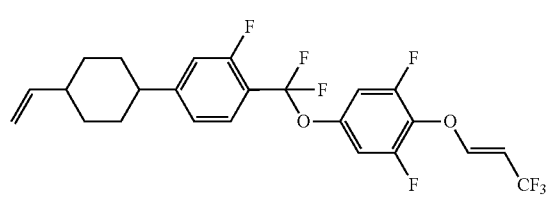
52
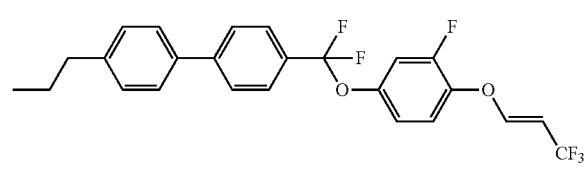
53
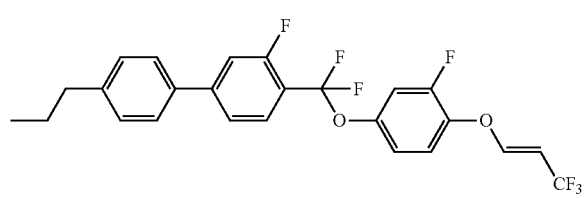
54
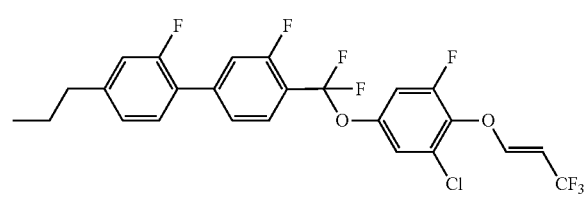
55
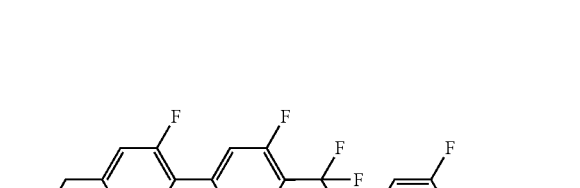
56
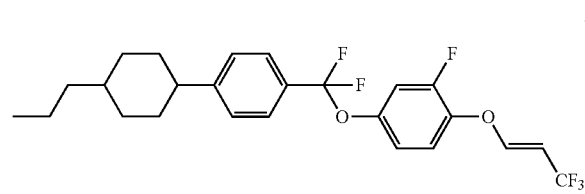
57
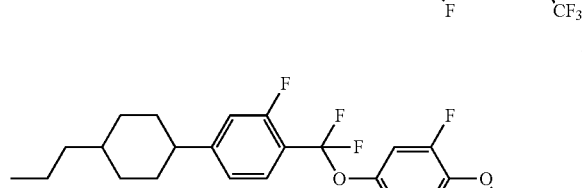
58
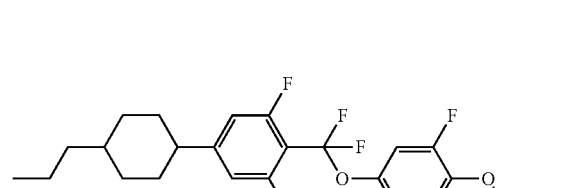
59
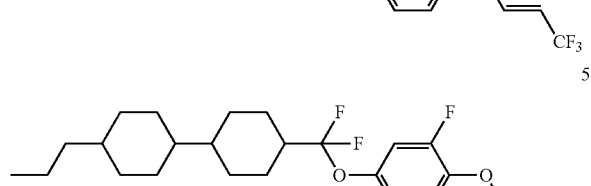
60
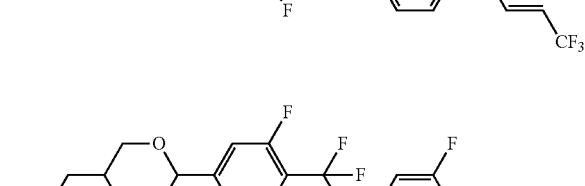

-continued
61 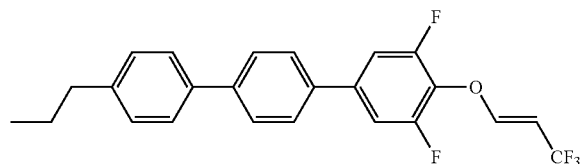
62 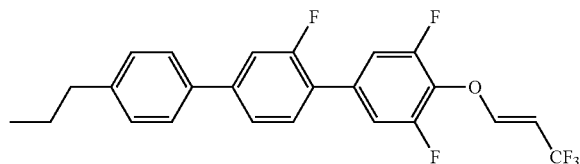
63 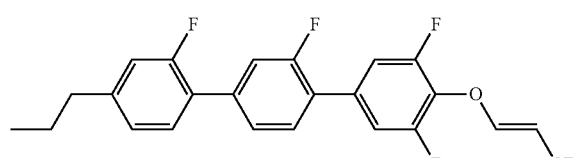
64 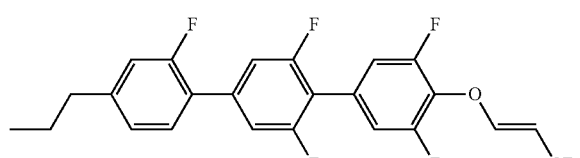
65 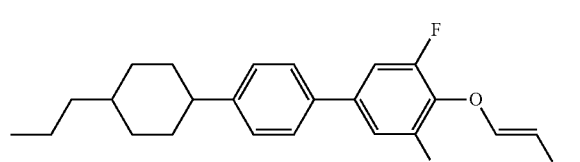
66 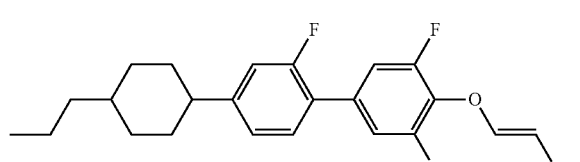
67 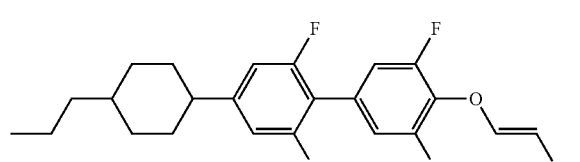
68 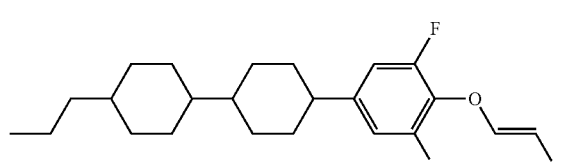
69 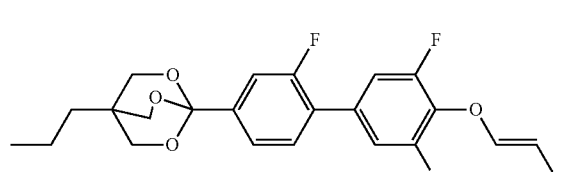
70 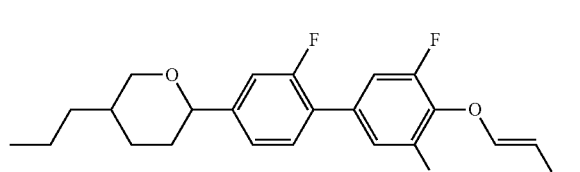
71 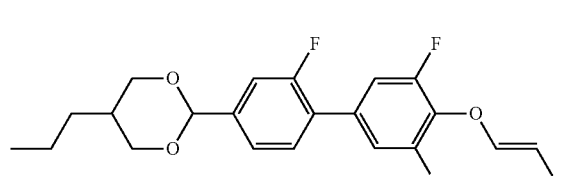
72 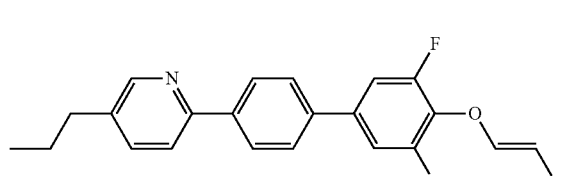
73 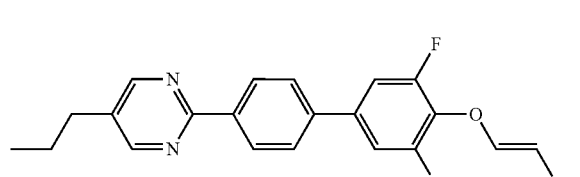
74 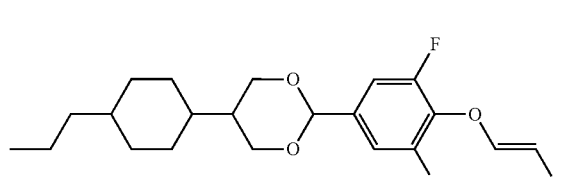
75 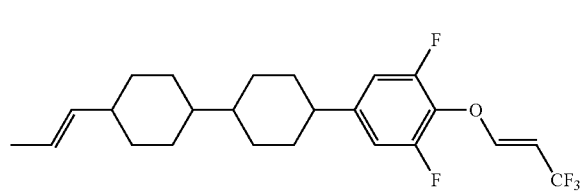

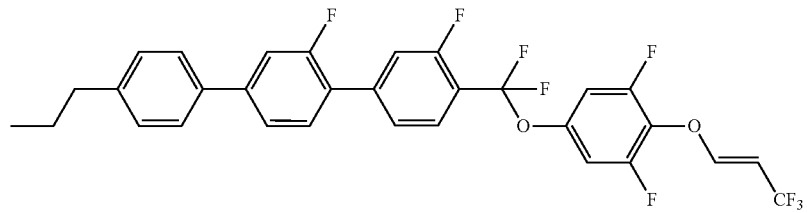
76
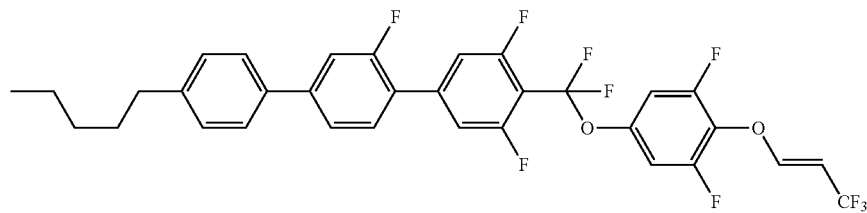
77
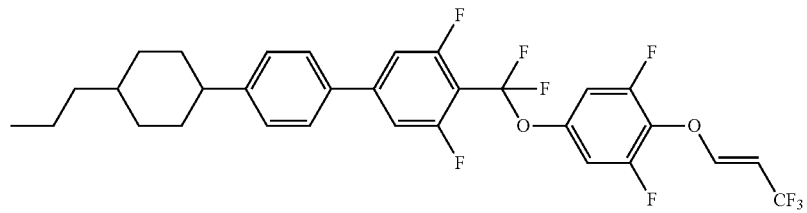
78
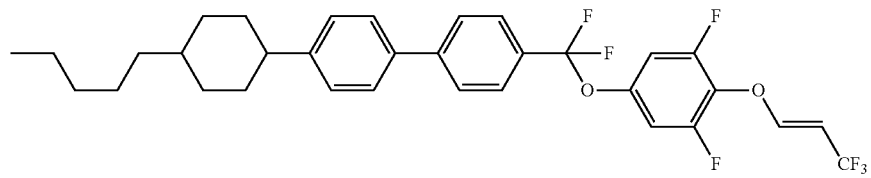
79
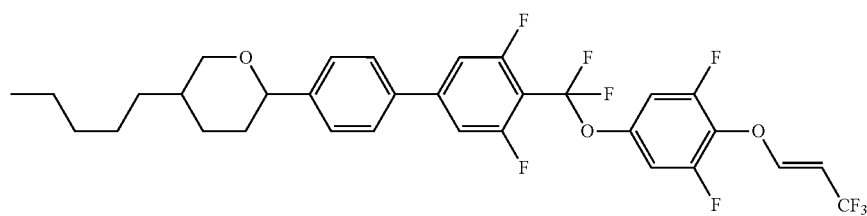
80
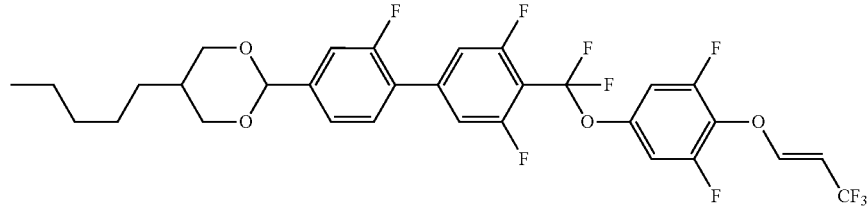
81
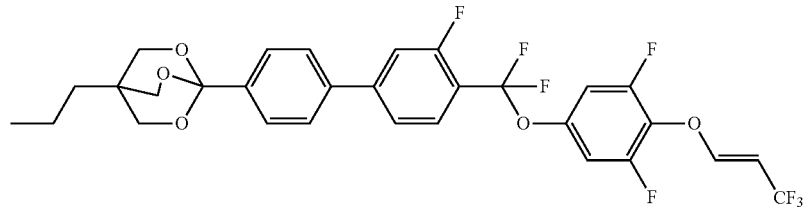
82

83
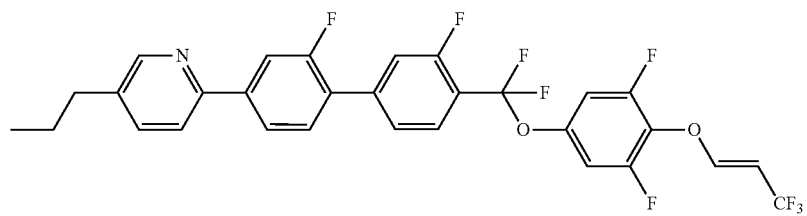
84
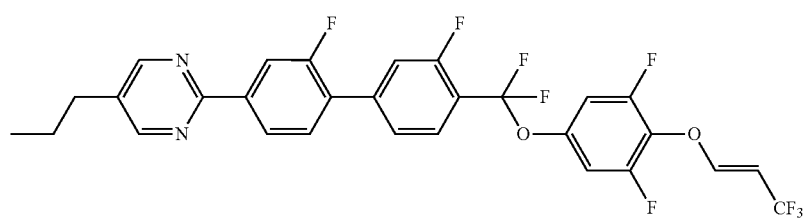
85
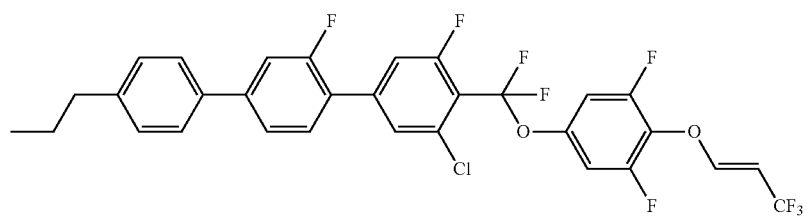
86
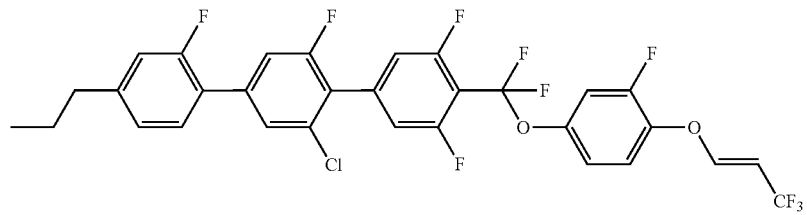
87
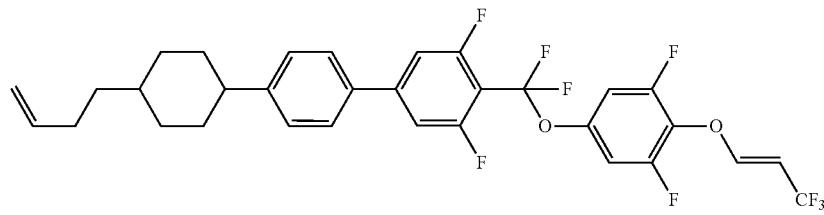
88
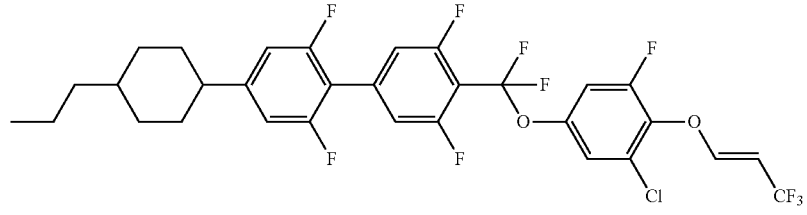
89
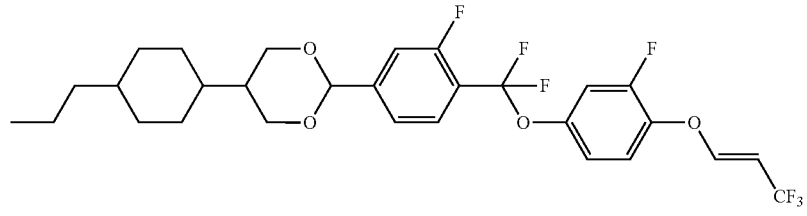

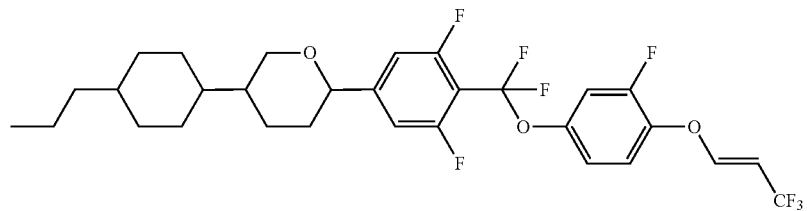
90
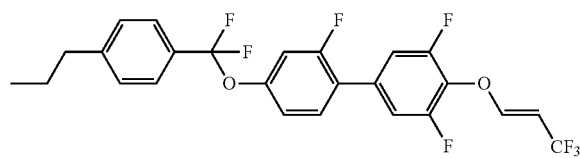
91 92
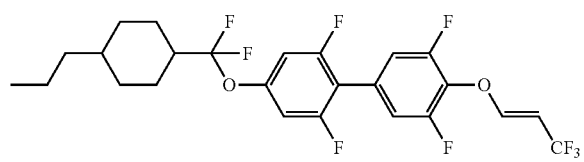
93 94
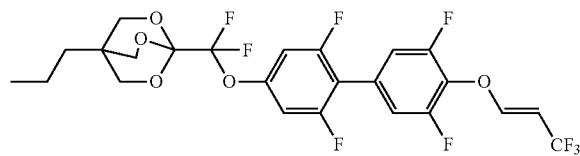
95 96
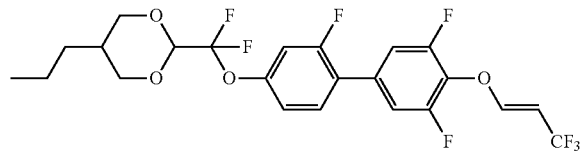
97 98
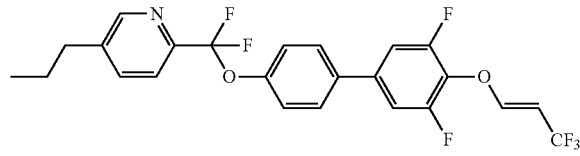
99 100
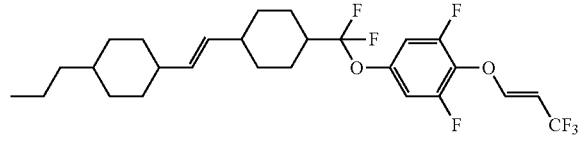
101 102
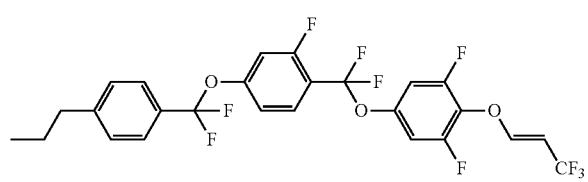
103 104

-continued
| | |
|---|---|
| 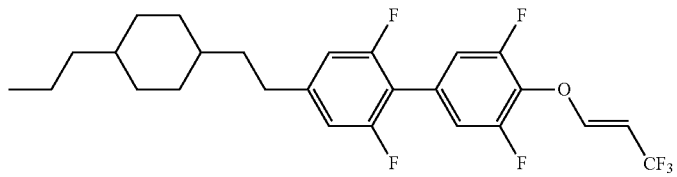 | 105 |
| 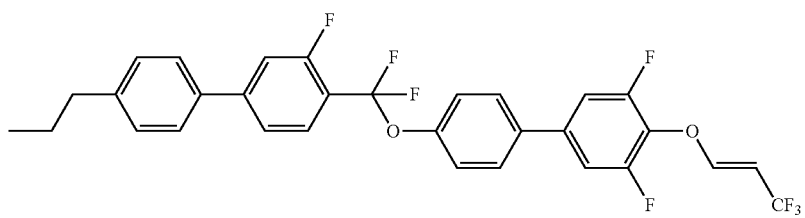 | 106 |
| 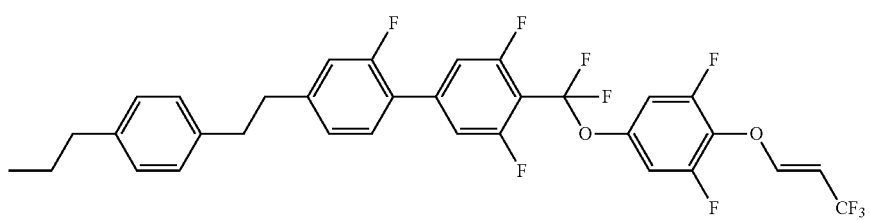 | 107 |
| 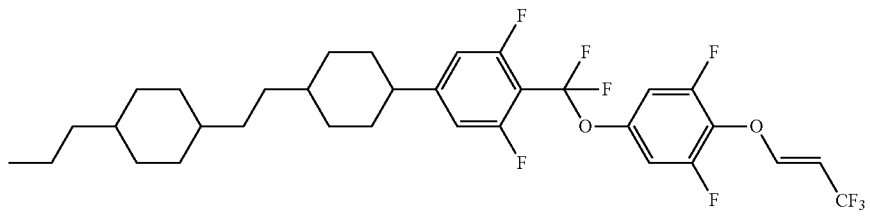 | 108 |
| 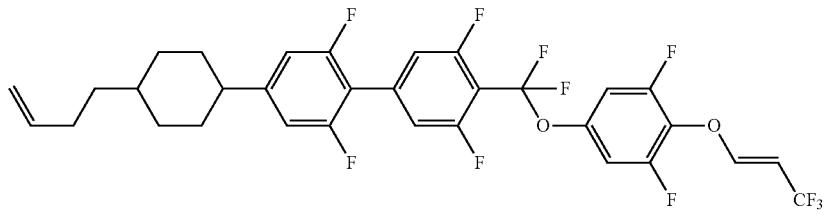 | 109 |
| 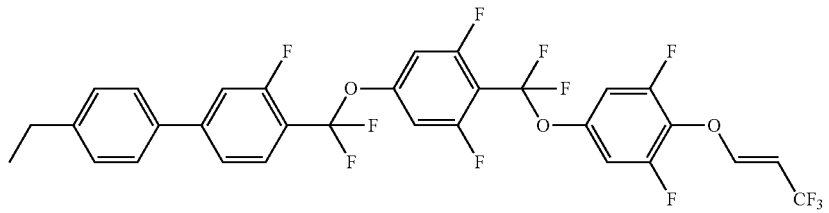 | 110 |
| 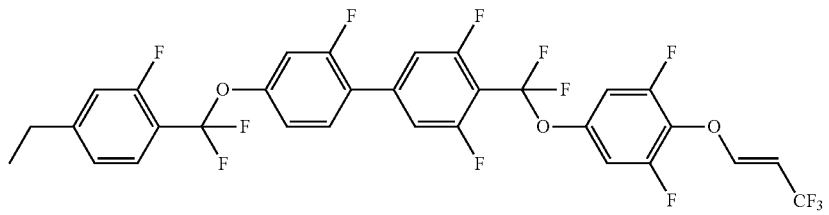 | 111 |

112
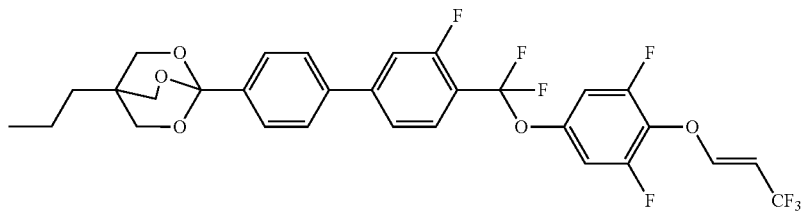
113
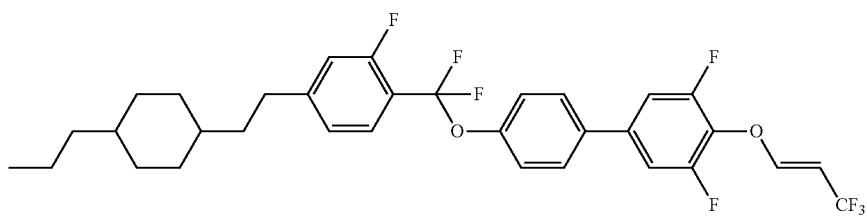
114
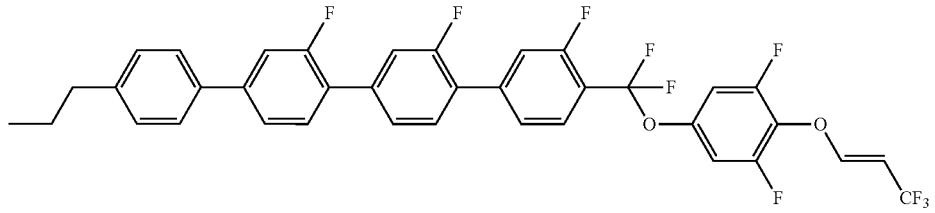
115
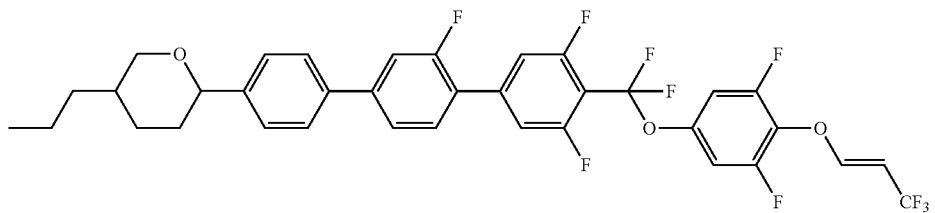
116
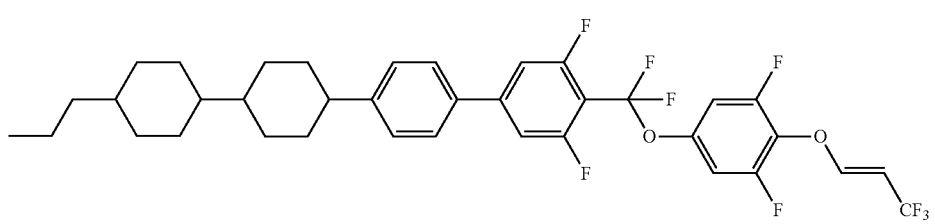
117
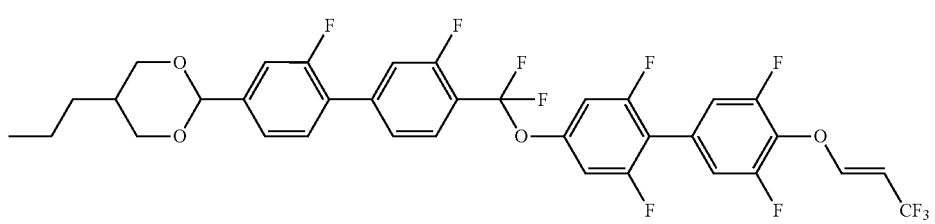
118
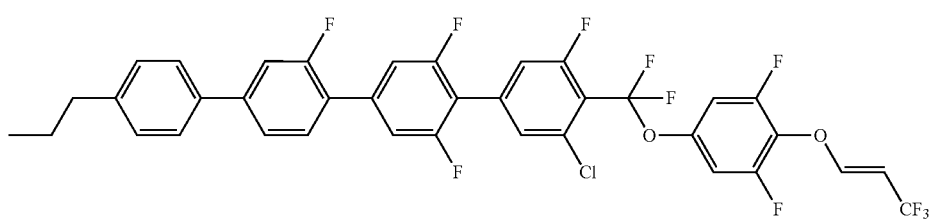

-continued

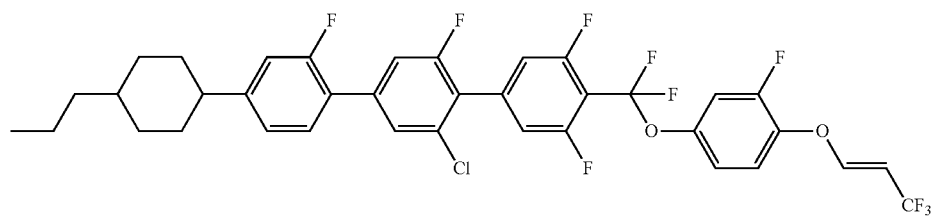

119

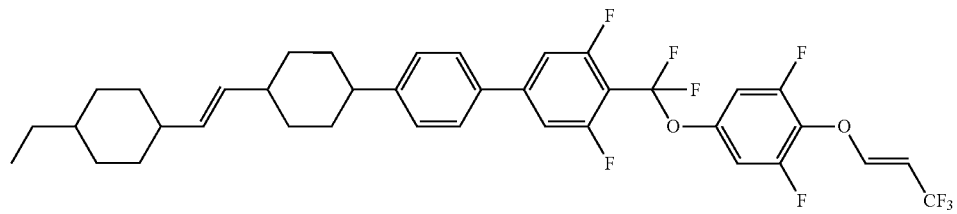

120

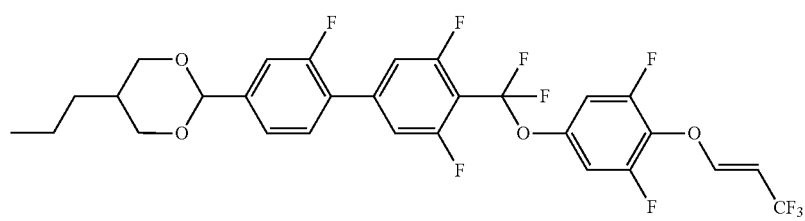

121

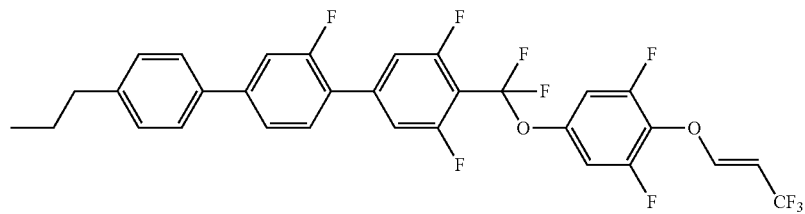

122

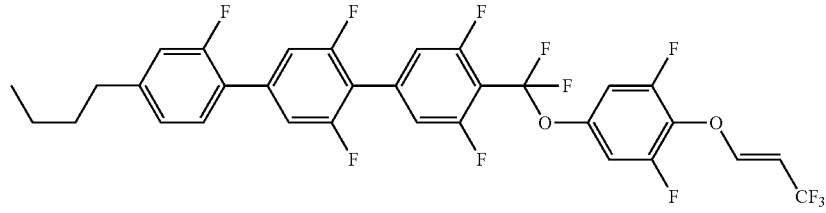

123

Comparative Example 1

Synthesis of Compound 1-(4-propylcyclohexyl)-4-((3,3,3-trifluoro-1-propene-1-yl)oxy)benzene (A) Described in Patent literature No. 1 (DE 19959721 A)

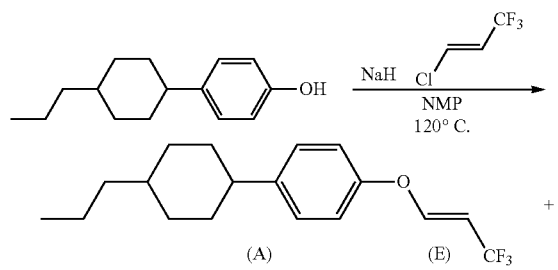

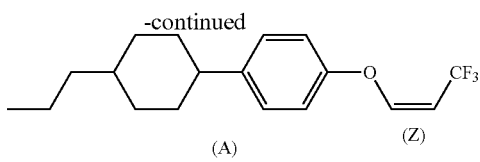

Then, 4-(4-propylcyclohexyl) phenol (3.35 g, 15.3 mmol) and sodium hydride (55%; 0.772 g, 16.1 mmol) were stirred in N-methylpyrrolidone at 60° C. for 30 minutes. To the reaction mixture, (E)-1-chloro-3,3,3-trifluoro-1-propene (5.00 g, 38.3 mmol) was added, and the resulting reaction mixture was stirred at 130° C. for 24 hours. The reaction mixture was poured into water and extracted with toluene. A combined organic layer was washed with water and saturated brine, then, dried over magnesium sulfate, and the solvent was distilled off by an evaporator. The resulting residue was a mixture of a compound ((E) isomer of A), and a compound ((Z) isomer of A). Purification was made by silica gel chromatography to give a (E) isomer of compound A (yield 38%) and a (Z) isomer of compound A (yield 33%).

A liquid crystal composition was prepared from 15% by weight of a compound ((E) isomer of A) and 85% by weight of a base liquid crystal. Physical properties of the liquid crystal composition obtained were measured, and values of physical properties of the compound were calculated by extrapolating the measured values. The results were as described below.

Maximum temperature (NI)=−63.6° C.; dielectric anisotropy (Δ∈)=6.1; optical anisotropy (Δn)=0.024; viscosity (η)=18.4 mPa·s.

A liquid crystal composition was prepared from 15% by weight of a compound ((Z) isomer of A) and 85% by weight of a base liquid crystal. Physical properties of the liquid crystal composition obtained were measured, and values of physical properties of the compound were calculated by extrapolating the measured values. The results were as described below.

Maximum temperature (NI)=−28.3° C.; dielectric anisotropy (Δ∈)=10.1; optical anisotropy (Δn)=0.057; viscosity (η)=11.2 mPa·s.

Dielectric anisotropy of the compounds in Examples 1 to 12 and dielectric anisotropy of compound (A) in Comparative Example 1 are summarized in Table 1. The results show that compound (1) is superb in view of having a larger dielectric anisotropy (Δ∈).

TABLE 1

Dielectric anisotropy of compounds

| No. | Structure | Δε |
|---|---|---|
| (A) | propyl-cyclohexyl-phenyl-O-CH=CH-CF₃ (E) | 6.1 |
| (38) | propyl-cyclohexyl-cyclohexyl-CF₂-O-(2,6-difluorophenyl)-O-CH=CH-CF₃ (E) | 17.8 |
| (78) | propyl-cyclohexyl-phenyl-(2,6-difluorophenyl)-CF₂-O-(2,6-difluorophenyl)-O-CH=CH-CF₃ (E) | 31.4 |
| (121) | propyl-dioxanyl-(2-fluorophenyl)-(2,6-difluorophenyl)-CF₂-O-(2,6-difluorophenyl)-O-CH=CH-CF₃ (E) | 49.4 |
| (122) | propyl-phenyl-(2-fluorophenyl)-(2,6-difluorophenyl)-CF₂-O-(2,6-difluorophenyl)-O-CH=CH-CF₃ (E) | 42.6 |

TABLE 1-continued

| Dielectric anisotropy of compounds | |
|---|---|
| No. | Δε |
| (123) | 54.1 |
| (32) | 33.2 |
| (A) | 10.1 |
| (38) | 25.4 |
| (78) | 40.1 |
| (121) | 56.9 |
| (122) | 50.9 |

TABLE 1-continued

Dielectric anisotropy of compounds

| No. | | Δε |
|---|---|---|
| (31) | structure | 25.9 |
| (44) | structure | 36.6 |

1-2. Example of Composition (1)

Liquid crystal composition (1) of the invention will be explained in detail by way of Examples. Compounds described in Examples were described using symbols according to definitions in Table 2 below. In Table 2, a configuration of 1,4-cyclohexylene is trans. A parenthesized number next to a symbolized compound in Examples corresponds to the number of the compound. A symbol (-) means any other liquid crystal compound. A ratio (percentage) of a liquid crystal compound is expressed in terms of weight percentage (% by weight) based on the weight of the liquid crystal composition. Values of physical properties of the composition were summarized in a last part. The physical properties were measured in accordance with the methods described above, and were directly described without extrapolating the measured values.

TABLE 2

Method for Description of Compounds using Symbols
R—(A$_1$)—Z$_1$—...—Z$_n$—(A$_n$)—R'

| 1) Left-terminal Group R— | Symbol |
|---|---|
| $C_nH_{2n+1}$— | n- |
| $C_nH_{2n+1}O$— | nO— |
| $C_mH_{2m+1}OC_nH_{2n}$— | mOn— |
| $CH_2$=CH— | V— |
| $C_nH_{2n+1}$—CH=CH— | nV— |
| $CH_2$=CH—$C_nH_{2n}$— | Vn— |
| $C_mH_{2m+1}$—CH=CH—$C_nH_{2n}$— | mVn— |
| $CF_2$=CH— | VFF— |
| $CF_2$=CH—$C_nH_{2n}$— | VFFn— |

| 2) Right-terminal Group —R' | Symbol |
|---|---|
| —$C_nH_{2n+1}$ | -n |
| —$OC_nH_{2n+1}$ | —On |
| —COOCH$_3$ | —EMe |
| —CH=CH$_2$ | —V |
| —CH=CH—$C_nH_{2n+1}$ | —Vn |
| —$C_nH_{2n}$—CH=CH$_2$ | —nV |
| —$C_mH_{2m}$—CH=CH—$C_nH_{2n+1}$ | —mVn |
| —CH=CF$_2$ | —VFF |
| —F | —F |
| —Cl | —CL |
| —OCF$_3$ | —OCF3 |
| —OCF$_2$H | —OCF2H |
| —CF$_3$ | —CF3 |

TABLE 2-continued

| —OCH=CH—CF$_3$ | —OVCF3 |
|---|---|
| —C≡N | —C |
| 3) Bonding Group —Z$_n$— | Symbol |
| —$C_nH_{2n}$— | n |
| —COO— | E |
| —CH=CH— | V |
| —CH$_2$O— | 1O |
| —OCH$_2$— | O1 |
| —CF$_2$O— | X |
| —C≡C— | T |

| 4) Ring Structure —A$_n$— | Symbol |
|---|---|
| cyclohexyl | H |
| phenyl | B |
| phenyl-F | B(F) |
| phenyl-2F | B(2F) |
| phenyl-F,F | B(F,F) |

TABLE 2-continued

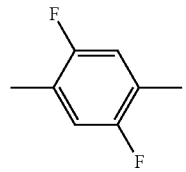 B(2F,5F)

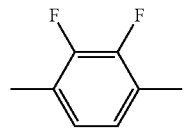 B(2F,3F)

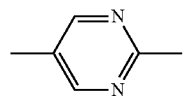 Py

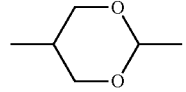 G

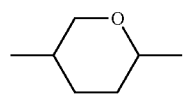 dh

5) Examples of Description

Example 1  3-HHB—OCF3

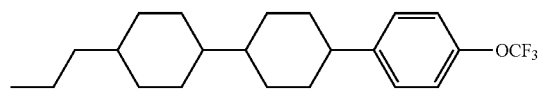

Example 2  3-BB(F,F)XB(F,F)—OVCF3

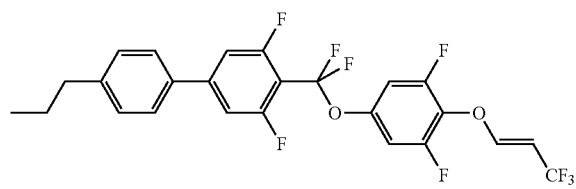 [SMILES: CCCc1ccc(-c2cc(F)c(C(F)(F)Oc3cc(F)c(O/C=C/C(F)(F)F)c(F)c3)c(F)c2)cc1]

Example 3  3-HH-4

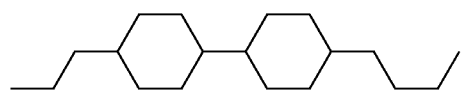 [SMILES: CCCCC1CCC(C2CCC(CCC)CC2)CC1]

Example 4  3-HBB(F,F)—F

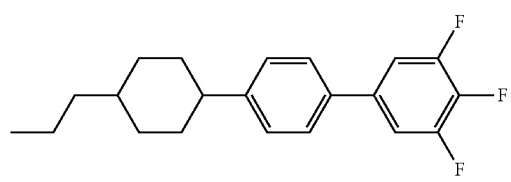 [SMILES: CCCC1CCC(c2ccc(-c3cc(F)c(F)c(F)c3)cc2)CC1]

Example 13

| | | |
|---|---|---|
| 5-BB(F)XB(F,F)-OVCF3 | (No. 33) | 7% |
| 3-HB-O2 | (13-5) | 10% |
| 5-HB-CL | (2-2) | 13% |
| 3-PyB(F)-F | (2-15) | 10% |
| 5-PyB(F)-F | (2-15) | 10% |
| 3-PyBB-F | (3-80) | 10% |
| 4-PyBB-F | (3-80) | 10% |
| 5-PyBB-F | (3-80) | 10% |
| 5-HBB(F)B-2 | (15-5) | 10% |
| 5-HBB(F)B-3 | (15-5) | 10% |

Example 14

| | | |
|---|---|---|
| 3-HHXB(F,F)-OVCF3 | (No. 38) | 4% |
| 5-HB-F | (2-2) | 12% |
| 6-HB-F | (2-2) | 9% |
| 7-HB-F | (2-2) | 7% |
| 2-HBB-OCF3 | (3-1) | 7% |
| 3-HBB-OCF3 | (3-1) | 7% |
| 4-HBB-OCF3 | (3-1) | 7% |
| 5-HBB-OCF3 | (3-1) | 5% |
| 3-HH2B-OCF3 | (3-4) | 4% |
| 5-HH2B-OCF3 | (3-4) | 4% |
| 3-HHB(F,F)-OCF3 | (3-3) | 5% |
| 3-HH2B(F)-F | (3-5) | 3% |
| 3-HBB(F)-F | (3-23) | 10% |
| 5-HBB(F)-F | (3-23) | 10% |
| 5-HBBH-3 | (15-1) | 3% |
| 3-HB(F)BH-3 | (15-2) | 3% |

Example 15

| | | |
|---|---|---|
| 5-HBBXB(F,F)-OVCF3 | (No. 79) | 5% |
| 5-HB-CL | (2-2) | 11% |
| 3-HH-4 | (13-1) | 8% |
| 3-HHB(F,F)-F | (3-3) | 8% |
| 3-HBB(F,F)-F | (3-3) | 20% |
| 5-HBB(F,F)-F | (3-3) | 15% |
| 3-HHEB(F,F)-F | (3-12) | 10% |
| 4-HHEB(F,F)-F | (3-12) | 3% |
| 5-HHEB(F,F)-F | (3-12) | 3% |
| 2-HBEB(F,F)-F | (3-39) | 3% |
| 3-HBEB(F,F)-F | (3-39) | 5% |
| 5-HBEB(F,F)-F | (3-39) | 3% |
| 3-HHBB(F,F)-F | (4-6) | 6% |

Example 16

| | | |
|---|---|---|
| 3-HBB(F,F)XB(F,F)-OVCF3 | (No. 78) | 4% |
| 3-HB-CL | (2-2) | 6% |
| 3-HHB-OCF3 | (3-1) | 5% |
| 3-H2HB-OCF3 | (3-13) | 5% |
| 5-H4HB-OCF3 | (3-19) | 15% |
| V-HHB(F)-F | (3-2) | 5% |
| 3-HHB(F)-F | (3-2) | 5% |
| 5-HHB(F)-F | (3-2) | 5% |
| 3-H4HB(F,F)-CF3 | (3-21) | 8% |
| 5-H4HB(F,F)-CF3 | (3-21) | 10% |
| 5-H2HB(F,F)-F | (3-15) | 5% |
| 5-H4HB(F,F)-F | (3-21) | 7% |
| 2-H2BB(F)-F | (3-26) | 5% |
| 3-H2BB(F)-F | (3-26) | 10% |
| 3-HBEB(F,F)-F | (3-39) | 5% |

Example 17

| | | |
|---|---|---|
| 5-dhBB(F,F)XB(F,F)-OVCF3 | (No. 80) | 4% |
| 1V2-BEB(F,F)-C | (5-15) | 6% |
| 3-HB-C | (5-1) | 18% |
| 2-BTB-1 | (13-10) | 10% |
| 5-HH-VFF | (13-1) | 30% |
| VFF-HHB-1 | (14-1) | 8% |
| VFF2-HHB-1 | (14-1) | 11% |
| 3-H2BTB-2 | (14-17) | 5% |
| 3-H2BTB-3 | (14-17) | 4% |
| 3-H2BTB-4 | (14-17) | 4% |

Example 18

| | | |
|---|---|---|
| 5-GB(F)B(F,F)XB(F,F)-OVCF3 | (No. 81) | 5% |
| 5-HB-CL | (2-2) | 3% |
| 7-HB(F)-F | (2-3) | 7% |
| 3-HH-4 | (13-1) | 9% |
| 3-HH-EMe | (13-2) | 23% |
| 3-HHEB-F | (3-10) | 8% |
| 5-HHEB-F | (3-10) | 8% |
| 3-HHEB(F,F)-F | (3-6) | 10% |
| 4-HGB(F,F)-F | (3-103) | 5% |
| 5-HGB(F,F)-F | (3-103) | 6% |
| 2-H2GB(F,F)-F | (3-106) | 4% |
| 3-H2GB(F,F)-F | (3-106) | 5% |
| 5-GHB(F,F)-F | (3-109) | 7% |

Example 19

| | | |
|---|---|---|
| 3-BB(F,F)XB(F,F)-OVCF3 | (No. 32) | 7% |
| 3-GB(F,F)XB(F,F)-OVCF3 | (No. 44) | 5% |
| 3-HHB(F,F)-F | (3-3) | 9% |
| 3-H2HB(F,F)-F | (3-15) | 8% |
| 4-H2HB(F,F)-F | (3-15) | 8% |
| 5-H2HB(F,F)-F | (3-15) | 8% |
| 3-HBB(F,F)-F | (3-24) | 16% |
| 5-HBB(F,F)-F | (3-24) | 15% |
| 3-H2BB(F,F)-F | (3-27) | 8% |
| 5-HHBB(F,F)-F | (4-6) | 3% |
| 5-HHEBB-F | (4-17) | 2% |
| 3-HH2BB(F,F)-F | (4-15) | 3% |
| 1O1-HBBH-4 | (15-1) | 4% |
| 1O1-HBBH-5 | (15-1) | 4% |

NI=89.9° C.; Δn=0.113; Δ∈=11.8; η=40.0 mPa·s.

When compound (Op-5) was added by 0.25% by weight based on the composition described above, a helical pitch was 61.3 micrometers.

Example 20

| | | |
|---|---|---|
| 5-BB(F)B(F,F)XB(F,F)-OVCF3 | (No. 77) | 3% |
| 5-HB-CL | (2-2) | 16% |
| 3-HH-4 | (13-1) | 12% |
| 3-HH-5 | (13-1) | 4% |
| 3-HHB-F | (3-1) | 4% |
| 3-HHB-CL | (3-1) | 3% |
| 4-HHB-CL | (3-1) | 4% |
| 3-HHB(F)-F | (3-2) | 10% |
| 4-HHB(F)-F | (3-2) | 9% |
| 5-HHB(F)-F | (3-2) | 9% |
| 7-HHB(F)-F | (3-2) | 8% |
| 5-HBB(F)-F | (3-23) | 4% |
| 1O1-HBBH-5 | (15-1) | 3% |
| 3-HHBB(F,F)-F | (4-6) | 2% |
| 4-HHBB(F,F)-F | (4-6) | 3% |
| 5-HHBB(F,F)-F | (4-6) | 3% |
| 3-HH2BB(F,F)-F | (4-15) | 3% |

Example 21

| | | |
|---|---|---|
| 5-GB(F)XB(F,F)-OVCF3 | (No. 43) | 8% |
| 2-HB-C | (5-1) | 5% |
| 3-HB-C | (5-1) | 12% |
| 3-HB-O2 | (13-5) | 15% |
| 2-BTB-1 | (13-10) | 3% |
| 3-HHB-F | (3-1) | 4% |
| 3-HHB-O1 | (14-1) | 5% |
| 3-HHB-3 | (14-1) | 14% |
| 3-HHEB-F | (3-10) | 4% |
| 5-HHEB-F | (3-10) | 4% |
| 2-HHB(F)-F | (3-2) | 7% |
| 3-HHB(F)-F | (3-2) | 7% |
| 5-HHB(F)-F | (3-2) | 7% |
| 3-HHB(F,F)-F | (3-3) | 5% |

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

A liquid crystal compound of the invention satisfies at least one of physical properties such as a high stability to heat, light and so forth, a high clearing point, a low minimum temperature of a liquid crystal phase, a small viscosity, a suitable optical anisotropy, a large dielectric anisotropy, a suitable elastic constant and an excellent compatibility with other liquid crystal compounds. A liquid crystal composition of the invention contains the compound, and satisfies at least one of physical properties such as a high maximum temperature, a low minimum temperature, a small viscosity, a suitable optical anisotropy, a large dielectric anisotropy and a suitable elastic constant. The composition has a suitable balance regarding at least two of physical properties. A liquid crystal display device of the invention includes the composition, and has a wide temperature range in which the device can be used, a short response time, a large voltage holding ratio, a low threshold voltage, a large contrast ratio and a long service life. Therefore, the device can be widely applied to a liquid crystal display used for a personal computer, a television and so forth.

What is claimed is:

1. A compound represented by formula (1):

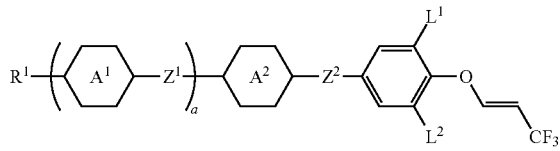

(1)

wherein, in formula (1),
$R^1$ is alkyl having 1 to 10 carbons, and in the alkyl, at least one of —$CH_2$— may be replaced by —O—, and at least one of —$CH_2CH_2$— may be replaced by —CH=CH—, and in the groups, at least one of hydrogen may be replaced by halogen;
ring $A^1$ and ring $A^2$ are independently 1,4-cyclohexylene, 1,4-cyclohexenylene, 1,4-phenylene, 1,4-phenylene in which at least one of hydrogen is replaced by halogen, tetrahydropyran-2,5-diyl, pyrimidine-2,5-diyl, pyridine-2,5-diyl, 1,3-dioxane-2,5-diyl or 2,6,7-trioxabicyclo[2.2.2]octane-1,4-diyl;
$Z^1$ and $Z^2$ are independently a single bond, —$CH_2CH_2$—, —C≡C—, —CH=CH—, —$CF_2O$—, —$CH_2O$— or —COO—, and at least one $Z^1$ and $Z^2$ is —$CF_2O$—;
$L^1$ and $L^2$ are independently hydrogen or halogen; and
a is 0, 1, 2 or 3.

2. The compound according to claim 1,
wherein, in formula (1) according to claim 1,
$R^1$ is alkyl having 1 to 10 carbons or alkenyl having 2 to 10 carbons;
ring $A^1$ and ring $A^2$ are independently 1,4-cyclohexylene, 1,4-phenylene, 2-fluoro-1,4-phenylene, 2,6-difluoro-1,4-phenylene, 2-chloro-1,4-phenylene, 2-chloro-6-fluoro-1,4-phenylene, 2,6-dichloro-1,4-phenylene, tetrahydropyran-2,5-diyl, 1,3-dioxane-2,5-diyl or 2,6,7-trioxabicyclo[2.2.2]octane-1,4-diyl;
$Z^1$ and $Z^2$ are independently a single bond, —$CH_2CH_2$—, —CH=CH—, —$CF_2O$— or —COO—, and at least one $Z^1$ and $Z^2$ is —$CF_2O$—;
$L^1$ and $L^2$ are independently hydrogen, chlorine or fluorine; and
a is 1, 2, or 3.

3. The compound according to claim 1, represented by formula (1-1):

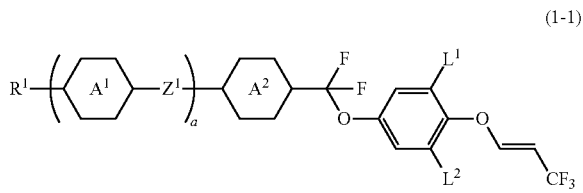

(1-1)

wherein, in formula (1-1),
$R^1$ is alkyl having 1 to 10 carbons or alkenyl having 2 to 10 carbons;
ring $A^1$ and ring $A^2$ are independently 1,4-cyclohexylene, 1,4-phenylene, 2-fluoro-1,4-phenylene, 2,6-difluoro-1,4-phenylene, 2-chloro-1,4-phenylene, 2-chloro-6-fluoro-1,4-phenylene, 2,6-dichloro-1,4-phenylene, tetrahydropyran-2,5-diyl, 1,3-dioxane-2,5-diyl or 2,6,7-trioxabicyclo[2.2.2]octane-1,4-diyl;
$Z^1$ is independently a single bond, —$CH_2CH_2$—, —CH=CH—, —$CF_2O$— or —COO—;
$L^1$ and $L^2$ are independently hydrogen, chlorine or fluorine; and
a is 0, 1, 2 or 3.

4. The compound according to claim 3, wherein, in formula (1-1) according to claim 3, $R^1$ is alkyl having 1 to 10 carbons or alkenyl having 2 to 10 carbons; ring $A^1$ and ring $A^2$ are independently 1,4-cyclohexylene, 1,4-phenylene, 2-fluoro-1,4-phenylene, 2,6-difluoro-1,4-phenylene, 2-chloro-1,4-phenylene, 2-chloro-6-fluoro-1,4-phenylene, tetrahydropyran-2,5-diyl or 1,3-dioxane-2,5-diyl; $Z^1$ is a single bond, —$CH_2CH_2$—, —CH=CH— or —$CF_2O$—; $L^1$ and $L^2$ are independently hydrogen, chlorine or fluorine; and a is 1, 2 or 3.

5. The compound according to claim 3, wherein, in formula (1-1) according to claim 3, $R^1$ is alkyl having 1 to 10 carbons or alkenyl having 2 to 10 carbons; ring $A^1$ and ring $A^2$ are independently 1,4-cyclohexylene, 1,4-phenylene, 2-fluoro-1,4-phenylene, 2,6-difluoro-1,4-phenylene, tetrahydropyran-2,5-diyl or 1,3-dioxane-2,5-diyl; $Z^1$ is a single bond; $L^1$ and $L^2$ are independently hydrogen or fluorine; and a is 1, 2, or 3.

6. The compound according to claim 3, wherein, in formula (1-1) according to claim 3, $R^1$ is alkyl having 1 to 10 carbons or alkenyl having 2 to 10 carbons; ring $A^1$ and ring $A^2$ are independently 1,4-cyclohexylene, 1,4-phenylene, 2-fluoro-1,4-phenylene, 2,6-difluoro-1,4-phenylene, tetrahydropyran-2,5-diyl or 1,3-dioxane 2,5-diyl; $Z^1$ is a single bond; $L^1$ and $L^2$ are fluorine; and a is 1 or 2.

7. The compound according to claim 1, represented by formula (1-2) or (1-3):

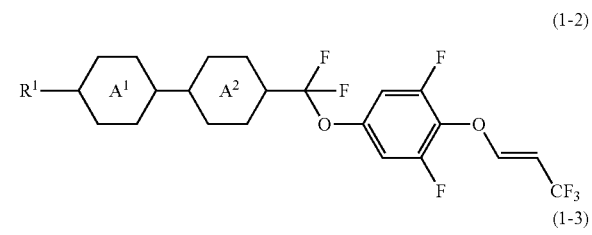

(1-2)

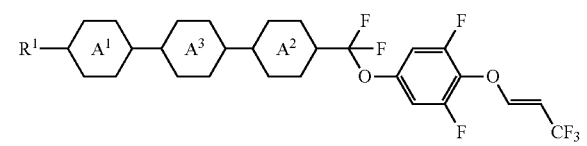

(1-3)

wherein, in formulas (1-2) and (1-3),
$R^1$ is alkyl having 1 to 10 carbons or alkenyl having 2 to 10 carbons;
ring $A^1$ is 1,4-cyclohexylene, 1,4-phenylene, 2-fluoro-1,4-phenylene, 2,6-difluoro-1,4-phenylene, tetrahydropyran-2,5-diyl or 1,3-dioxane 2,5-diyl; and
ring $A^2$ and ring $A^3$ are independently 1,4-cyclohexylene, 1,4-phenylene, 2-fluoro-1,4-phenylene or 2,6-difluoro-1,4-phenylene.

8. A liquid crystal composition, containing at least one of the compounds according to claim 1.

9. The liquid crystal composition according to claim 8, further containing at least one compound selected from the group of compounds represented by formulas (2) to (4):

(2)

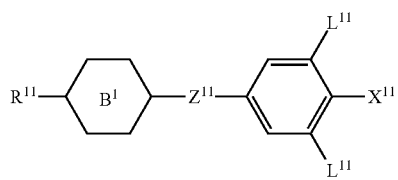

(3)

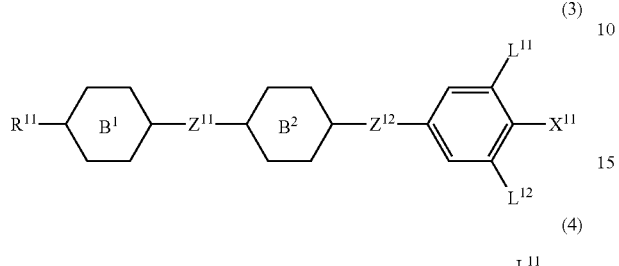

(4)

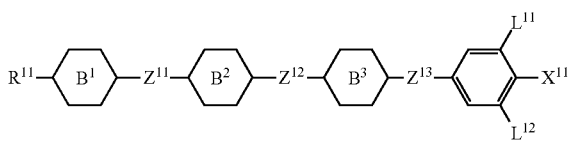

wherein, in formulas (2) to (4),
$R^{11}$ is alkyl having 1 to 10 carbons or alkenyl having 2 to 10 carbons, and in the alkyl and the alkenyl, at least one of hydrogen may be replaced by fluorine and at least one of —$CH_2$— may be replaced by —O—;
$X^{11}$ is fluorine, chlorine, —$OCF_3$, —$OCHF_2$, —$CF_3$, —$CHF_2$, —$CH_2F$, —$OCF_2CHF_2$ or —$OCF_2CHFCF_3$;
ring $B^1$, ring $B^2$ and ring $B^3$ are independently 1,4-cyclohexylene, 1,4-phenylene in which at least one of hydrogen may be replaced by fluorine, tetrahydropyran-2,5-diyl, 1,3-dioxane-2,5-diyl or pyrimidine-2,5-diyl;
$Z^{11}$, $Z^{12}$ and $Z^{13}$ are independently a single bond, —$CH_2CH_2$—, —CH=CH—, —C≡C—, —COO—, —$CF_2O$—, —$OCF_2$—, —$CH_2O$— or —$(CH_2)_4$—; and
$L^{11}$ and $L^{12}$ are independently hydrogen or fluorine.

10. The liquid crystal composition according to claim 8, further containing at least one compound selected from the group of compounds represented by formula (5):

(5)

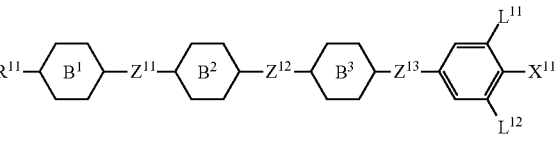

wherein, in formula (5),
$R^{12}$ is alkyl having 1 to 10 carbons or alkenyl having 2 to 10 carbons, and in the alkyl and the alkenyl, at least one of hydrogen may be replaced by fluorine and at least one of —$CH_2$— may be replaced by —O—;
$X^{12}$ is —C≡N or —C≡C—C≡N,
ring $C^1$ is 1,4-cyclohexylene, 1,4-phenylene in which at least one of hydrogen may be replaced by fluorine, tetrahydropyran-2,5-diyl, 1,3-dioxane-2,5-diyl or pyrimidine-2,5-diyl;
$Z^{14}$ is a single bond, —$CH_2CH_2$—, —C≡C—, —COO—, —$CF_2O$—, —$OCF_2$— or —$CH_2O$—;
$L^{13}$ and $L^{14}$ are independently hydrogen or fluorine; and
i is 1, 2, 3 or 4.

11. The liquid crystal composition according to claim 8, further containing at least one compound selected from the group of compounds represented by formulas (6) to (12):

(6)

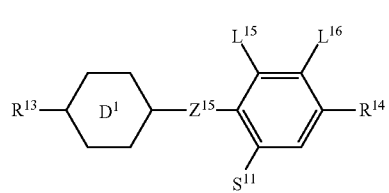

(7)

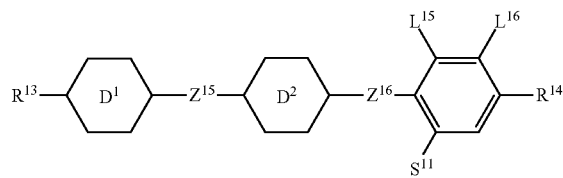

(8)

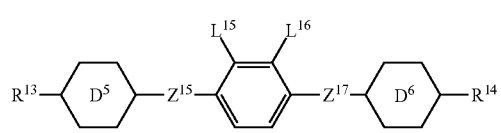

(9)

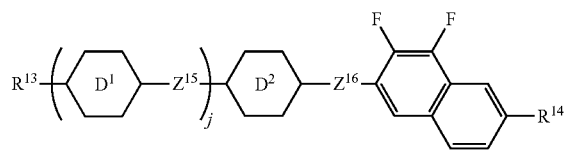

(10)

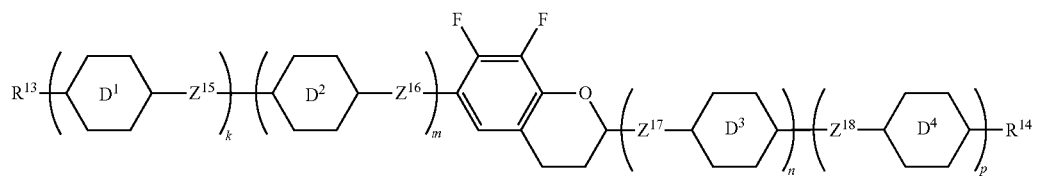

(11)

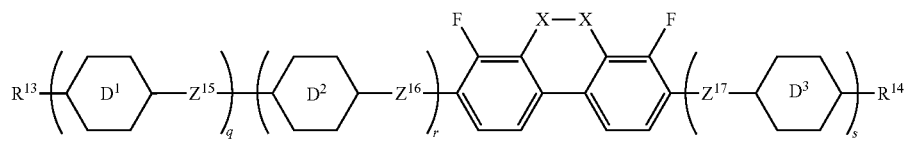

-continued (12)

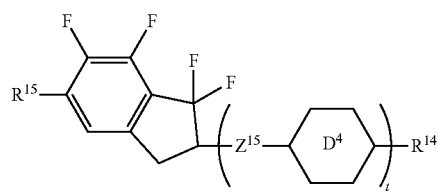

wherein, in formulas (6) to (12), $R^{13}$ and $R^{14}$ are independently alkyl having 1 to 10 carbons or alkenyl having 2 to 10 carbons, and in the alkyl and the alkenyl, at least one of —CH$_2$— may be replaced by —O— and at least one of hydrogen may be replaced by fluorine;

$R^{15}$ is hydrogen, fluorine, alkyl having 1 to 10 carbons or alkenyl having 2 to 10 carbons, and in the alkyl and the alkenyl, at least one of —CH$_2$— may be replaced by —O— and at least one of hydrogen may be replaced by fluorine;

$S^{11}$ is hydrogen or methyl;

X is —CF$_2$—, —O— or —CHF—;

ring $D^1$, ring $D^2$, ring $D^3$ and ring $D^4$ are independently 1,4-cyclohexylene, 1,4-cyclohexenylene, 1,4-phenylene in which at least one of hydrogen may be replaced by fluorine, tetrahydropyran-2,5-diyl or decahydronaphthalene-2,6-diyl;

ring $D^5$ and ring $D^6$ are independently 1,4-cyclohexylene, 1,4-cyclohexenylene, 1,4-phenylene, tetrahydropyran-2,5-diyl or decahydronaphthalene 2,6-diyl;

$Z^{15}$, $Z^{16}$, $Z^{17}$ and $Z^{18}$ are independently a single bond, —CH$_2$CH$_2$—, —COO—, —CH$_2$O—, —OCF$_2$— or —OCF$_2$CH$_2$CH$_2$—;

$L^{15}$ and $L^{16}$ are independently fluorine or chlorine; and j, k, m, n, p, q, r and s are independently 0 or 1, a sum of k, m, n and p is 1 or 2, a sum of q, r and s is 0, 1, 2 or 3, and t is 1, 2 or 3.

12. The liquid crystal composition according to claim 8, further containing at least one compound selected from the group of compounds represented by formulas (13) to (15):

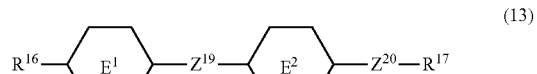

(13)

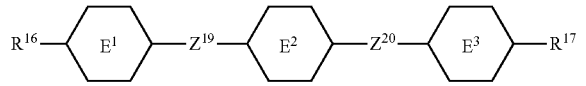

(14)

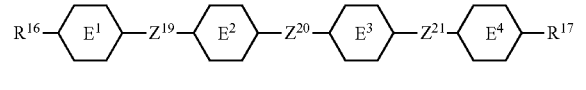

(15)

wherein, in formulas (13) to (15), $R^{16}$ and $R^{17}$ are independently alkyl having 1 to 10 carbons or alkenyl having 2 to 10 carbons, and in the alkyl or the alkenyl, at least one of —CH$_2$— may be replaced by —O— and at least one of hydrogen may be replaced by fluorine;

ring $E^1$, ring $E^2$, ring $E^3$ and ring $E^4$ are independently 1,4-cyclohexylene, 1,4-phenylene, 2-fluoro-1,4-phenylene, 2,5-difluoro-1,4-phenylene or pyrimidine-2,5-diyl; and $Z^{19}$, $Z^{20}$ and $Z^{21}$ are independently a single bond, —CH$_2$CH$_2$—, —CH═CH—, —C≡C— or —COO—.

13. The liquid crystal composition according to claim 8, further containing at least one of a polymerizable compound, an optically active compound, an antioxidant, an ultraviolet light absorber, a light stabilizer, a heat stabilizer and a defoaming agent.

14. A liquid crystal display device, including the liquid crystal composition according to claim 8.

* * * * *